US012786554B2

(12) United States Patent
Ben Hariz et al.

(10) Patent No.: US 12,786,554 B2
(45) Date of Patent: Nov. 3, 2026

(54) SYSTEMS AND METHODS FOR GUIDING THE CAPTURE OF VEHICLE IMAGES AND VIDEOS

(71) Applicant: ACV Auctions Inc., Buffalo, NY (US)

(72) Inventors: Ramzi Ben Hariz, Villemomble (FR); Raphaël Bonaque, Paris (FR); Mathis Chenuet, Gien (FR); Auriane Riou, Roquefort les Pins (FR); Robin Vogel, Paris (FR)

(73) Assignee: ACV Auctions Inc., Buffalo, NY (US)

( * ) Notice: Subject to any disclaimer, the term of this patent is extended or adjusted under 35 U.S.C. 154(b) by 86 days.

(21) Appl. No.: 18/895,966

(22) Filed: Sep. 25, 2024

(65) Prior Publication Data

US 2025/0126353 A1 Apr. 17, 2025

(30) Foreign Application Priority Data

Oct. 12, 2023 (EP) .................................... 23306783

(51) Int. Cl.
*H04N 23/60* (2023.01)
*G06T 15/20* (2011.01)
(Continued)

(52) U.S. Cl.
CPC ............. *H04N 23/64* (2023.01); *G06T 15/20* (2013.01); *G06T 19/00* (2013.01); *G06V 10/82* (2022.01);
(Continued)

(58) Field of Classification Search
CPC ........ G06V 20/70; G06V 20/64; G06V 10/82; G06V 10/255; G06V 2201/08;
(Continued)

(56) References Cited

U.S. PATENT DOCUMENTS 10,319,094 B1 6/2019 Chen et al.
11,386,680 B2 * 7/2022 Maity ................. G06V 20/584
(Continued)

OTHER PUBLICATIONS

Extended European Search Report for European Application No. 23306783.4 dated Jul. 29, 2024.
(Continued)

*Primary Examiner* — Marly S Camargo
(74) *Attorney, Agent, or Firm* — Wolf, Greenfield & Sacks, P.C.

(57) ABSTRACT

Techniques guiding users in capturing vehicle images and video are provided. Some techniques involve: obtaining a three-dimensional model of a vehicle; generating a part-annotated 3D model of the vehicle; obtaining portions of the vehicle to be imaged by the user; generating overlays corresponding to the portions of the vehicle to be imaged by the user; and outputting the overlays for use in guiding the capturing images of the vehicle. Some techniques involve: obtaining a video of a vehicle; obtaining frames from the video; analyzing the frames to identify portions of the vehicle the user is to video, the analyzing comprising for each particular frame: determining whether the particular frame complies with one or more image quality criteria; and identifying at least one portion of the vehicle captured in the particular frame; and generating instructions for guiding the user to video the identified portions of the vehicle.

19 Claims, 36 Drawing Sheets

(51) Int. Cl.
*G06T 19/00* (2011.01)
*G06V 10/82* (2022.01)
*G06V 20/64* (2022.01)
*G06V 20/70* (2022.01)

(52) U.S. Cl.
CPC .............. *G06V 20/64* (2022.01); *G06V 20/70* (2022.01); *G06T 2219/004* (2013.01); *G06V 2201/08* (2022.01)

(58) Field of Classification Search
CPC ........... G06T 15/20; G06T 19/00; G06T 7/10; G06T 2219/004; G08G 1/017; G08G 1/0175; H04N 23/64
See application file for complete search history.

(56) References Cited

U.S. PATENT DOCUMENTS

| | | | |
|---|---|---|---|
| 2018/0260793 | A1 | 9/2018 | Li et al. |
| 2019/0304099 | A1 | 10/2019 | Hever et al. |
| 2019/0304100 | A1 | 10/2019 | Hever et al. |
| 2021/0090242 | A1 | 3/2021 | Hever et al. |
| 2021/0174117 | A1 | 6/2021 | Hever et al. |
| 2021/0358115 | A1 | 11/2021 | Hever et al. |
| 2023/0342937 | A1 | 10/2023 | Hever et al. |
| 2026/0087611 | A1* | 3/2026 | Brighton ............... G06T 7/0008 |

OTHER PUBLICATIONS

Chen et al., Deeplab: Semantic image segmentation with deep convolutional nets, atrous convolution, and fully connected crfs. IEEE transactions on pattern analysis and machine intelligence. Apr. 27, 2017;40(4):834-48.
Chen et al., Encoder-decoder with atrous separable convolution for semantic image segmentation. Proceedings of the European conference on computer vision (ECCV) 2018;801-18.
He et al., Deep residual learning for image recognition. Proceedings of the IEEE conference on computer vision and pattern recognition 2016;770-8.
Howard et al., Mobilenets: Efficient convolutional neural networks for mobile vision applications. arXiv preprint arXiv:1704.04861. Apr. 17, 2017. 9 pages.
Ronneberger et al., U-net: Convolutional networks for biomedical image segmentation. Medical image computing and computer-assisted intervention-MICCAI 2015: 18th international conference, Munich, Germany, Oct. 5-9, 2015, proceedings, part III 18 2015;234-41.

* cited by examiner

300

301

SYSTEMS AND METHODS FOR GUIDING THE CAPTURE OF VEHICLE IMAGES AND VIDEOS

CROSS-REFERENCE TO RELATED APPLICATIONS

This application claims the benefit of priority under 35 U.S.C. § 119 to European application number 23306783.4, filed Oct. 12, 2023, entitled "SYSTEMS AND METHODS FOR GUIDING THE CAPTURE OF VEHICLE IMAGES AND VIDEOS", which is incorporated by reference herein in its entirety.

BACKGROUND

Vehicles are often bought and sold multiple times throughout their lifetimes. Examples of vehicles include cars, motorcycles, scooters, e-bikes, busses, boats, trains, and planes. Vehicle buying and selling transactions may occur in person or online in a virtual sales environment, and may also occur at auctions, either in person or online over the Internet. Because of the volume of vehicles sold at auction, often it is not possible for a prospective buyer to inspect a vehicle in person, let alone have the vehicle inspected by a qualified mechanic. Buyers often rely on auction houses or third-party inspection services to provide vehicle condition data upon which purchasing decisions may be made. This vehicle condition data is often provided as a written report in electronic form. The value of a vehicle condition report is based, in large part, on the accuracy and completeness of the data it contains. An important part of the vehicle report is information about the interior and exterior condition of the vehicle.

SUMMARY

In one aspect, a method is provided for use in connection with guiding a user in capturing one or more images of a vehicle comprising using at least one computer hardware processor to perform: obtaining a three-dimensional (3D) model of the vehicle; generating, from the 3D model of the vehicle, a part-annotated 3D model of the vehicle; obtaining information specifying portions of the vehicle to be imaged by the user; generating, using the part-annotated 3D model of the vehicle and information specifying the portions of the vehicle to be imaged by the user, overlays corresponding to the portions of the vehicle to be imaged by the user; and outputting the generated overlays for use in guiding the user in capturing images of the portions of the vehicle.

In another aspect, a system is provided for use in connection with guiding a user in capturing one or more images of a vehicle, the system comprising at least one computer hardware processor; and at least one non-transitory computer-readable storage medium storing processor-executable instructions that, when executed by the at least one computer hardware processor, cause the at least one computer hardware processor to perform: obtaining a three-dimensional (3D) model of the vehicle; generating, from the 3D model of the vehicle, a part-annotated 3D model of the vehicle; obtaining information specifying portions of the vehicle to be imaged by the user; generating, using the part-annotated 3D model of the vehicle and information specifying the portions of the vehicle to be imaged by the user, overlays corresponding to the portions of the vehicle to be imaged by the user; and outputting the generated overlays for use in guiding the user in capturing images of the portions of the vehicle.

In another aspect, at least one non-transitory computer-readable storage medium is provided, the medium storing processor-executable instructions that, when executed by at least one computer hardware processor, cause the at least one computer hardware processor to perform: obtaining a three-dimensional (3D) model of the vehicle; generating, from the 3D model of the vehicle, a part-annotated 3D model of the vehicle; obtaining information specifying portions of the vehicle to be imaged by the user; generating, using the part-annotated 3D model of the vehicle and information specifying the portions of the vehicle to be imaged by the user, overlays corresponding to the portions of the vehicle to be imaged by the user; and outputting the generated overlays for use in guiding the user in capturing images of the portions of the vehicle.

In some embodiments, generating the part-annotated 3D model of the vehicle comprises using a trained deep neural network model to generate the part-annotated 3D model.

In some embodiments, generating the part-annotated 3D model of the vehicle comprises: generating multiple viewpoints; generating, using the 3D model of the vehicle, multiple renderings of the vehicle corresponding to the multiple viewpoints; identifying vehicle parts in the multiple renderings by using the trained deep neural network model; and generating the part-annotated 3D model using the vehicle parts identified in the multiple renderings.

In some embodiments, the trained deep neural network model comprises: an encoder neural network portion; and a decoder neural network portion, wherein the decoder neural network portion comprises an atrous spatial pyramid pooling (ASPP) neural network portion.

In some embodiments, the multiple renderings comprise a first rendering of the vehicle corresponding to a first viewpoint of the multiple viewpoints, wherein the trained deep neural network model comprises a plurality of parameters, and wherein identifying the vehicle parts comprises identifying vehicle parts in the first rendering of the vehicle by processing the first rendering with the trained deep neural network model, the processing comprising determining output of the trained deep neural network using the first rendering of the vehicle and values of the plurality of parameters.

In some embodiments, the trained deep neural network model comprises at least 10 million, at least 25 million, at least 50 million, or at least 100 million parameters.

In some embodiments, the information specifying portions of the vehicle to be imaged by the user specifies multiple parameters defining a view for each of one or more portions of the vehicle to be imaged by the user.

In some embodiments, the multiple parameters for a particular portion of the vehicle to be imaged by the user specify: one or more parts of the vehicle that should be fully visible in an image of the particular portion of the vehicle to be captured by the user, a part of the vehicle to in a center of the image, one or more parts of the vehicle to be highlighted in an overlay to be generated for guiding the user to capture the image, and/or one or more camera parameters to be used in capturing the image, the one or more camera parameters including a camera height, a camera pan angle, a focal length and/or field of view, and/or an aspect ratio.

In some embodiments, generating the overlays corresponding to the portions of the vehicle to be imaged by the user comprises: for each particular portion of the vehicle to be imaged and using the information specifying portions of the vehicle, generating vehicle-specific camera parameters using the information specifying portions of the vehicle; determining boundaries of one or more parts of the particular portion of the vehicle using the vehicle-specific camera parameters; and generating an overlay based on the determined boundaries.

In some embodiments, generating the overlay further comprises generating an initial overlay and smoothing the initial overlay to obtain the generated overlay.

In some embodiments, the smoothing comprises removing isolated curves and redundant curves from the initial overlay.

In some embodiments, the outputting comprises transmitting at least some of the generated overlays to a mobile device of the user.

In some embodiments, the method further comprises guiding the user, using the at least some of the generated overlays and via a software application executing on the user's mobile device, to capture at least some of the portions of the vehicle.

In one aspect, a method is provided for use in connection with guiding a user in capturing one or more videos of a vehicle with a mobile device, the method comprising: using at least one computer hardware processor to perform: obtaining a video of the vehicle recorded using a camera of the mobile device; obtaining a plurality of video frames from the video of the vehicle; analyzing the plurality of video frames to identify one or more portions of the vehicle that the user is to video record using the mobile device, the analyzing comprising for each particular video frame of at least some of the plurality of video frames: determining whether the particular video frame complies with one or more image quality criteria; and identifying at least one portion of the vehicle captured in the particular video frame; and generating, based on results of the analyzing, instructions for guiding the user to video record the identified one or more portions of the vehicle that the user is to video record.

In another aspect, a system is provided for use in connection with guiding a user in capturing one or more videos of a vehicle with a mobile device, the system comprising: at least one computer hardware processor; and at least one non-transitory computer-readable storage medium storing processor-executable instructions that, when executed by the at least one computer hardware processor, cause the at least one computer hardware processor to perform: obtaining a video of the vehicle recorded using a camera of the mobile device; obtaining a plurality of video frames from the video of the vehicle; analyzing the plurality of video frames to identify one or more portions of the vehicle that the user is to video record using the mobile device, the analyzing comprising for each particular video frame of at least some of the plurality of video frames: determining whether the particular video frame complies with one or more image quality criteria; and identifying at least one portion of the vehicle captured in the particular video frame; and generating, based on results of the analyzing, instructions for guiding the user to video record the identified one or more portions of the vehicle that the user is to video record.

In another aspect, at least one non-transitory computer-readable storage medium is provided, the medium storing processor-executable instructions that, when executed by at least one computer hardware processor, cause the at least one computer hardware processor to perform: obtaining a video of the vehicle recorded using a camera of the mobile device; obtaining a plurality of video frames from the video of the vehicle; analyzing the plurality of video frames to identify one or more portions of the vehicle that the user is to video record using the mobile device, the analyzing comprising for each particular video frame of at least some of the plurality of video frames: determining whether the particular video frame complies with one or more image quality criteria; and identifying at least one portion of the vehicle captured in the particular video frame; and generating, based on results of the analyzing, instructions for guiding the user to video record the identified one or more portions of the vehicle that the user is to video record.

In some embodiments, obtaining the video of the vehicle comprises recording the video of the vehicle using the camera of the mobile device.

In some embodiments, the method further comprises guiding the user to video record the identified one or more portions of the vehicle that the user is to video record by presenting the instructions for guiding the user to the user via a graphical user interface of the mobile device.

In some embodiments, the method further comprises analyzing at least a subset of the at least some frames of the plurality of video frames to identify one or more vehicle defects.

In some embodiments, obtaining the plurality of video frames from the video of the vehicle comprises: extracting a subset of video frames from the video of the vehicle at a set sampling rate.

In some embodiments, the one or more image quality criteria comprises a blurriness criterion.

In some embodiments, determining whether the particular video frame complies with the one or more image quality criteria comprises: determining a level of blurriness within the particular video frame; and determining whether the level of blurriness complies with the blurriness criterion.

In some embodiments, the one or more image quality criteria comprise a vehicle position criterion and a vehicle size criterion.

In some embodiments, determining whether the particular video frame complies with the one or more image quality criteria comprises: determining a size of the vehicle in the particular frame; determining whether the size of the vehicle complies with the vehicle size criterion; determining a location of the vehicle in the particular frame; and determining whether the location of the vehicle complies with the vehicle location criterion.

In some embodiments, identifying at least one portion of the vehicle captured in the particular video frame comprises identifying one or more parts of the vehicle within the particular frame.

In some embodiments, the method further comprises determining one or more points on the vehicle based on the one or more parts and determining a position of the mobile device based on the one or more points.

In some embodiments, the method further comprises: receiving, a 3D model of the vehicle; and mapping the portion of the vehicle captured in the particular frame onto a corresponding portion of the 3D model, based on the determined position of the mobile device.

In some embodiments, analyzing the plurality of video frames to identify one or more portions of the vehicle that the user is to video record using the mobile device comprises determining portions of the 3D model which have not been mapped to with portions of the vehicle captured in the at least some of the plurality of video frames.

In some embodiments, analyzing the plurality of video frames to identify one or more portions of the vehicle that the user is to video record using the mobile device comprises identifying portions of the vehicle which have not been captured in the at least some of the plurality of video frames.

In some embodiments, analyzing the plurality of video frames to identify one or more portions of the vehicle that the user is to video record using the mobile device comprises identifying portions of the vehicle which have been captured in the at least some of the plurality of video frames and did not comply with the one or more image quality criteria.

In some embodiments, selecting a subset of frames of the at least some of the plurality of video frames is based on the determined compliance of the video frames with the one or more image quality criteria and transmitting the selected subset to a server.

In some embodiments, the method further comprises using the server to analyze at least some of the selected subset of frames to determine one or more vehicle defects within the at least some frames of the selected subset of frames.

BRIEF DESCRIPTION OF THE DRAWINGS

Various aspects of at least one embodiment are discussed herein with reference to the accompanying figures, which are not intended to be drawn to scale. In the figures, each identical or nearly identical component that is illustrated in various figures is represented by a like numeral. For purposes of clarity, not every component may be labeled in every figure. In the figures.

DETAILED DESCRIPTION

Figure 1A:
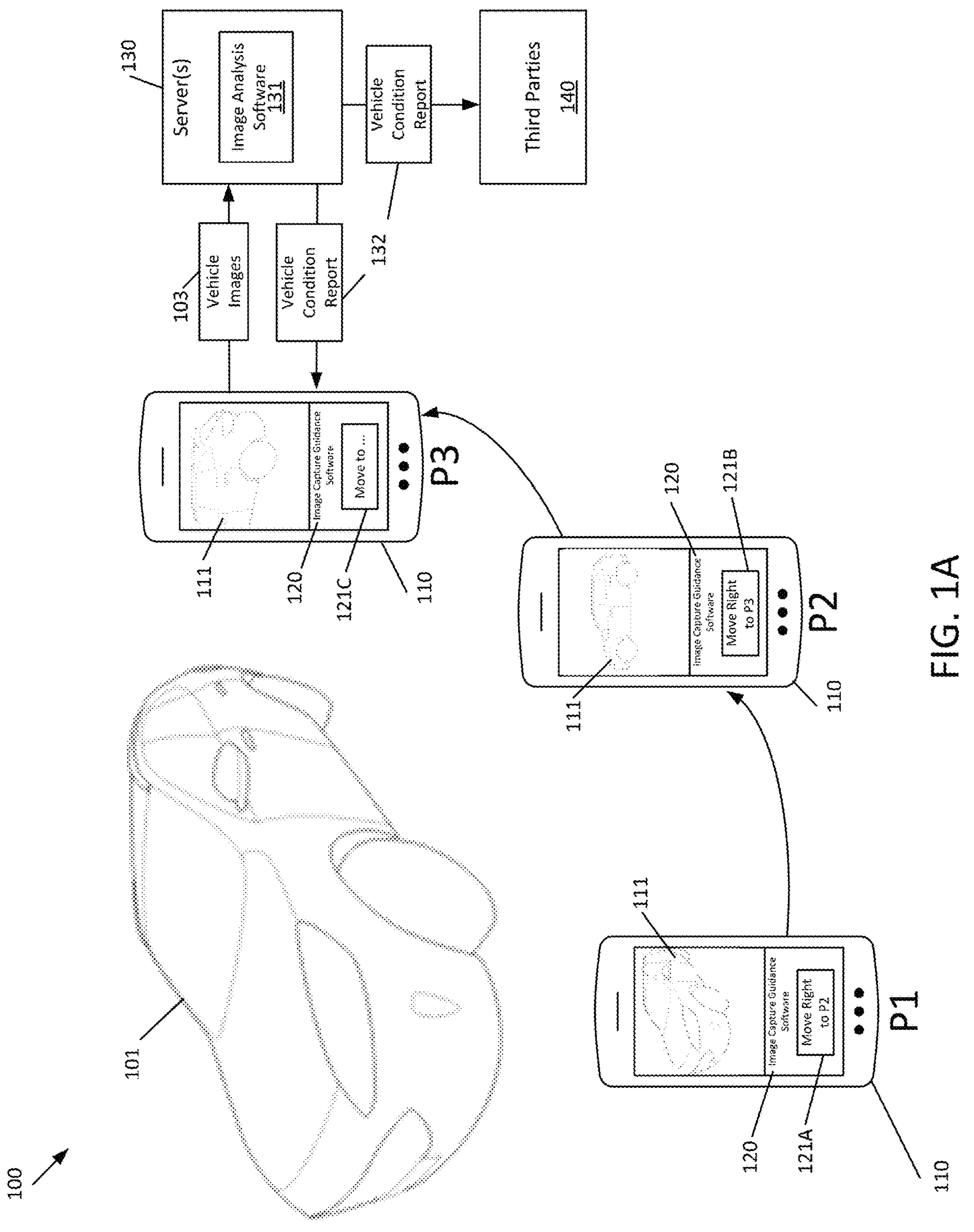
FIG. 1A shows an illustrative environment 100 in which a vehicle analysis system may operate, in accordance with some embodiments of the technology described herein.

As discussed above, it is important to provide accurate and complete vehicle data to prospective vehicle buyers. As mentioned, it is especially important to provide information on the interior and exterior condition of a vehicle. One aspect of providing information on the interior and exterior condition of a vehicle is properly capturing images or videos of vehicles, which can be reviewed by prospective buyers to understand the condition of the vehicle.

One challenge in obtaining sufficient information on the exterior condition of a vehicle is the volume of information which must be obtained. Vehicles have many parts, both on the interior and exterior which must be analyzed to ensure a proper understanding of the vehicle condition is obtained, and many parts of the vehicle may not be properly captured in images or videos for a buyer to analyze vehicle condition. Parts may be missed and therefore not included in images or videos, parts may be obstructed in images and videos, and parts may be captured in low quality images and videos. In such cases, the value of the data in the vehicle report is low and a buyer cannot make a properly informed decision. In addition, because of the volume of parts on a vehicle which should be analyzed to have a complete understanding of the vehicle condition, vehicle defects may be missed or overlooked by prospective buyers, even when they are properly captured in videos or images.

Some conventional techniques exist which provide instructions to users to capture images or video of a vehicle. Such techniques may include providing users with a list of views of a vehicle which should be captured or example images of a vehicle which should be captured. However, such techniques do not ensure the user is providing high quality images or videos of the vehicle, for example the vehicle may not be aligned within the image or video, the image or video may be blurry, the image or video may not capture the intended view of the vehicle, or parts of the vehicle may be obstructed, among other issues. These issues prevent the vehicle condition from being properly analyzed by buyers or automated analysis techniques.

The inventors have recognized that conventional techniques for guiding the capturing of imagery (e.g., images or videos) of a vehicle may be improved upon by standardizing the views of the vehicle which are to be captured and providing feedback to users as they are capturing images or video of vehicles. The inventors have appreciated that standardizing views of the vehicle to be captured will help to ensure that important portions of vehicles are properly captured and will streamline the analysis of the vehicle condition. Moreover, having captured images of a standard set of views of a vehicle will help to improve the accuracy of subsequent image processing techniques that analyze the captured images to identify vehicle defects.

One approach to standardizing the views of the vehicle to be captured, developed by the inventors, involves guiding the user to capture a specific set of images by using vehicle overlays. A vehicle overlay may be displayed on the user's mobile device—superimposed on the live camera view (as in an augmented reality (AR) interface)—to guide the user to capture a portion of the vehicle represented by the overlay.

A vehicle overlay may be an image of a portion of a vehicle. The image may include one or more lines indicating an outline of a portion of the vehicle that is targeted for being imaged. For example, a vehicle overlay may be an image having lines outlining a part of a vehicle such as a fender, hood, door, bumper, etc. In some embodiments, a vehicle overlay may be a wireframe overlay. Examples of vehicle overlays are provided herein including in FIG. 2. Vehicle overlays may be specific to a particular vehicle make and model. In some examples, vehicle overlays may be general overlays to a particular type of vehicle, such as a general sedan overlay or a general truck overlay.

A vehicle overlay may be displayed to a user (e.g., via a user's mobile device such as a smartphone or tablet) superimposed over a camera display (e.g., showing a live feed of what the mobile device's camera has in its field of view) such that a user can align the current view of the vehicle in the camera of the mobile device with the vehicle overlay. To this end, a vehicle overlay may have one or more at least partially transparent (e.g., partially transparent or fully transparent) in addition with an outline of a portion of the vehicle to be imaged such that the image of the vehicle can be simultaneously seen through the at least partially transparent portions along with the outline of the portion of the vehicle to be imaged. Examples of this type of display are shown in FIG. 1C.

Although vehicle overlays may be helpful to guiding a user to captured targeted images of a vehicle, the inventors have recognized that it is challenging to generate such vehicle overlays in the first place. Conventional techniques for generating vehicle overlays involve generating them manually for each vehicle of interest. Moreover, since multiple images of multiple portions of any one vehicle are of interest (e.g., for identifying vehicle defects, for inclusion in a vehicle condition report, etc.), multiple vehicle overlays need to be generated for each type of vehicle and there is a multitude of vehicle makes and models for which vehicle overlays are to be generated. The conventional manual techniques are therefore tedious, time consuming, and impractical.

Accordingly, the inventors have developed new techniques for automatically generating vehicle overlays that may be subsequently used for guiding users in capturing vehicle imagery. In some embodiments, the techniques involve generating a parts-annotated 3D model of the vehicle using machine learning techniques (e.g., using a deep neural network) and generating overlays from the parts-annotated 3D model based on information specifying portions of the vehicle that the user is to capture (e.g., portions that are targeted for subsequent analysis of vehicle condition). In turn, the generated overlays may be provided to the user's mobile device and software executing on the user's mobile device may use the generated overlays to guide the user toward capturing the targeted imagery.

Accordingly, some embodiments provide for a method for use in connection with guiding a user in capturing one or more images of a vehicle. The method includes: (A) obtaining a three-dimensional (3D) model of the vehicle; (B) generating, from the 3D model of the vehicle, a part-annotated 3D model of the vehicle; (C) obtaining information specifying portions of the vehicle to be imaged by the user; (D) generating, using the part-annotated 3D model of the vehicle and information specifying the portions of the vehicle to be imaged by the user, overlays corresponding to the portions of the vehicle to be imaged by the user; and (E) outputting the generated overlays for use in guiding the user in capturing images of the portions of the vehicle (e.g., by transmitting the generated overlays to a mobile device of the user).

In some embodiments, the part-annotated 3D model of the vehicle may be generated using a trained deep neural network model (e.g., having a segmentation architecture). For example, the trained deep neural network model may comprise an encoder neural network portion and a decoder neural network portion. The decoder neural network portion may comprise an atrous spatial pyramid pooling (ASPP) neural network portion. A trained deep neural network for generating a part-annotated 3D model of the vehicle may comprise multiple parameters (e.g., at least 10 million, at least 25 million, at least 50 million, or at least 100 million parameters) and their values may be used to identify vehicle parts in renderings of the vehicle.

In some embodiments, generating the part-annotated 3D model of the vehicle comprises: (1) generating multiple viewpoints; (2) generating, using the 3D model of the vehicle, multiple renderings of the vehicle corresponding to the multiple viewpoints; (3) identifying vehicle parts in the multiple renderings by using the trained deep neural network model; and (4) generating the part-annotated 3D model using the vehicle parts identified in the multiple renderings.

In some embodiments, the multiple renderings comprise a first rendering of the vehicle corresponding to a first viewpoint of the multiple viewpoints, the trained deep neural network model comprises a plurality of parameters, and identifying the vehicle parts comprises identifying vehicle parts in the first rendering of the vehicle by processing the first rendering with the trained deep neural network model, the processing comprising determining output of the trained deep neural network using the first rendering of the vehicle and values of the plurality of parameters.

In some embodiments, the information specifying portions of the vehicle to be imaged by the user specifies multiple parameters defining a view for each of one or more portions of the vehicle to be imaged by the user. For example, the multiple parameters for a particular portion of the vehicle to be imaged by the user may specify: one or more parts of the vehicle that should be fully visible in an image of the particular portion of the vehicle to be captured by the user, a part of the vehicle to in a center of the image, one or more parts of the vehicle to be highlighted in an overlay to be generated for guiding the user to capture the image, and/or one or more camera parameters to be used in capturing the image, the one or more camera parameters including a camera height, a camera pan angle, a focal length and/or field of view, and/or an aspect ratio.

In some embodiments, generating the overlays corresponding to the portions of the vehicle to be imaged by the user comprises: for each particular portion of the vehicle to be imaged and using the information specifying portions of the vehicle, (1) generating vehicle-specific camera parameters using the information specifying portions of the vehicle; (2) determining boundaries of one or more parts of the particular portion of the vehicle using the vehicle-specific camera parameters; and (3) generating an overlay based on the determined boundaries (e.g., by generating an initial overlay and smoothing the initial overlay to obtain the generated overlay, for example, by removing isolated curves and redundant curves from the initial overlay).

Another approach to standardizing the views of the vehicle to be captured, developed by the inventors, involves guiding the user to capture one or more video recordings of a vehicle. The inventors have recognized that conventional techniques for guiding users to capture video of a vehicle (e.g., a simple instruction such as walk around the vehicle and record a video of the vehicle) may be improved upon by providing the user with instructions and feedback during the recoding of the video. The instructions may include portions of the vehicle to video record and/or instructions on how to move and position the camera. Providing instructions and feedback to users during the video recording will ensure that relevant parts of the vehicle are properly captured in high quality video frames and that any parts of the video that do not satisfy image quality criteria are re-recorded and/or otherwise corrected.

Accordingly, some embodiments provide for a method for use in connection with guiding a user in capturing one or more videos of a vehicle with a mobile device. The method comprises: (A) obtaining a video of the vehicle recorded using a camera of the mobile device; (B) obtaining a plurality of video frames from the video of the vehicle (e.g., by extracting a subset of video frames from the video of the vehicle at a set sampling rate); (C) analyzing the plurality of video frames to identify one or more portions of the vehicle that the user is to video record using the mobile device, the analyzing comprising for each particular video frame of at least some of the plurality of video frames: (1) determining whether the particular video frame complies with one or more image quality criteria (e.g., a blurriness criterion, a vehicle position criterion, a vehicle size criterion); and (2) identifying at least one portion of the vehicle captured in the particular video frame; and (D) generating, based on results of the analyzing, instructions for guiding the user to video record the identified one or more portions of the vehicle that the user is to video record.

Subsequently, in some embodiments, the method may further include guiding the user to video record the identified one or more portions of the vehicle that the user is to video record by presenting the instructions for guiding the user to the user via a graphical user interface of the mobile device. In turn, at least a subset (e.g., some or all) of the at least some of the frames of the plurality frames may be analyzed to identify one or more vehicle defects. Results of this analysis may be made part of a vehicle condition report.

In some embodiments, determining whether the particular video frame complies with the one or more image quality criteria comprises: determining a level of blurriness within the particular video frame; and determining whether the level of blurriness complies with the blurriness criterion. Additionally, or alternatively, in some embodiments, determining whether the particular video frame complies with the one or more image quality criteria comprises: determining a size of the vehicle in the particular frame; determining whether the size of the vehicle complies with the vehicle size criterion; determining a location of the vehicle in the particular frame; and determining whether the location of the vehicle complies with the vehicle location criterion.

In some embodiments, identifying at least one portion of the vehicle captured in the particular video frame comprises identifying one or more parts of the vehicle within the particular frame.

In some embodiments, the method further comprises determining one or more points on the vehicle based on the one or more parts and determining a position of the mobile device based on the one or more points, receiving, a 3D model of the vehicle, and mapping the portion of the vehicle captured in the particular frame onto a corresponding portion of the 3D model, based on the determined position of the mobile device.

In some embodiments, analyzing the plurality of video frames to identify one or more portions of the vehicle that the user is to video record using the mobile device comprises determining portions of the 3D model which either have not been mapped to with portions of the vehicle captured in the at least some of the plurality of video frames, which have not been captured in the at least some of the plurality of video frames, or which have been captured in the at least some of the plurality of video frames and did not comply with the one or more image quality criteria.

In some embodiments, the method further comprises selecting a subset of frames of the at least some of the plurality of video frames based on the determined compliance of the video frames with the one or more image quality criteria and transmitting the selected subset to a server. In some embodiments, the server may be used to analyze at least some of the selected subset of frames to determine one or more vehicle defects within the at least some frames of the selected subset of frames.

As can be appreciated from the foregoing, the inventors have developed new techniques for providing users with instruction on capturing imagery (images and/or videos) of vehicles such that imagery of parts of interest of the vehicles are captured. Unlike conventional techniques, the techniques developed by the inventors ensure a vehicle is properly captured with high quality images and videos, which streamlines the imagery capture process and standardizes inputs to subsequent image analysis to determine vehicle condition (e.g., identification of vehicle defects) and facilitate the creation of more accurate vehicle condition reports.

It should be appreciated that the techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1A shows an illustrative environment 100 in which a vehicle analysis system may operate, in accordance with some embodiments of the technology described herein. The environment 100 includes vehicle 101, mobile device 110, servers 130 and third parties 140.

The mobile device 110 may be any suitable mobile device with a camera, including, but not limited to a cell phone, a tablet, and a digital camera.

The mobile device 110 may be configured to provide a user with instructions to properly capture images and/or videos of the vehicle 101. The server 120 and/or the mobile device 110 may analyze vehicle images or videos. The analysis of the images or videos may result in the generation of a vehicle condition report 132. A vehicle condition report may be provided to users and/or third parties after the capture and analysis of images or videos of a vehicle. The vehicle condition report may include information related to detected damage on a vehicle, such as a location and severity of damage.

The mobile device 110 may include camera display 111, which shows a current view of the camera of the mobile device. The mobile device 110 may also include image capture guidance software 120 which provides users with instructions 121 on how to capture images and/or videos of the vehicle.

Instructions 121 may be shown on a display of mobile device 110 and may include information on where to position the camera relative to the vehicle. For example, instructions may include a particular position for a user to move to, a height to move the camera to, an angle to tilt the camera at, an angle to move the camera to, and an orientation to move the camera to. Instructions 121 may additionally include how a user is to move the mobile device 110, for example a speed at which to move the device at. Instructions 121 may also indicate how a user should align the vehicle in camera display 111 with a vehicle overlay.

Instructions 121 may be displayed on the mobile device 110 in multiple ways. In some examples, the instructions may be displayed as text, as shown in FIG. 1A. In some examples, the instructions may be displayed as icons, such as arrows and lines. In some examples, a model of a vehicle may be shown with a particular portion highlighted for a user to capture. In some examples a combination of these instructions may be used, such as text and icons, vehicle models and text, icons and vehicle models, or text, icons, and vehicle models.

In FIG. 1A, the mobile device 110 is shown at three different positions, P1, P2 and P3, around the vehicle 101. At position P1, a view of the front left portion of the vehicle is captured at the mobile device 110. Image capture and guidance software may determine the captured image is of sufficient quality and instruct the user to move right to position P2 with instructions 121A. The quality of the captured image may be determined based on one or more of an alignment of the vehicle with an overlay, a level of blurriness of the vehicle, a position of the vehicle, and a size of the vehicle, among other properties of an image as discussed herein. In some embodiments, the image capture guidance software 120 may analyze the camera display 111 and automatically capture an image when the current image on the camera display is of a sufficient quality.

At position P2, a left side view of the vehicle 101 is captured, and instructions 121B to move right to position P3 are provided. At position P3, a view of the left rear portion of the vehicle 101 is captured. Image capture guidance software 120 may provide instructions 121C to continue capturing images and/or video of the vehicle.

At position P3, the mobile device 110 is shown transmitting vehicle images 103 to server 130. Vehicle images 103 may be transferred to server 130 at different times during the capturing process. In some examples, vehicle images 103 may be transferred after the final image is captured. In some examples, vehicle images may be transferred to server 130 immediately after they are captured. In some examples, vehicle images 103 may be transferred according to a schedule, for example after every 4 images vehicle images 103 are transferred. In some examples, vehicle images may be transferred based on network bandwidth availability.

Server(s) 130 may include image analysis software 131 which analyzes vehicle images 103 as they are received. In some examples, image analysis software 131 may request additional images of specific portions of the vehicle be captured based on the received images. The image analysis software 131 may analyze the vehicle images 103 to determine the condition of the portions of the vehicle captured. The image analysis software 131 may generate a vehicle condition report 132, as discussed herein, based on the vehicle images 103.

In some embodiments, the vehicle condition report may contain information on identified areas of the vehicle having defects such as damage, irregularities, or which warrant further examination. The condition report may contain information on areas of the vehicle having defects within the interior of the vehicle and on the exterior of the vehicle. In some examples, the vehicle condition report may include images of the vehicle with areas having defects highlighted with visual indicators. In some examples, the vehicle condition report may include a written description of the areas of the vehicle having defects. In some examples, the vehicle condition report may contain one or more scores related to the condition of the vehicle. In some examples, the vehicle condition report may contain information on work and/or repairs to be performed on the vehicle, including: operations to be performed on the vehicle, vehicle parts required for the work and/or repairs, an estimation of work and/or repair costs, and an estimation of work and/or repair times. In some examples, the estimation of work and/or repair costs are determined based on the operations to be performed on the vehicle, the vehicle parts required, the prices for required vehicle parts, and the labor costs for the operations to be performed.

The vehicle condition report may be sent to mobile device 110 and third parties 140, where it may be analyzed by one or more of users, sellers, or buyers of vehicles. Third parties may include, but are not limited to, one or more of websites for listing information, databases for storage, and individual digital devices for analysis.

In some embodiments, the server(s) 130 may request one or more images be captured by the user based on the received vehicle images 103. For example, if one or more of the vehicle images are not of a sufficient quality, the server(s) 130 may request new images be taken by the user. In some examples, the server may identify one or more portions of the vehicle which may have damage present and may request additional images of these portions of the vehicle to further analyze the damage. The server(s) 130 may also request images be captured of portions of the vehicle which were not captured in the received vehicle images 103. The image capture guidance software 120 may provide instructions 121 to capture images and/or videos of the vehicle corresponding to the portions requested by the server(s) 130.

Figure 1B:
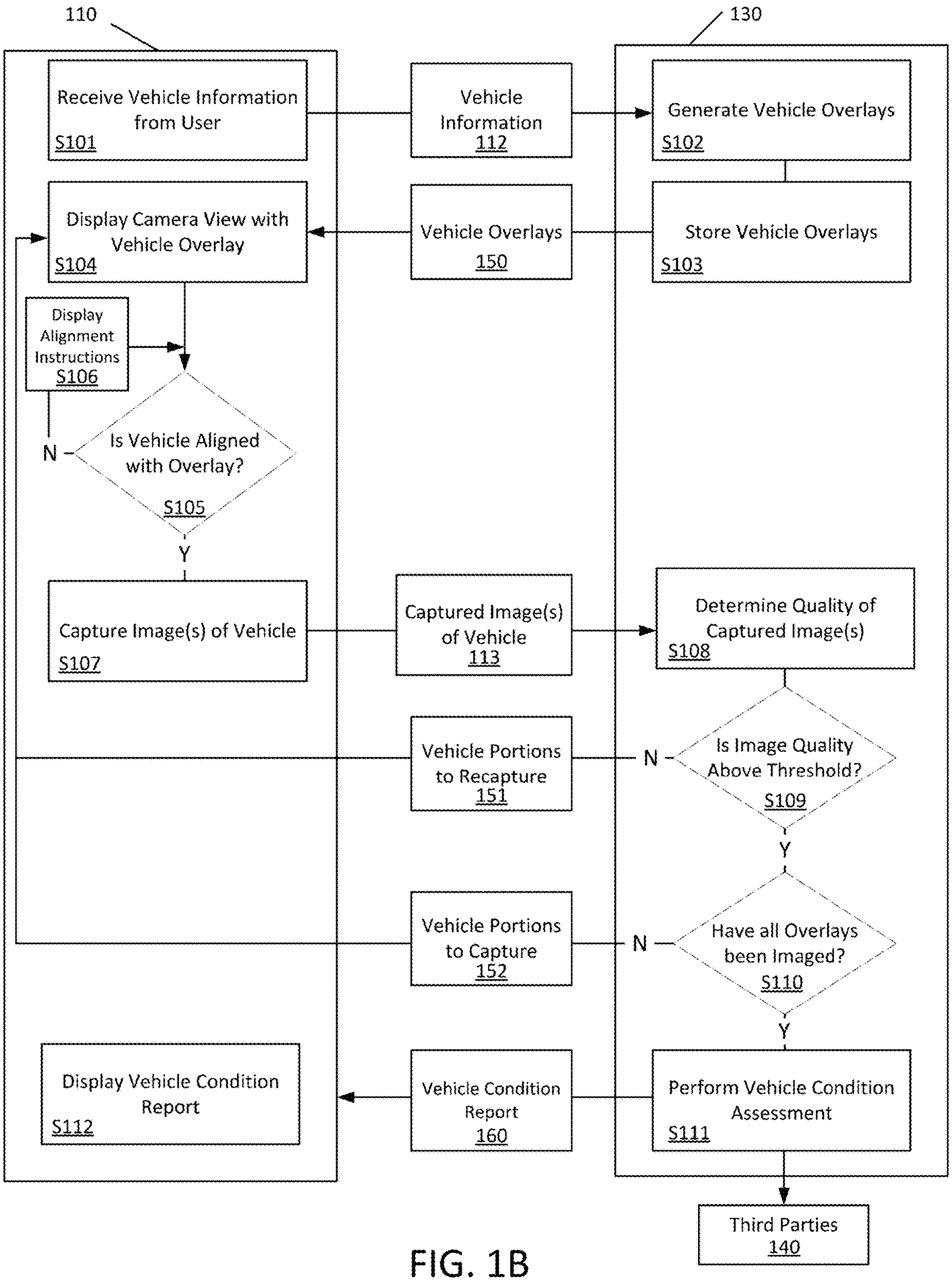
FIG. 1B illustrates an example process for capturing and analyzing vehicle images, in accordance with some embodiments of the technology described herein.
Figure 1C:
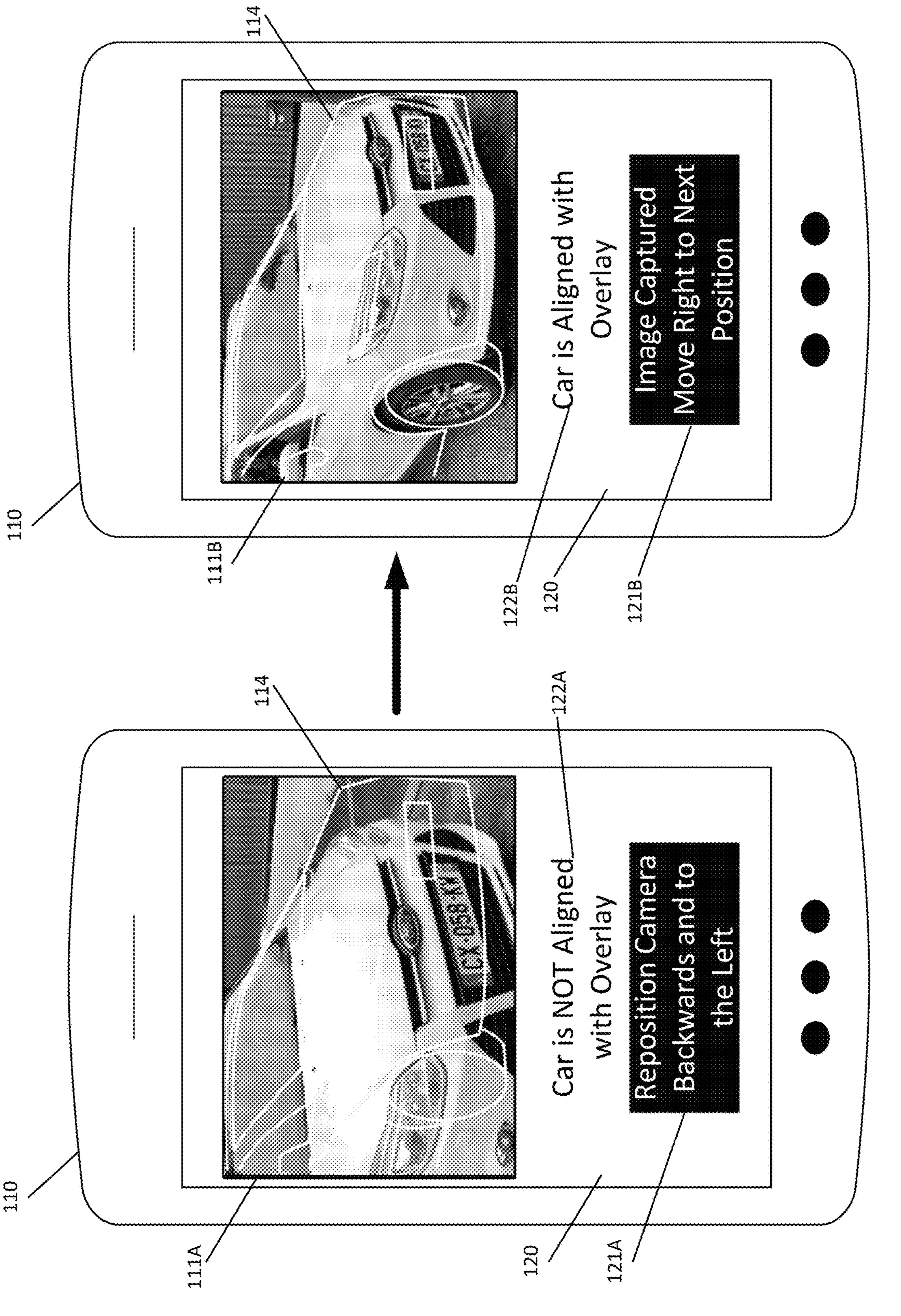
FIG. 1C illustrates example displays of the mobile device during the process of capturing and analyzing vehicle images, in accordance with some embodiments of the technology described herein.

FIG. 1B illustrates an example process for capturing and analyzing vehicle images, in accordance with some embodiments of the technology described herein. Shown in FIG. 1B are mobile device 110 and server(s) 130. In addition, multiple data transmitted between mobile device 110 and server(s) 130 and steps performed within the mobile device 110 and server(s) 130 are shown.

The process begins a step S101 in which the mobile device receives vehicle information from the user. The vehicle information may include any suitable information, including, but not limited to a make of the vehicle, a model of the vehicle, a model year of the vehicle, a trim level of the vehicle, and a VIN of the vehicle. The vehicle information 112 is then transmitted to the server(s) 130.

The server(s) 130 may then generate vehicle overlays 150 based on the vehicle overlays 112, in step S102. The vehicle overlays may be generated by obtaining a 3D model of the vehicle, corresponding to the received vehicle information, and processing the 3D model as discussed with relation to FIGS. 3-6 to generate the corresponding vehicle overlays.

After the vehicle overlays 150 are generated, they may be stored within the server 130 in step S103. In some examples, the server 130 maintains multiple sets of overlays corresponding to particular vehicles. In such examples, the server 130 may receive vehicle information 112 and retrieve a corresponding set of vehicle overlays from storage. In some examples, such as that shown the vehicle overlays may be generated in response to receiving vehicle information 112. In some examples, the server 130 may analyze stored vehicle overlays and if a set of vehicle overlays corresponding to received vehicle information 112 is not available, the server 130 may generate the corresponding vehicle overlays.

In some examples, server(s) 130 may not be able to generate overlays for a particular vehicle. This may occur if a 3D model of the vehicle is not available to the server. In such examples, the server may generate or retrieve from storage corresponding to a general vehicle. In some examples the server may maintain a set of general vehicle overlays for multiple types of vehicles including, but not limited to a sedan, a coupe, a sports car, a crossover, a full-size car, a sports utility vehicle, a pickup truck, and a compact car. The server 130 may provide the general vehicle overlays corresponding to a vehicle type determined from the vehicle information 112 to the mobile device 110.

The mobile device 110 may receive the vehicle overlays 150 and may begin instructing users to capture images of the vehicle. The following steps performed within the mobile device may be performed by the image capture guidance software, as discussed herein.

After receiving the vehicle overlays 150, the mobile device 110 may perform step S104, in which a camera view is displayed with a vehicle overlay from the received vehicle overlays 150. The user may then receive instructions to align the overlay of the vehicle with the current view of the vehicle in the displayed camera view.

The mobile device may analyze the alignment of the overlay with the current view of the vehicle in step S105.

The mobile device may perform image analysis to determine the alignment of the overlay with the view of the vehicle in step S105. If the view of the vehicle is not aligned with the overlay, the mobile device may display alignment instructions to the user in step S106. These alignment instructions may be displayed as text, icons, or any suitable instructions, as discussed herein. After alignment instructions are displayed in step S106, the process may return to step S105, in which the alignment of the vehicle with the displayed vehicle overlay is checked.

In step S105, if the view of the vehicle is aligned with the displayed vehicle overlay, the mobile device may capture an image of the vehicle in step S107. In some embodiments, the mobile device may automatically capture the image of the vehicle when it is determined the view of the vehicle is aligned with the displayed vehicle overlay. In some embodiments, the mobile device may provide instructions to the user to capture the image, after which the user may provide an input to the mobile device to capture the image.

In some embodiments, steps S105 and 107 may be performed by the user. In step S105, the user may determine an alignment of the vehicle with the overlay, based on the displayed camera view and overlay. The user may perform step S107, when after determining in step S105 the view of the vehicle is aligned with the overlay, by providing an input to the mobile device to capture an image of the vehicle.

In some embodiments, after the image of the vehicle is captured, the mobile device may return to step S104, and display a new vehicle overlay corresponding to a view of the vehicle to be captured. The mobile device may repeat steps S104-S107 until the received vehicle overlays 150 are captured.

After step S107 is performed, captured images of the vehicle 113 are transmitted to the server(s) 130. As discussed herein, the captured images of the vehicle may be transmitted to the server(s) 130 after each image is captured, according to a schedule, according to network bandwidth availability or after all images have been captured.

After receiving the captured images of the vehicle 113, the server 130 may determine the quality of the captured images in step S108 by analyzing one or more factors of the images. The one or more factors may include a blurriness of the captured image, an alignment of the image with an overlay, a position of the vehicle within the image, a size of the vehicle within the image, a level of obstruction of the vehicle, among other factors.

In step S109, the server may determine if the determined image quality is above a threshold quality. If the image quality is not above the threshold quality, the server 130 may transmit one or vehicle portions 151 to the mobile device to recapture. In some examples, the vehicle portions to recapture 151 may be indicative of vehicle overlays which should be used to recapture images of portions of the vehicle. If the determined image quality is above the threshold quality, the server 130 may then check to see if images corresponding to all overlays, above the quality threshold, have been received in step S110.

In step S110, the server determines if all overlays have been imaged, with images above the threshold quality. The capturing of all overlays may indicate the entire vehicle has been imaged. If it is determined in step S110 images corresponding to all overlays have not been received, the server may send one or more vehicle portions to capture 152 to the mobile device. In some examples, the vehicle portions to capture 152 may be indicative of vehicle overlays which should be used to capture corresponding images of the portions of the vehicle which have not been captured, as determined in step S110.

The mobile device may then repeat steps S104-S107 with the vehicle overlays corresponding to the vehicle portions to recapture 151 and vehicle portions to capture 152.

In some examples the server may operate with one or more rules which control the amount of vehicle portions to recapture 151 and vehicle portions to capture 152 which are sent during the capturing of images and/or video of vehicles. In some examples, the server may have a threshold number of vehicle portions to recapture 151 and/or vehicle portions to capture 152 which can be sent. If the threshold number is exceeded, vehicle portions to recapture 151 and/or vehicle portions to capture 152 may no longer be sent and the process may continue to perform vehicle condition assessment in step S111. In some examples, the server may have a set amount of time to complete the capturing of images and/or videos of the vehicle, after which vehicle portions to recapture 151 and/or vehicle portions to capture 152 which are no longer sent, and the process proceeds to perform vehicle condition assessment in step S111.

If it is determined in step S110, that images corresponding to all overlays, above the threshold quality have been received, the server may then perform vehicle condition assessment in step S111.

Step S111 may involve performing one or more image analysis processes on the received images in order to generate vehicle condition report 160. The one or more image analysis processes may be to identify one or more defects within the captured images of the vehicle. The one or more defects may include defects with the interior and exterior of the vehicle. Non-limiting examples of defects with the interior of the vehicle may include stained upholstery, scratches to interior, dents to interior, missing parts of interior, and poor cleanliness of interior, among other defects. Non-limiting defects to the exterior of the vehicle may include scratches to any part of the exterior of the vehicle; cracked windows, mirrors, or windshields; chipped paint; dents to the exterior of the vehicle; misaligned body panels; missing vehicle parts, non-standard replacement parts, non-standard paint, and aftermarket vehicle accessories; among other defects. In some embodiments, the server 130, may utilize one or more trained machine learning models when analyzing the one or more images to determine the condition of the vehicle.

The vehicle condition report 160 may be transmitted to the mobile device 110 and third parties 140, as discussed herein. The mobile device may display the vehicle condition report in step S112 for analysis by the user.

FIG. 1C illustrates example displays of the mobile device during the process of capturing and analyzing vehicle images, in accordance with some embodiments of the technology described herein. A first view of the mobile device 110 is shown on the left of FIG. 1C. In this first view, camera display 111A is shown with overlay 114 over the view of the camera. Overlay 114 may be generated by and received from one or more servers, as discussed herein. As shown, the vehicle in camera view 111A is not properly aligned with the overlay 114. In the shown camera view 111A, the vehicle is too close to the camera and the vehicle is not properly angled.

Based on this positioning of the vehicle within camera view 111A with respect to the overlay 114, image capture guidance software 120 may display an alignment state 122A conveying that the vehicle is not aligned with the overlay. This may signal to the user that adjustments may be needed to capture a proper image of the vehicle. The image capture guidance software may perform processing of the camera view 111 to determine the alignment of the vehicle with the overlay 114, as discussed herein.

Image capture guidance software 120 may provide instructions 121 to the user. Instructions 121 may include information on how the user should position the camera in order to capture a proper image of the vehicle. As shown, instructions 121A explain the user should move the camera backwards and to the left in order to align the vehicle with the overlay 114.

The view of mobile device 110 shown on the right of the figure illustrates a display of the mobile device when the view of the vehicle 111B is aligned with the overlay 114. As can be seen, the exterior outline of the overlay follows that of the vehicle, the wheels of both the vehicle and overlay are aligned, the windshield is aligned, and other vehicle parts are aligned with corresponding parts of the overlay 114. This alignment of the vehicle with the overlay 114 ensures all parts of the vehicle within the corresponding view of the vehicle are visible and the captured image is therefore better suited for condition analysis.

The image capture guidance software 120 may display an alignment state 122B indicating the vehicle is properly aligned with the overlay. In addition, the image capture guidance software 120 may display instructions 121B indicating an image of the vehicle has been captured and to move to the next position. As discussed herein, the images of the vehicle may be captured automatically or via a user input. After an image of the vehicle is captured, a new overlay may be displayed over the camera view and new instructions for alignment 121 may be provided.

Figure 2:
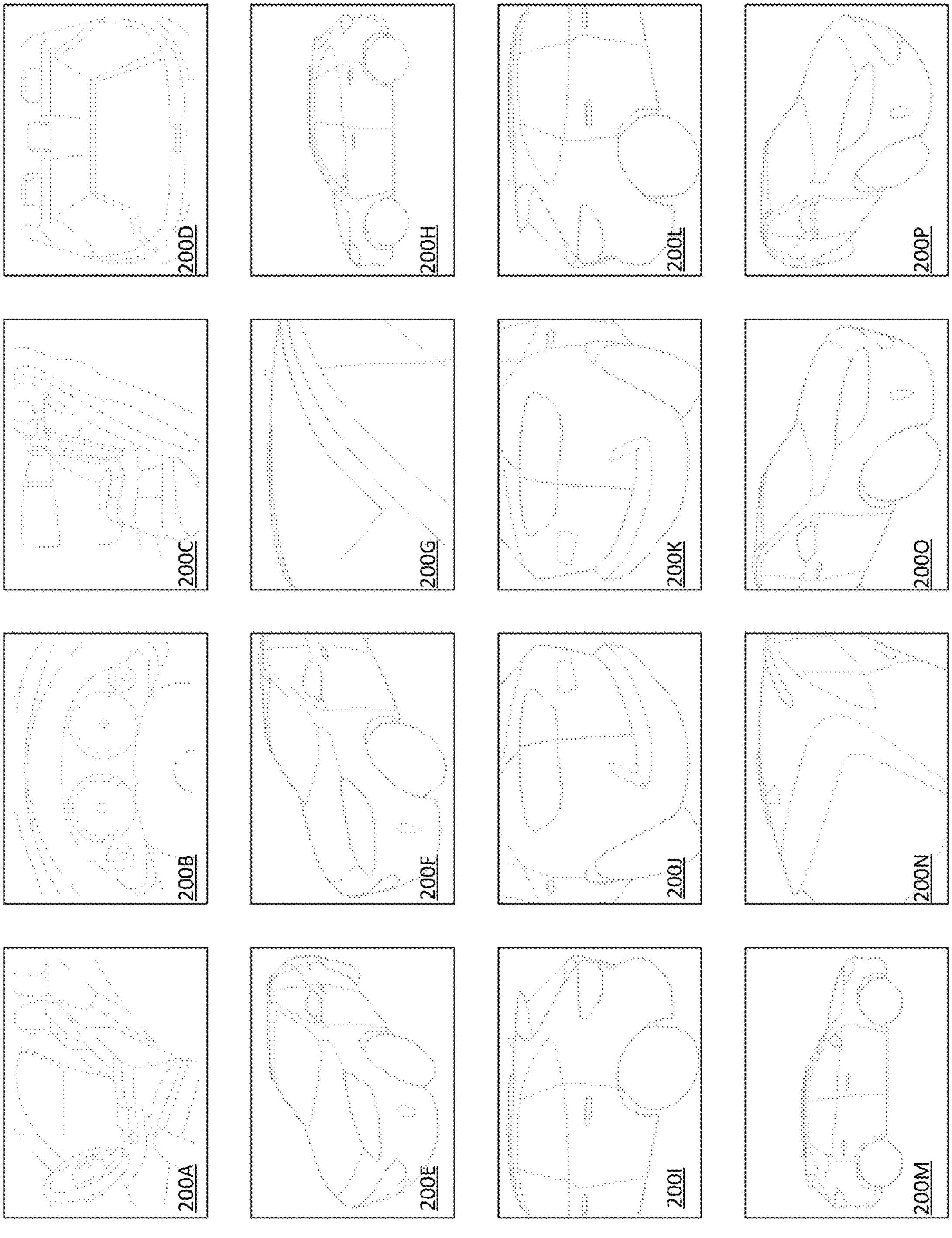
FIG. 2 illustrates a set of vehicle overlays for a particular vehicle, in accordance with some embodiments of the technology described herein.

FIG. 2 illustrates a set of vehicle overlays for a particular vehicle, in accordance with some embodiments of the technology described herein. Shown are vehicle overlays 200A-P which correspond to different portions of a crossover vehicle. These vehicle overlays may be generated by a server and used to instruct the user in capturing images of the vehicle, as discussed herein. In some embodiments a larger or smaller number of vehicle overlays may be generated or used to capture images of the vehicle.

The portions of the vehicle in each overlay may additionally be selected to correspond with multiple general of a vehicle to image, as discussed herein. These general portions may be predetermined portions of the vehicle which correspond to different views of the vehicle which are essential to analyze to determine the condition of the vehicle. These general portions may be used to generate overlays for all vehicles, and therefore sets of overlays for different vehicles may contain overlays adapted to a particular vehicle which correspond to the same general portions of the vehicle to image.

Overlays 200A-D correspond to the interior of the vehicle. Overlay 200A is of the front seats of the vehicle as seen through the driver's side front door. Overlay 200B is of the gauge cluster and steering wheel of the vehicle. Overlay 200C is of the rear seats of the vehicle as seen through the driver's side rear door. Overlay 200D is of the trunk of the vehicle. Overlays corresponding to the interior of the vehicle may not be generated in the same manner as overlays corresponding to the exterior of the vehicle. For example, general overlays of the interior of the vehicle may be maintained by the server and may not be specific to a particular vehicle, while overlays of the exterior of the vehicle may be generated for individual vehicles.

Overlays 200E-P correspond to portions of the exterior of the vehicle. Exterior portions of the vehicle may be selected to determine all parts of the vehicle are captured in images corresponding to the overlays. Some parts of the vehicle are captured in multiple overlays in order to provide a complete view of the part and to account for any distortion of the part in some images which may result from glare or reflections. Capturing parts in multiple overlays allows for an improved and more complete analysis of the vehicle condition.

Overlay 200E corresponds to a portion of the vehicle visible from the front left side of the vehicle. Each overlay may require certain parts be visible, and the portion of 200E may require the grill, hood, left headlight, left wheels, left doors, left windows, bumper, left fender and windshield be visible. Each overlay may require a particular vehicle part be at the center of the overlay. Overlay 200E may have the left fender as the central part.

Overlay 200F corresponds to a view of the front left portion of the vehicle. Many parts of overlay 200F are also visible in overlay 200E, including the left headlight, grill, hood, front left wheel, front left door, front left window, and the windshield. As discussed herein, capturing images of parts of vehicle from multiple viewpoints allow for improved image analysis.

Overlay 200G, corresponds to a portion of the vehicle including the roof of the vehicle visible from the front left side of the vehicle. Overlay 200H is a portion of the left side of the vehicle. Overlay 200I corresponds to the rear left portion of the vehicle. Overlay 200J corresponds to the rear portion of the vehicle on the left side of the vehicle.

The overlays for one side of the vehicle may have corresponding overlays for the opposite side of the vehicle. For example, overlays 200E-J are from the left side of the vehicle and overlays 200K-P are from the right side of the vehicle with some overlays corresponding to portions opposite those of overlays 200E-J.

Overlay 200K corresponds to the rear portion of the vehicle on the right side of the vehicle and corresponds to a portion of the vehicle opposite that of 200J. Overlay 200L corresponds to the rear right portion of the vehicle. Overlay 200M corresponds to the right side of the vehicle. Overlay 200N corresponds to a portion including the roof of the vehicle viewed from the rear of the vehicle. Overlay 200O corresponds to the front right portion of the vehicle. Overlay 200P corresponds to a portion of the vehicle visible from the front right side of the vehicle.

Figure 3A:
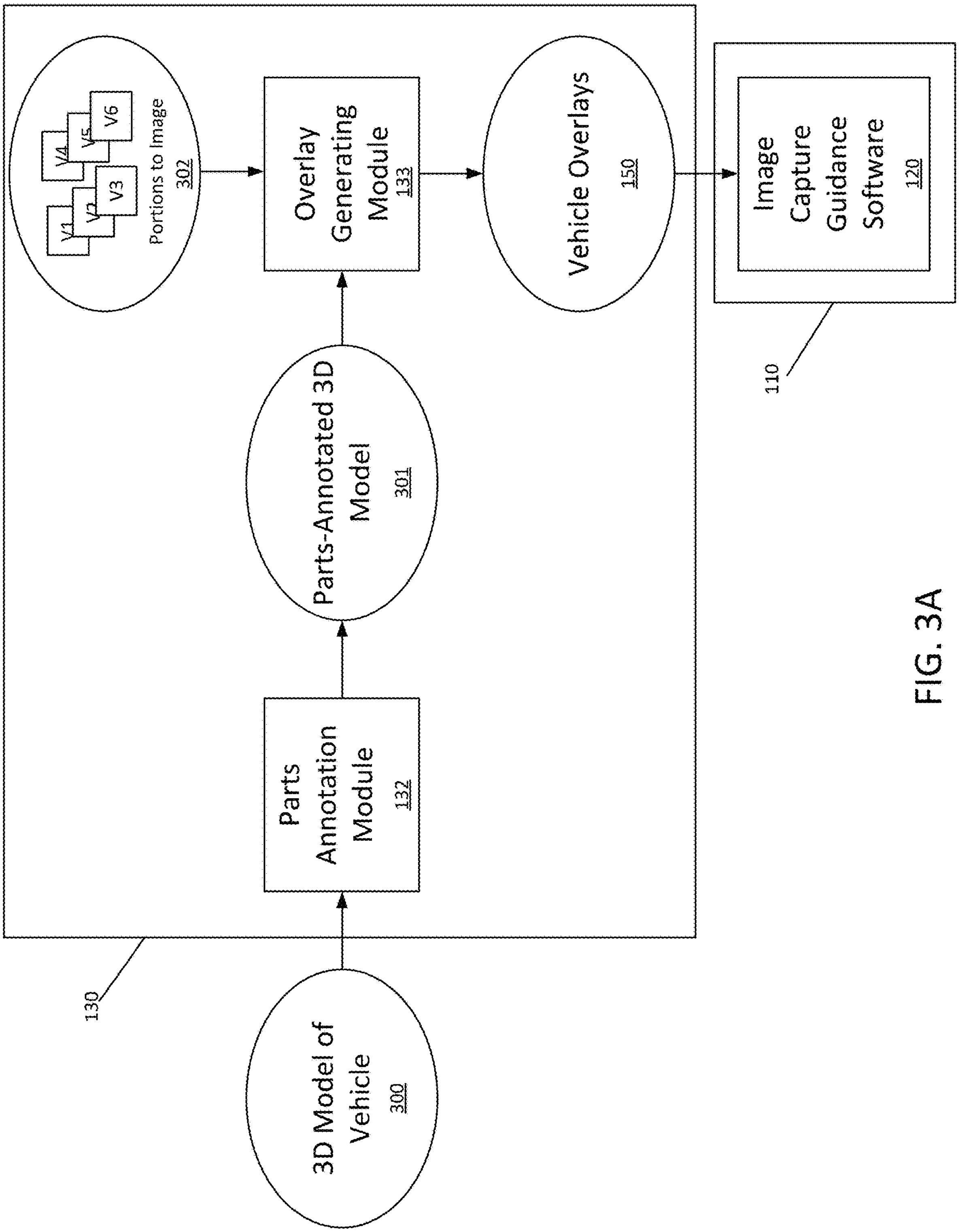
FIG. 3A illustrates a process flow for the generation of vehicle overlays, in accordance with some embodiments of the technology described herein.

FIG. 3A illustrates a process flow for the generation of vehicle overlays, in accordance with some embodiments of the technology described herein. Shown in FIG. 3 are modules within server(s) 130 and mobile device 110, as well as data which may be transferred to and from these modules.

Server 130 includes multiple modules such as parts annotation module 132, and overlay generating module 133. Parts annotation module 132 may receive a 3D model 300 of a vehicle which is analyzed to generate a parts-annotated 3D model 301. The 3D model 300 of the vehicle may be received from any external source including, but not limited to, the internet, or a database. The 3D model 300 may have any suitable format including, but not limited to: OBJ files, STEP files, STL files, eDrawings files, SOLIDWORKS files, CALS files, Autodesk Inventor files, CATIA files, IGES files, Parasolid files, Solid Edge files, Pro/Engineer files, ACIS Sat files, JT files, NX files, and DXF/DWG files. An example 3D model 300 of a vehicle can be seen in FIG. 3B. The parts annotated 3D model 301 may be generated as discussed in relation to FIG. 5. An example of the parts-annotated 3D model can be seen in FIG. 3C.

The parts annotated 3D model 301 may be passed to overlay generating module 133, which generates vehicle overlays 150. As discussed herein, each vehicle overlay may correspond to a particular portion of the vehicle which should be captured. The server 130 may maintain portions to image 302, which include information on the portions of the vehicle to be captured. Information on portions of a vehicle to image may include parts of the vehicle which must be captured, a part to be at the center of an image or video, a position from which the vehicle should be captured, a tilt angle at which the vehicle should be captured, a pan angle at which the vehicle should be captured, a distance from which the vehicle should be captured, a height at which the vehicle should be captured from, among other information.

The overlay generating module 133 may generate a corresponding vehicle overlay for each portion of the vehicle of the portions to image 302. The overlay generating module 133 may use this information on the portion of the vehicle to image 302 to ensure that when a vehicle within a camera view is aligned with an overlay, information on the portion of the vehicle to be imaged is captured within the image. After vehicle overlays 150 are generated, they may be transferred to the image capture and guidance software 120 of the mobile device 110, where they may be used in guiding a user in capturing images of a vehicle, as discussed herein.

Figure 3B:
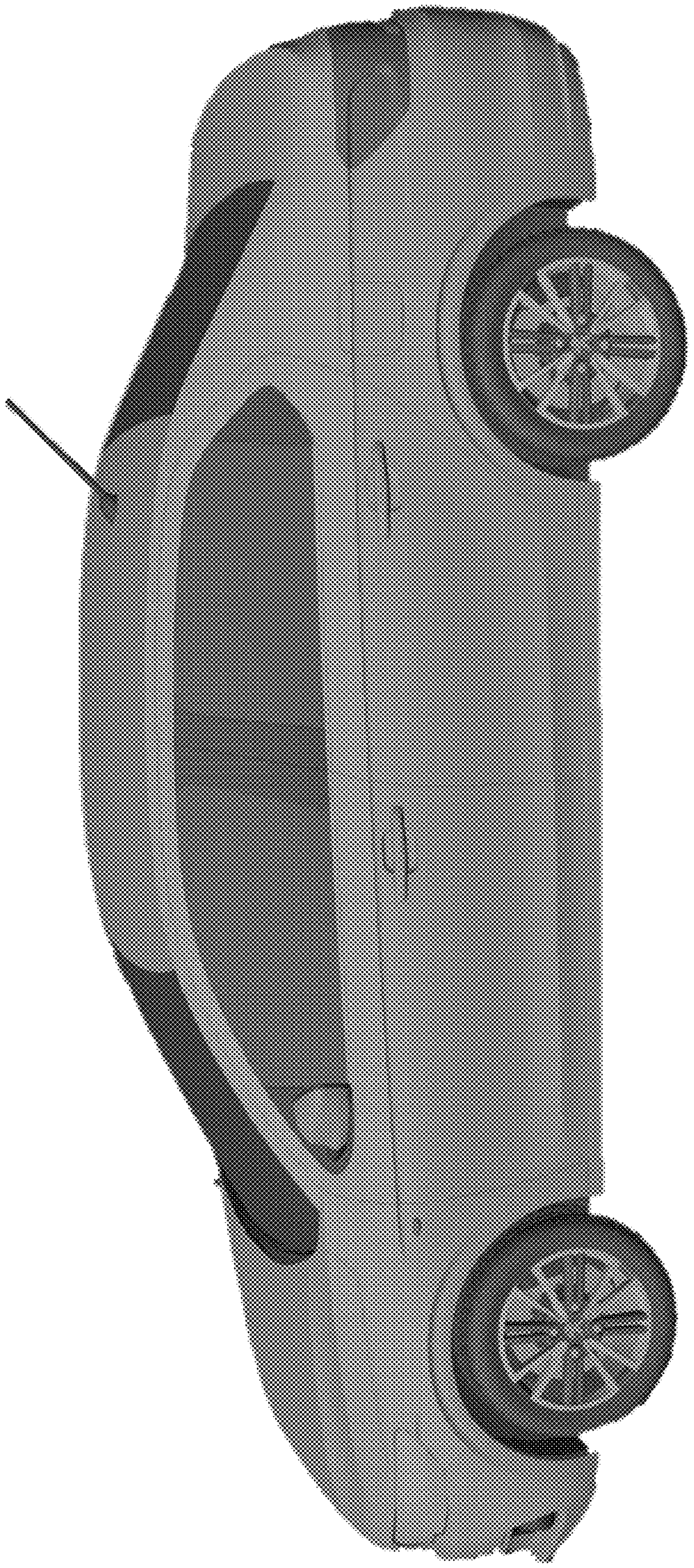
FIG. 3B provides a view of an example 3D model of a vehicle, in accordance with some embodiments of the technology described herein.

FIG. 3B provides a view of an example 3D model of a vehicle, in accordance with some embodiments of the present disclosure. As shown in FIG. 3B the 3D model 300 of the vehicle includes details on all parts of the exterior of the vehicle, including but not limited to, body panels, windows, wheels, brakes, headlights, and taillights among other vehicle parts.

Figure 3C:
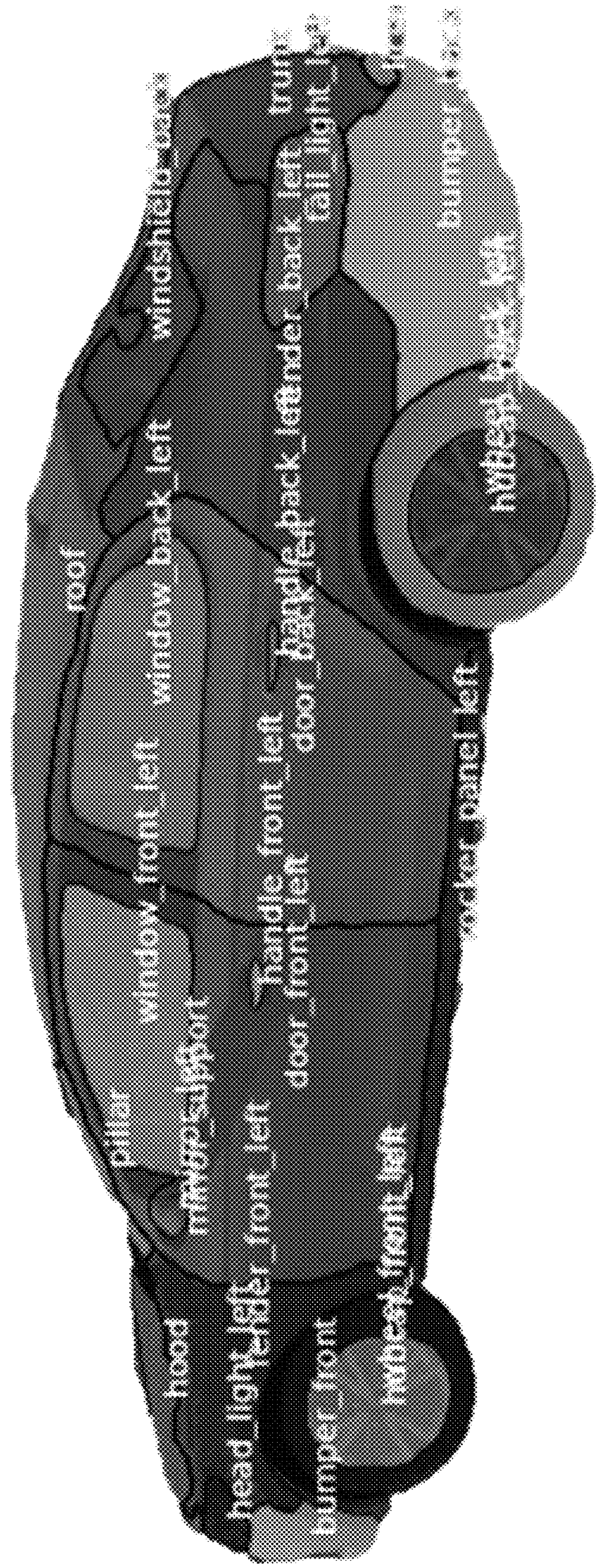
FIG. 3C provides a view of an example parts-annotated 3D model of a vehicle, in accordance with some embodiments of the technology described herein.

FIG. 3C provides a view of an example parts-annotated 3D model of a vehicle, in accordance with some embodiments of the present disclosure. A parts-annotated 3D model may include a 3D model of a vehicle with a parts texture applied to the model. The parts texture may include the borders of parts at their corresponding locations on the vehicle, such that when applied to the 3D model, each part is outlined.

The parts of the vehicle as discussed herein, may include specific pieces of bodywork, specific functional vehicle pieces, and interior features of vehicles, among other vehicle pieces and features. Non-limiting examples of vehicle parts may include, but are not limited to a back bumper, a front bumper, a vehicle interior, vehicle doors, rear fenders, front fenders, front fog lights, rear fog lights, a grill, a lower grill, a radiator grill, door handles, headlights, a hood, a hook, hubcaps, a front license plate, a rear license plate, a vehicle logo, vehicle badges, mirrors, mirror supports, vehicle pillars, an A pillar, a B pillar, a C pillar, a D pillar, quarter windows, a rear spoiler, rocker panels, a roof, a trunk, front turn signals, rear turn signals, wheels, windows, a front windshield, a rear windshield, front wipers, and rear wipers.

As shown in FIG. 3C, the hood, left headlight, front left fender, front bumper, pillar, left mirror, mirror support, front left wheel, front left hub, front left door, front left handle, front left window, back left window, back left door, back left handle, left rocker panel, roof, back left handle, left taillight, back left wheel, back left hub, back left fender, back bumper, back windshield, and trunk are all visible, outlined and labeled in the parts-annotated 3D model 302. In parts-annotated 3D model 302, other parts of the vehicle, not visible in the current view may be labeled.

Figure 3D:
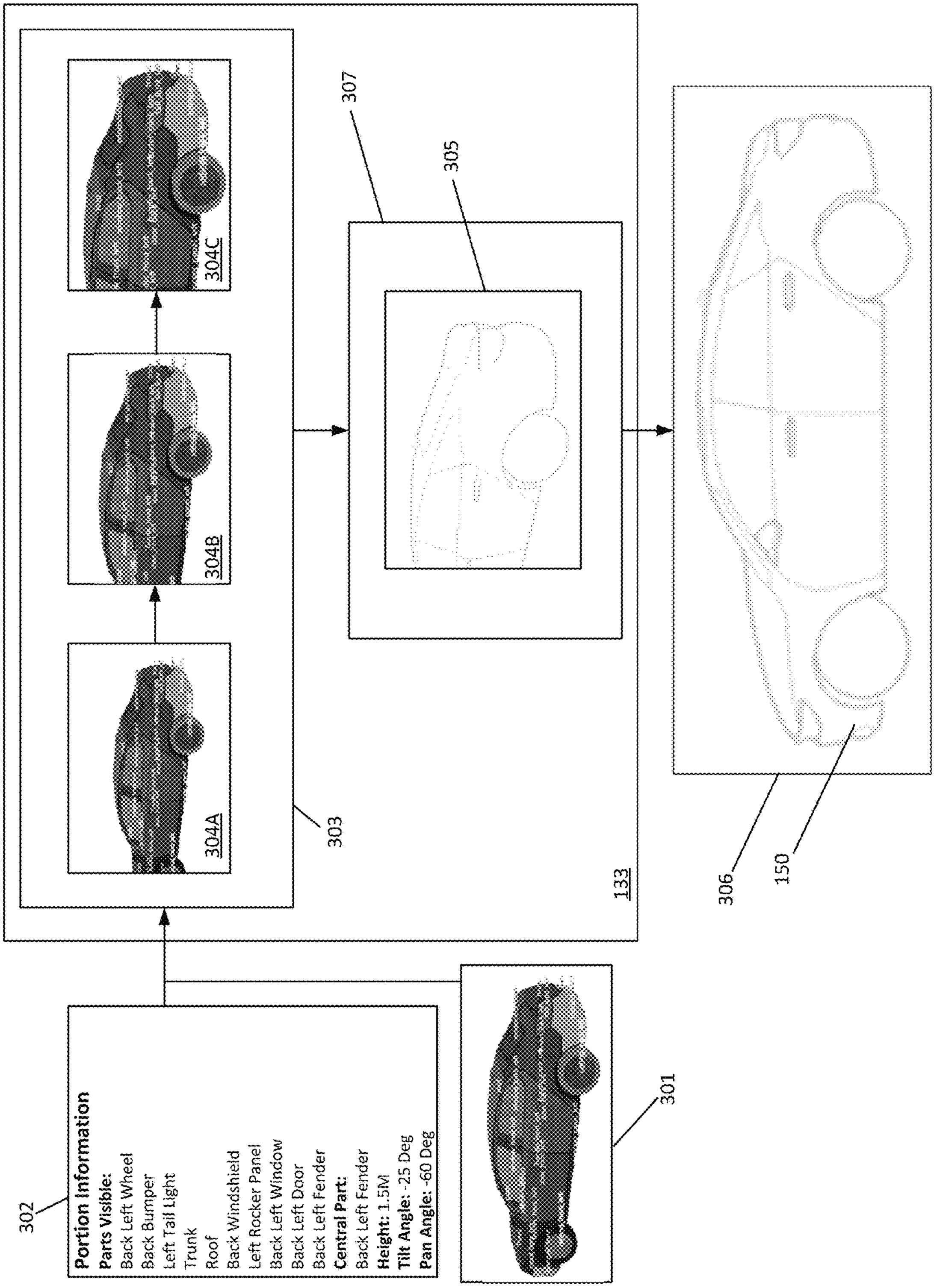
FIG. 3D provides an example process flow for generating overlays, in accordance with some embodiments of technology described herein.

FIG. 3D provides an example process flow for generating overlays, in accordance with some embodiments of technology described herein. Shown in FIG. 3D are inputs to the overlay generating module 133, which include information on a portion of the vehicle to be imaged 302, and the parts-annotated 3D model 301 of the vehicle.

The example of FIG. 3D illustrates a single wireframe being generated for a rear left portion of the vehicle. As shown, the portion of the vehicle to be imaged should include the back left wheel, back bumper, left taillight, trunk, roof, back windshield, left rocker panel, back left window, back left door, and back left fender of the vehicle. The back left fender should be the central part of the generated overlay and the camera position should be at a height of 1.5 m with a tilt angle of −25 degrees and a pan angle of −60 degrees.

The portion information 302 and parts-annotated 3D model 301 may be passed to a vehicle-specific camera parameters module 303 within the overlay generation module 133. The vehicle-specific camera parameters module 303 may generate vehicle-specific camera parameters based on the parts-annotated 3D model which corresponds to a portion of the vehicle to be imaged specified by the portion information 302. The vehicle-specific camera parameters output from the vehicle-specific camera parameters module 302 may represent a camera position at which a realistic view of the vehicle depicted in parts-annotated 3D model 301 may be captured by a user with a mobile device, as discussed herein.

This is shown by views 304A-C, each of which is made using different vehicle-specific camera parameters. In some examples, the portion of the first view of the parts-annotated 3d model 301 generated by the vehicle-specific camera parameters module 303 may not fill the entirety of the view. In some examples, such as that shown, the vehicle-specific camera parameters module 303 may generate additional views of the parts annotated 3d model 301 until the portion of the view having the parts annotated 3d model 301 covers a threshold amount of the view. As shown, the portion of views 304A and 304B covered by the parts-annotated 3D model may not be above the threshold amount, while the portion covered by the parts-annotated 3D model is above the threshold amount in view 304C. It may be determined whether the parts-annotated 3D model covers the threshold amount by determining an area of the view covered by the parts-annotated 3D model and comparing this to a threshold area. If the area of the parts-annotated 3D model is below the threshold, a subsequent set vehicle-specific camera parameters may be generated by moving the camera position closer to the parts-annotated 3D model. If the area of the parts-annotated 3D model is above the threshold, the associated vehicle-specific camera parameters may be passed to overlay generator 307. Therefore, the vehicle-specific camera parameters associated with view 304 C may be sent to overlay generator 307, where the corresponding vehicle overlay is generated based on view 304C.

The overlay generator 307 may generate an overlay 305 which corresponds to view 304C. The overlay generation module 133 may repeat this process for all portions of the vehicle to be imaged, resulting in a set of vehicle overlays 150 corresponding to the parts-annotated 3D model 301. These overlays may be transferred to storage 306 where they are maintained for use in capturing images of vehicles.

The overlay generator 307 may generate vehicle overlays 150 based on the received vehicle-specific camera parameters. Each overlay of overlays 150 may be associated with a particular set of vehicle-specific camera parameters, such that when the overlay is displayed to a user the user may replicate the vehicle-specific camera parameters with respect to the vehicle, resulting in the overlay aligning with the vehicle.

Figure 4A:
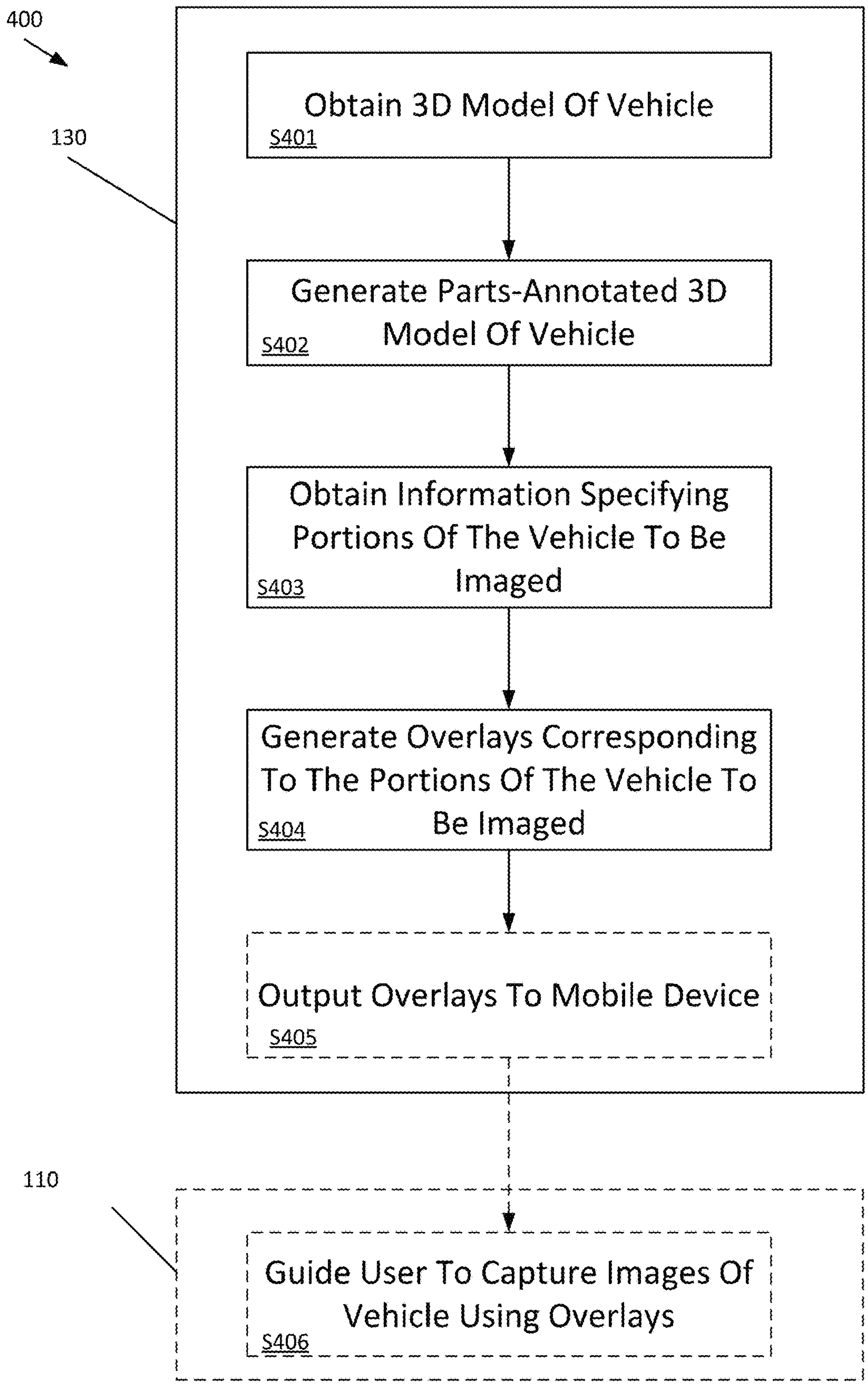
FIG. 4A illustrates an example process for generating vehicle overlays, in accordance with some embodiments of the technology described herein.

FIG. 4A illustrates an example process for generating vehicle overlays, in accordance with some embodiments of the technology described herein. Process 400 includes steps performed within server 130 and mobile device 110.

Process 400 begins at step S401, in which a 3D model of the vehicle is obtained. As discussed herein, the 3D model may be any suitable format and may be obtained from external sources.

The process then proceeds to step S402, in which the parts-annotated 3D model is generated. The parts-annotated 3D model may be generated based on the 3D model of the vehicle, as discussed in relation to FIGS. 3 and 5.

Process 400 then proceeds to step S403, in which information specifying the portion of the vehicle to be imaged is obtained. The information on portions of the vehicle to be imaged may include parts of the vehicle, a central part, and camera parameters, as discussed herein.

Process 400 the proceeds to step S404, in which overlays corresponding to the portions of the vehicle to be imaged are generated. The overlays may be generated as discussed with relation to FIGS. 3 and 6.

In step S405, the overlays are output to the mobile device. As discussed herein, overlays may be stored within the server and in some examples, the overlays may be stored instead of output to the mobile device.

In step S406, the overlays are used by the mobile device 110 to guide the user to capture images of the vehicle. The overlays may be used to guide the capture of images as discussed herein.

In the example of FIG. 4A, some steps are shown as being performed within server 130 or mobile device 110. In some examples, any step may be performed in any one of the mobile device 110 or server 130. For example, in some embodiments, the mobile device may perform steps S401, S402, S403, S404 and S406 as described herein. In some embodiments, the mobile device 110 may perform a subset of steps S401, S402, S403, S404 and S406. For example, the server 130 may perform steps S401 and S402, and the mobile device 110 may perform steps S403, S404 and S406.

Figure 4B:
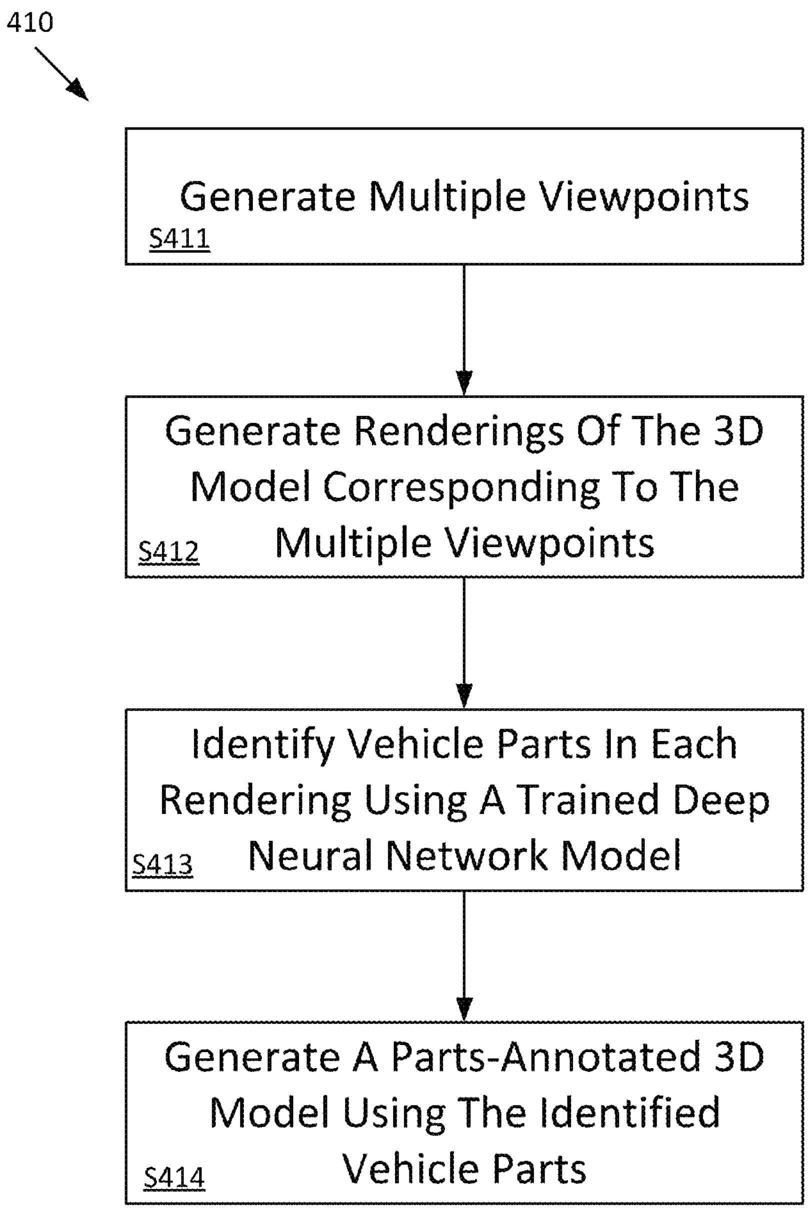
FIG. 4B illustrates an example process for generating a parts-annotated 3D model, in accordance with some embodiments of the technology described herein.

FIG. 4B illustrates an example process for generating a parts-annotated 3D model, in accordance with some embodiments of the technology described herein. The steps of process 410 are performed within the server 130.

Process 410 begins at step 411, in which multiple viewpoints are generated. The multiple viewpoints may include viewpoints distributed in space around the 3D model of the vehicle. The viewpoints may be distributed along a circumference which surrounds the vehicle, at randomly varying heights. The viewpoints may be generated as discussed with relation to FIG. 5A.

Process 410 them proceeds to step S412, in which renderings of the 3D model of the vehicle are generated corresponding to the multiple viewpoints generated in step S411. These renderings may be generated along a line between the viewpoint and a randomly selected part on the surface of the 3D model of the vehicle. The renderings may be generated as discussed with relation to FIGS. 5B and C.

Process 410 then proceeds to step S413, in which vehicle parts in each rendering are identified using a trained deep neural network model. The parts may be identified as described with relation to FIG. 5C.

Process 410 then proceeds to step S414, in which the parts annotated 3D model is generated using the identified vehicle parts. Step S414 may involve aggregating the identified vehicle parts from step S413 and performing voting to determine the parts boundaries to include in the parts-annotated 3D model. The parts-annotated 3D model may be generated as discussed with reference to FIG. 5C.

Figure 4C:
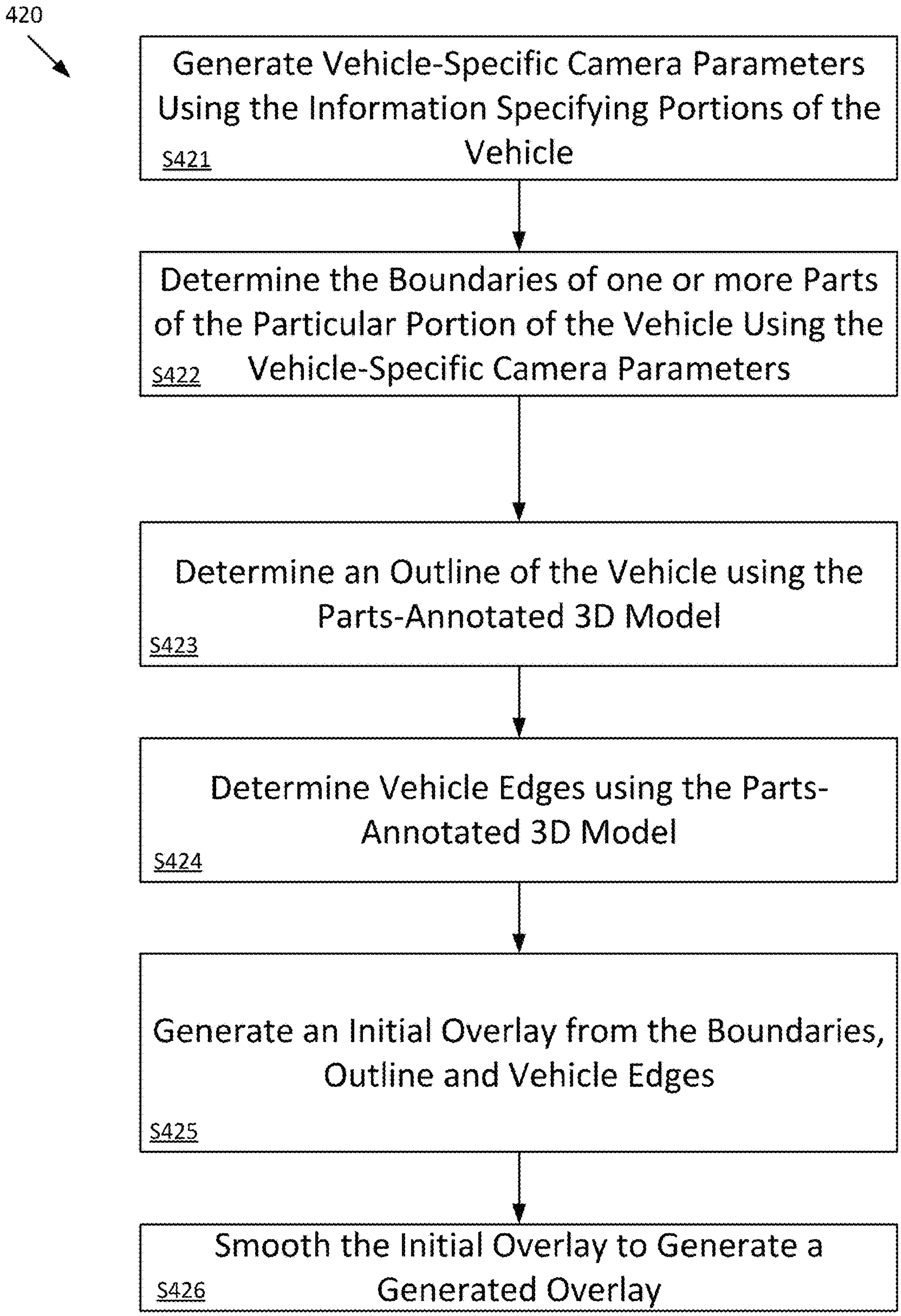
FIG. 4C illustrates an example process for generating a vehicle overlay, in accordance with some embodiments of the technology described herein.

FIG. 4C illustrates an example process for generating a vehicle overlay, in accordance with some embodiments of the technology described herein. The steps of process 420 are performed within the server 130.

Process 420 begins at step S421, in which vehicle-specific camera parameters are generated using the information specifying portions of the vehicle. The vehicle-specific camera parameters may specify a position of the camera with relation to the parts-annotated 3D model which corresponds to the information specifying portions of the vehicle to be imaged. The vehicle specific camera parameters may be generated by iteratively generating views of the parts-annotated 3D model until a view of the model fills a threshold amount, as discussed with relation to FIG. 3D.

Process 420, then proceeds to step S422, in which the boundaries of one or more parts of the portion of the vehicle are determined using the vehicle-specific camera parameters determined in step S421. The boundaries may be determined as discussed with relation to FIG. 6.

Process 420, then proceeds to step S423, in which the outline of the vehicle is determined using the parts-annotated 3D model is determined using the vehicle-specific camera parameters determined in step S421. The outline may be determined as discussed with relation to FIG. 6.

Process 420, then proceeds to step S424, in which the edges of the vehicle are determined using the parts-annotated 3D model of the vehicle using the vehicle-specific camera parameters determined in step S421. In some examples the edges of the vehicle may be determined using the 3D model of the vehicle. The edges may be determined as discussed with relation to FIG. 6.

Process 420, then proceeds to step S425, in which an initial overlay is generated using the boundaries determined in step S422, the outlined determined in step S423 and the edges determined in step S424. The initial overlay may be determined as discussed with relation to FIG. 6.

Process 420, then proceeds to step S426, in which a generated overlay is generated by smoothing the initial overlay generated in step S425. The generated overlay may be determined as discussed with relation to FIG. 6.

Figure 5A:
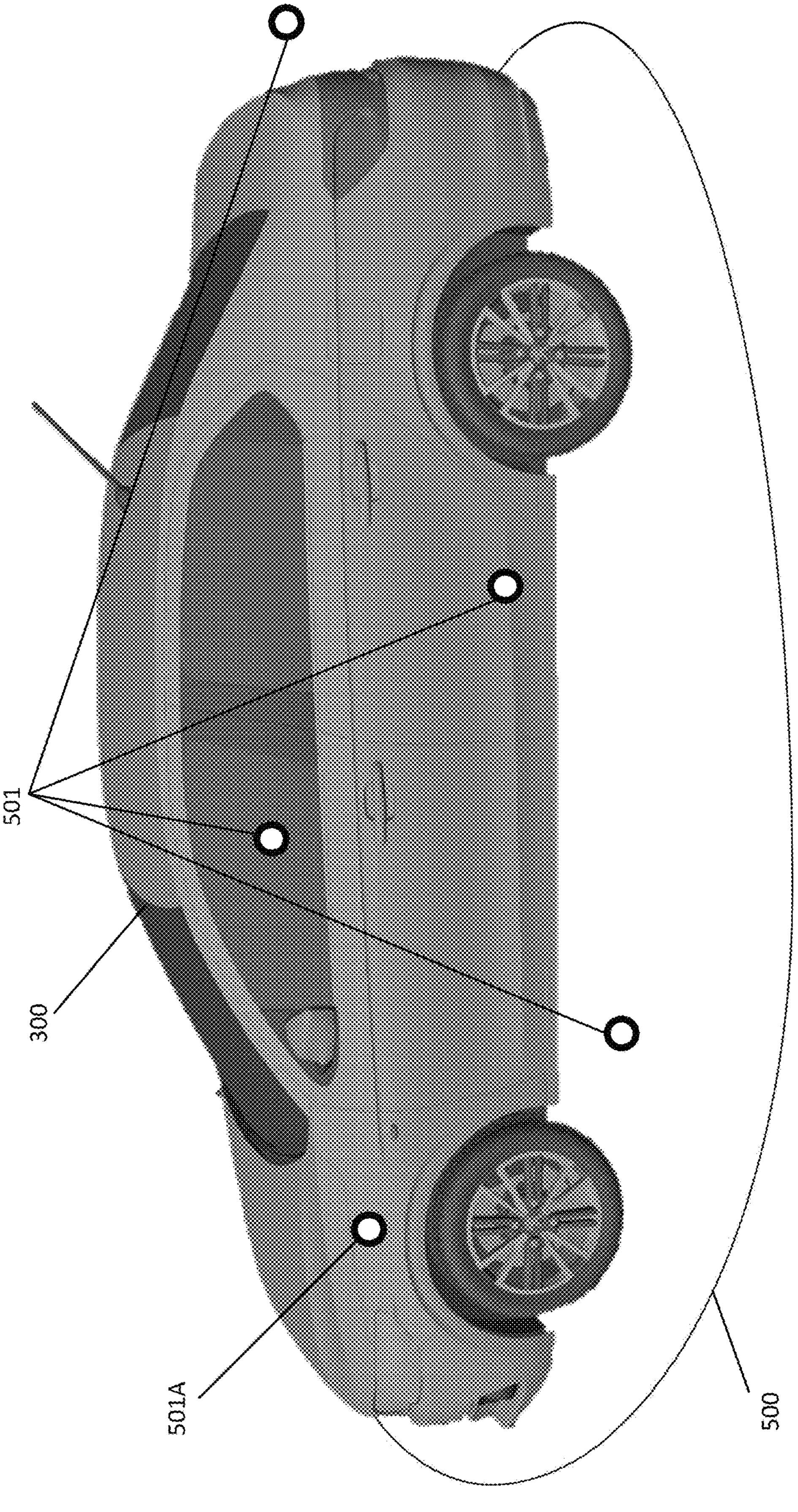
FIG. 5A illustrates example viewpoints, which may be used in generating the parts-annotated 3D model, in accordance with some embodiments of the technology described herein.
Figure 5B:
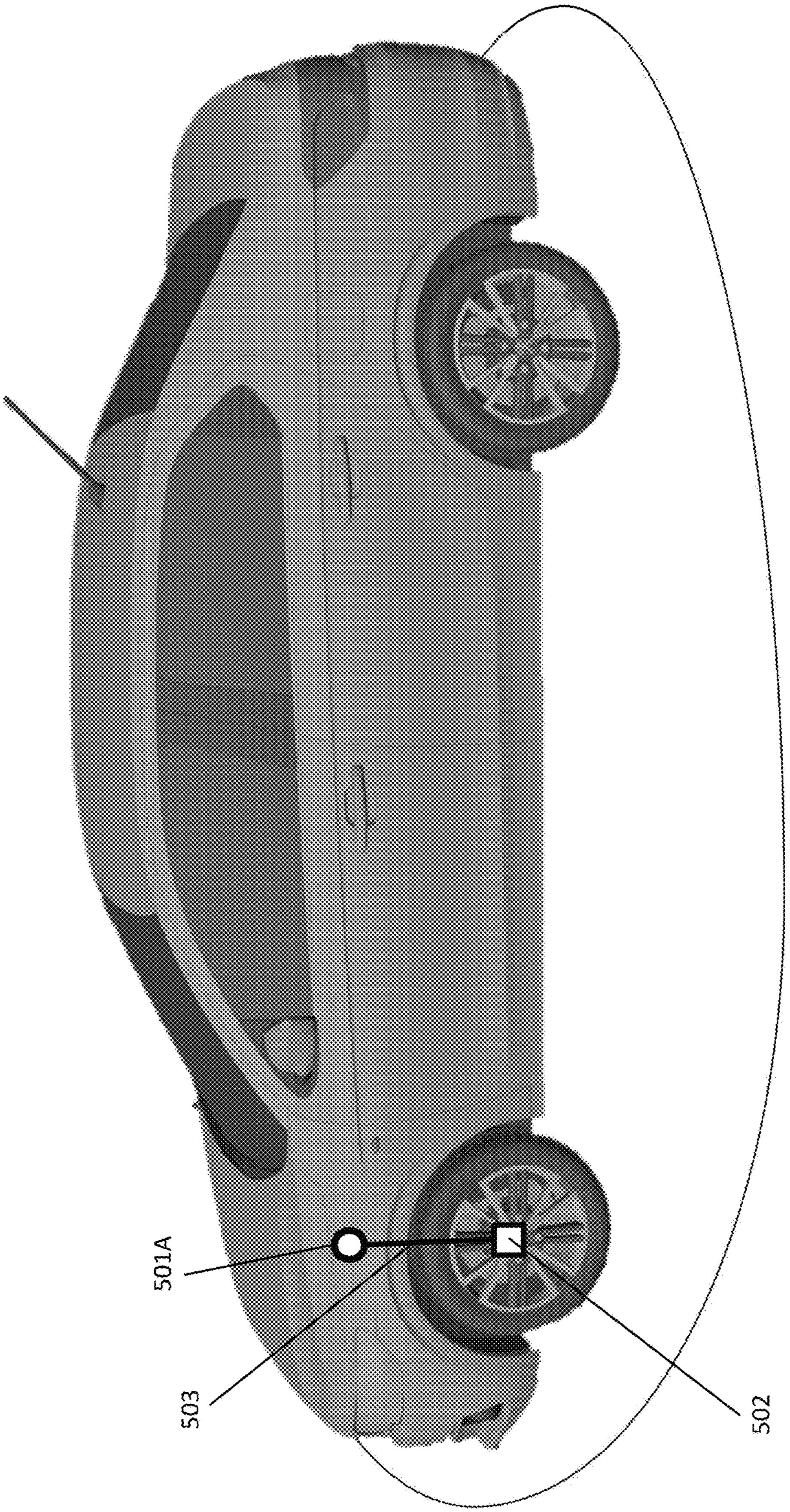
FIG. 5B illustrates a line between a viewpoint and a point on the surface of the 3D model of the vehicle, which may be used in generating the parts-annotated 3D model, in accordance with some embodiments of the technology described herein.
Figure 5C:
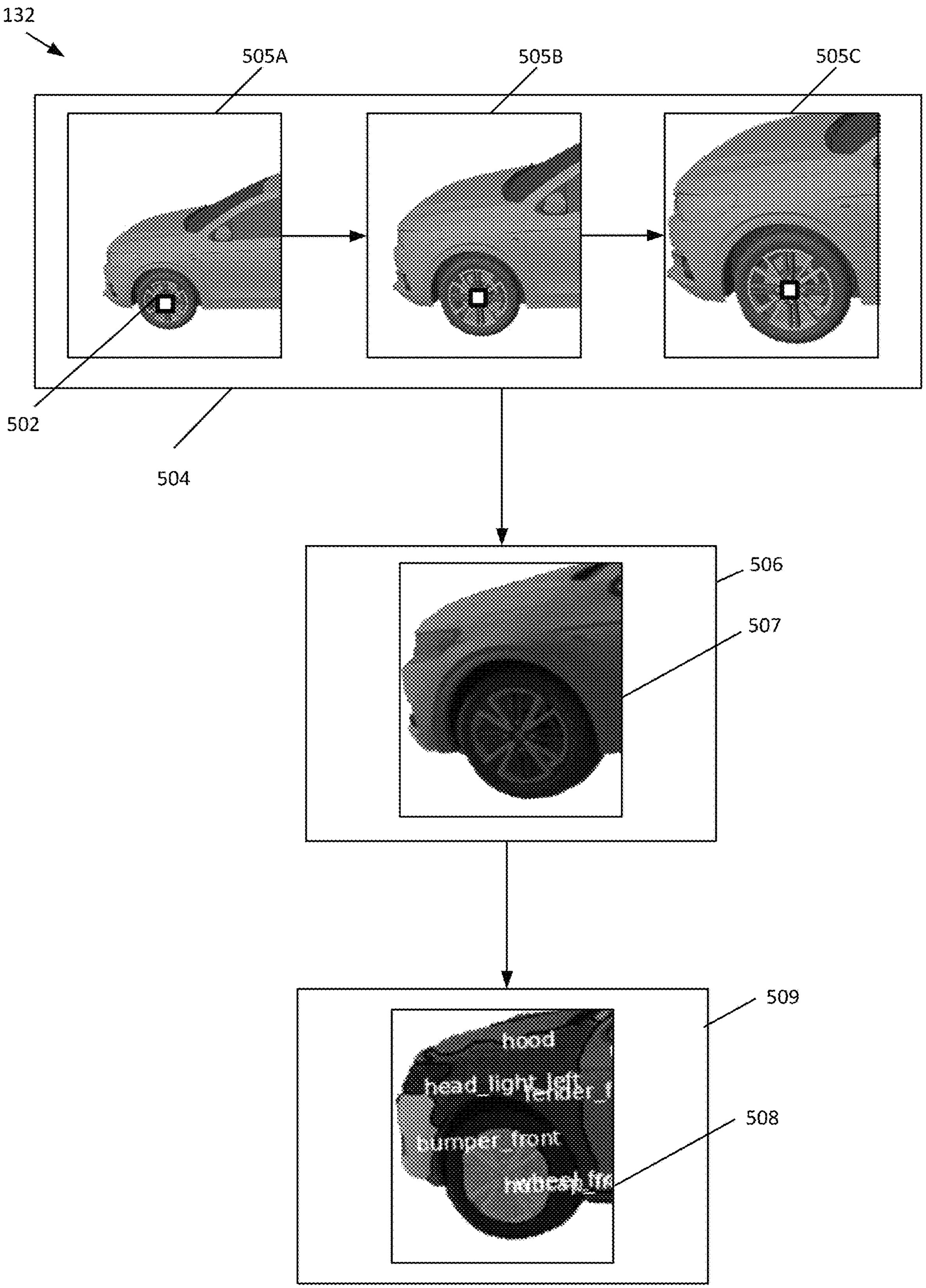
FIG. 5C illustrates an example process for parts annotating portions of the 3D model, in accordance with some embodiments of the technology described herein.

FIGS. 5A-C illustrate various steps in the process of generating a parts-annotated 3D model as discussed herein. FIG. 5A illustrates example viewpoints, which may be used in generating the parts-annotated 3D model, in accordance with some embodiments of the technology described herein. Visible in FIG. 5A is the 3D model of the vehicle 300, a perimeter around the 3D model 500 and viewpoints 501.

The perimeter 500 is a circle which surrounds the 3D model of the vehicle in a plane tangent to the lowest points on the tires of the 3D model of the vehicle, such that the plane of the perimeter corresponds to the ground on which a physical vehicle may rest. The perimeter 500 may have a center point which is aligned with a centroid of the vehicle in the plane of the perimeter. As shown, the perimeter 500 is a circle, however in some examples the perimeter may be any suitable shape including a polygon surrounding the vehicle, an ellipse, or any other shape.

Viewpoints 501, including viewpoint 501A are located along the perimeter 500 at varying heights. Each of viewpoints 501 has coordinates in a plane parallel to the plane of the perimeter 500 corresponding to coordinates along the perimeter 500 in the plane of the perimeter. The height of the viewpoints 501 may be randomly selected and is in a direction perpendicular to the plane of the perimeter. As shown, there are five viewpoints 501, however any suitable number of viewpoints may be used, including up to 50 viewpoints, up to 100 viewpoints, up to 500 viewpoints, up to 1000 viewpoints, or greater than 1000 viewpoints. The number of viewpoints should be selected such that the entire visible surface of the 3D model of the vehicle may be rendered as discussed herein. The entire visible surface may not include certain sections of the vehicle such as the undercarriage of the vehicle.

FIG. 5B illustrates a line between a viewpoint and a point on the surface of the 3D model of the vehicle, which may be used in generating the parts-annotated 3D model, in accordance with some embodiments of the technology described herein. As discussed herein, with reference to FIG. 4B renderings of the 3D model may be generated along a line between a viewpoint and a point on the surface of the vehicle. As shown in FIG. 5B, a line 503 between viewpoint 501A and point 502 is shown. This line may be used to generate renderings as discussed with reference to FIG. 5C.

Point 502 may be selected randomly from a set of points on the surface of the 3D model of the vehicle. In some examples, the server may maintain a set of points on the surface of the 3D model which may be used in generating renderings of the 3D model. In some examples, points on the surface of the vehicle may be selected at random from any point on the surface of the vehicle. Each viewpoint 501 may be associated with a single point on the surface of the vehicle. In some examples, multiple viewpoints may be associated with the same point on the surface of the vehicle.

FIG. 5C illustrates an example process for parts annotating portions of the 3D model, in accordance with some embodiments of the technology described herein. The process of FIG. 5C may occur within parts annotation module 132, as discussed herein. The process may begin by generating renderings of the 3D model of the vehicle in a rendering generation module 504. The renderings may then be textured in a texturing module 506 and the parts of textured renderings may be determined in parts identifying module 509.

Rendering generation module 504 may generate renderings of the 3D model of the vehicle between a viewpoint and a point on the vehicle. The renderings 505 shown in FIG. 5C may be generated along line 503 from FIG. 5B. Visible in the renderings is point 502 on the surface of the vehicle. The first rendering 505A may be generated at the viewpoint 501A as discussed in FIGS. 5A and 5B. The view of the 3D model of the vehicle in rendering 505A does not completely fill the rendering and therefore rendering generation module 504 may generate successive renderings until the view of the vehicle fills a threshold portion of the rendering. As shown, the views of the 3D model of the vehicle in renderings 505A and 505B do not fill the threshold portion of the renderings, while the view in rendering 505C does fill the threshold portion of the rendering. Rendering 505C may then be passed to the texturing module 506.

Texturing module 506 may apply a texture to the received rendering 505C. Textured rendering 507 has a texture with lighting and coloring applied to the rendering of the vehicle. The texturing module may apply a texture with photo-realistic coloring and lighting applied to the 3D model of the vehicle, such that the renderings of the vehicle appear similar to views of a physical vehicle.

The textured renderings may be passed to parts identification module 509, which may identify and label the parts of the vehicle visible in the received textured renderings. The parts identification module 509 may generate a series of parts-annotated renderings of the 3D model of the vehicle. The parts-annotated renderings may have a parts texture applied to the 3D model in which each pixel of the texture is assigned a part value corresponding to the part of the vehicle corresponding to the pixel, as determined by the parts identification module 509.

The parts identification module may employ a machine learning model to determine the parts contained within each textured rendering of the 3D model of the vehicle. The machine learning model may be a trained deep neural network model. The trained deep neural network may comprise multiple parameters (e.g., at least 10 million, at least 25 million, at least 50 million, or at least 100 million parameters) and their values may be used to identify vehicle parts in renderings of the vehicle.

In some embodiments, the trained deep neural network model may be any suitable semantic segmentation deep neural network. A semantic segmentation deep neural network may be any neural network that identifies labels for individual pixels (e.g., some or all pixels in an image). For example, the trained deep neural network model may have (or be based on) the DeepLabv3+ architecture (or its other versions) described by Chen, L. et al. "DeepLab: Semantic Image Segmentation with Convolutional Nets, Atrous Convolution, and Fully Connected CRFs." IEEE Transactions on Pattern Analysis and Machine Intelligence, vol. 40, no. 4, pp. 834-848 (2017) and Chen, L., et. al. ("Encoder-decoder with atrous separable convolution for semantic image segmentation." In Proceedings of the European conference on computer vision (ECCV). 2018. pp. 801-818.), each of which is incorporated by reference herein in its entirety.

As another example, the trained deep neural network model may be a convolutional neural network having one or more fully connected layers, a U-Net convolutional neural network having (or being based on) the architecture described by Olaf Ronneberger, Philipp Fischer, Thomas Brox in "U-Net: Convolutional Networks for Biomedical Image Segmentation", Medical Image Computing and Computer-Assisted Intervention (MICCAI), Springer, LNCS, Vol. 9351:234-241, 2015, which is incorporated by reference here in its entirety, ResNet, MobileNet, Xception or any other suitable deep learning architecture. Aspects of ResNet are described in He, K. et al. "Deep Residual Learning for Image Recognition." CVPR (2016), which is incorporated by reference herein its entirety.

In some embodiments, the trained neural network model may be trained to identify parts of a vehicle using a training dataset of labeled vehicle images. The training data set may include any suitable number of images including at least 500 images, at least 10,000 images, at least 100K images, at least 1M images, at least 10M images, between 500 and 10,000 images, between 1000 and 10M images or any other suitable range between these ranges. The images used to train the deep neural network model may include images of physical vehicles with the parts of the vehicles labeled. The parts of the vehicle may be labeled by hand in order to ensure the accuracy of the labeling. The parts may be outlined on the images of the vehicle. In some examples, images may be provided for training a pair of images including an unlabeled image and an image corresponding to the unlabeled image with vehicle parts labeled.

As shown in FIG. 5C. the hood, left headlight, front bumper, front left wheel, front left hub, and front left fender are identified and labeled in parts-labeled rendering 508. Parts-labeled rendering 508 contains the parts of the vehicle visible from renderings generated along line 503 as discussed in FIG. 5B, and in order to generate a complete parts-labeled 3D model of the vehicle, multiple parts labeled renderings from all generated viewpoints, such as viewpoints 501 as discussed in FIG. 5A are combined.

The parts textures of the parts-annotated renderings may be aggregated into a complete parts texture, which corresponds to the entire visible surface of the vehicle. During the aggregation, points of the complete parts texture may be assigned multiple different parts values. This may occur as a result of overlap in the renderings generated by the renderings generation module 504 and different outputs of the parts labeling module 509. Points of the complete parts texture may also be assigned different parts values due to transparency in vehicle parts. For example, a part such as the vehicle hood may be visible through a window of the vehicle, resulting in a point associated with the window of the vehicle being assigned a value associated with the hood. Such situations may be resolved through voting during the aggregation process. For example, a majority vote may be performed in which the most common parts value assigned to a point is selected as the part value for the point in the complete parts texture.

In some examples, the aggregation process may involve smoothing an initial texture to generate the complete parts texture. The initial texture may be a texture of the entire visible surface of the vehicle, after part values are assigned to each point of the texture. The smoothing may involve removing isolated parts labeled in the initial texture. Isolated parts may be parts labeled in the initial texture which have an area less than a threshold area. The threshold area may be determined based on a number of pixels associated with the part or an area of the part corresponding to an area on an associated physical vehicle. A threshold area may correlate to an area up to 1 square inch, up to 2 square inches, up to 3 square inches, up to 5 square inches, up to 10 square inches, or up to any suitable threshold value. In some examples the threshold area may differ for different parts of the vehicle. This may occur along the border between parts, for example a door and a window, in which a portion of the points corresponding to the window are labeled as the door and are surrounded by points labeled with the window value. For a part to be an isolated part, it may be surrounded by one or more other different parts of the vehicle. Isolated parts may be smoothed by assigning the part values of the points of the isolated part to the part value of a part adjacent to the isolated part having the largest area. In the above example, the points with door parts values will be assigned window parts values.

The complete parts texture may then be used to generate the parts-annotated 3D model. The parts-annotated 3D model may be used in the generation of vehicle overlays as discussed herein.

Figure 6:
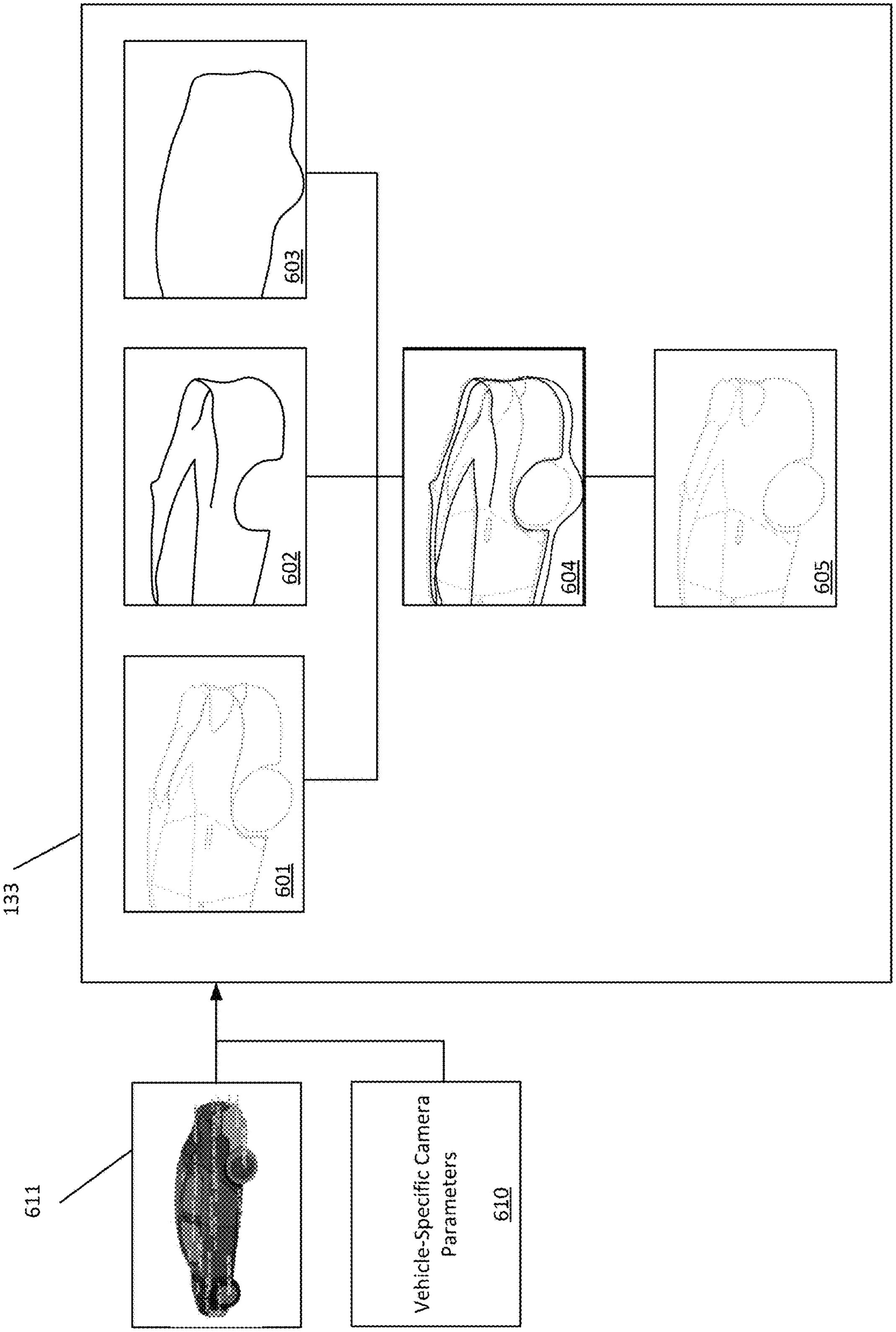
FIG. 6 illustrates an example process for generating vehicle overlays, in accordance with some embodiments of the technology described herein.

FIG. 6 illustrates an example process for generating vehicle overlays, in accordance with some embodiments of the technology described herein. The process shown in FIG. 6 may occur within an overlay generating module 133, as discussed herein. The process of FIG. 6 may be performed by an overlay generator, such as overlay generator 307 discussed in FIG. 3D.

The process of FIG. 6 begins with the generation of vehicle parts boundaries 601, based on the parts-annotated 3D model 611 and vehicle specific camera parameters 610. The vehicle-specific camera parameters 610 may be generated for a specific view of the vehicle as discussed with relation to FIG. 3D. A portion of the parts-annotated 3D model 611 corresponding to a particular set of vehicle specific camera parameters 610 may be used to generate the parts boundaries 601. In the example of FIG. 6 the view of the vehicle is a view of the rear left portion of the vehicle. The parts boundaries may be determined by analyzing the parts values of the points of the complete parts texture of the parts-annotated 3D model 611 and placing lines along the borders between labeled parts.

The vehicle edges 602 may also be generated in the process of FIG. 6. As shown, the vehicle edges may be determined by analyzing the parts-annotated 3D model of the vehicle, however in some examples, the 3D model of the vehicle may be used. Edges of the vehicle may include edges or curves in the bodywork of the vehicle, edges of some parts of the vehicle, edges between parts of the vehicle, or any other 3D feature on the surface of the vehicle.

The outline of the vehicle 603 may also be determined, using the parts-annotated 3D model of the vehicle, as shown in FIG. 6. In some examples, the 3D model of the vehicle may be used to generate the outline of the vehicle. The outline of the vehicle 603 may correspond to the outer limit of the surface of the vehicle visible when vehicle specific camera parameters, as discussed herein.

The server may generate the parts boundaries 601, vehicle edges 602 and vehicle outline 603 as vector images, such as an SVG format, which can be combined and manipulated. The rough overlay 604 and vehicle overlay 605 may be vector images. In some examples the parts boundaries 601, vehicle edges 602 and vehicle outline 603 may be any suitable image format including, but not limited to TIFF, JPEG, GIF, PNG, and Raw Image Files. In such examples, the rough overlay 604 and vehicle overlay 605 may have any suitable image format.

The parts boundaries 601, vehicle edges 602 and vehicle outline 603 may be overlayed onto each other to generate a rough vehicle overlay 604. The rough vehicle overlay 604 may undergo smoothing to generate vehicle overlay 605. The smoothing of the rough vehicle overlay 604 may include removing small and isolated curves from the rough vehicle overlay 604. Small and isolated curves may include any curve in the rough overlay 604 below a threshold size or not connected to other curves. A smoothing algorithm may also be used to generate the vehicle overlay 605. In some examples, the Ramer-Douglas-Peucker and/or Visvalingam-Whyat algorithms may be used to smooth the curves. The algorithm may analyze the curves of the rough overlay 604 and remove and/or combine similar curves to generate the vehicle overlay 605.

The process of FIG. 6 may be repeated for all received vehicle-specific camera parameters 610, in order to generate a set of overlays for a particular vehicle, which may be used in guiding the capture of images and/or videos of a vehicle, as discussed herein.

Figure 7:
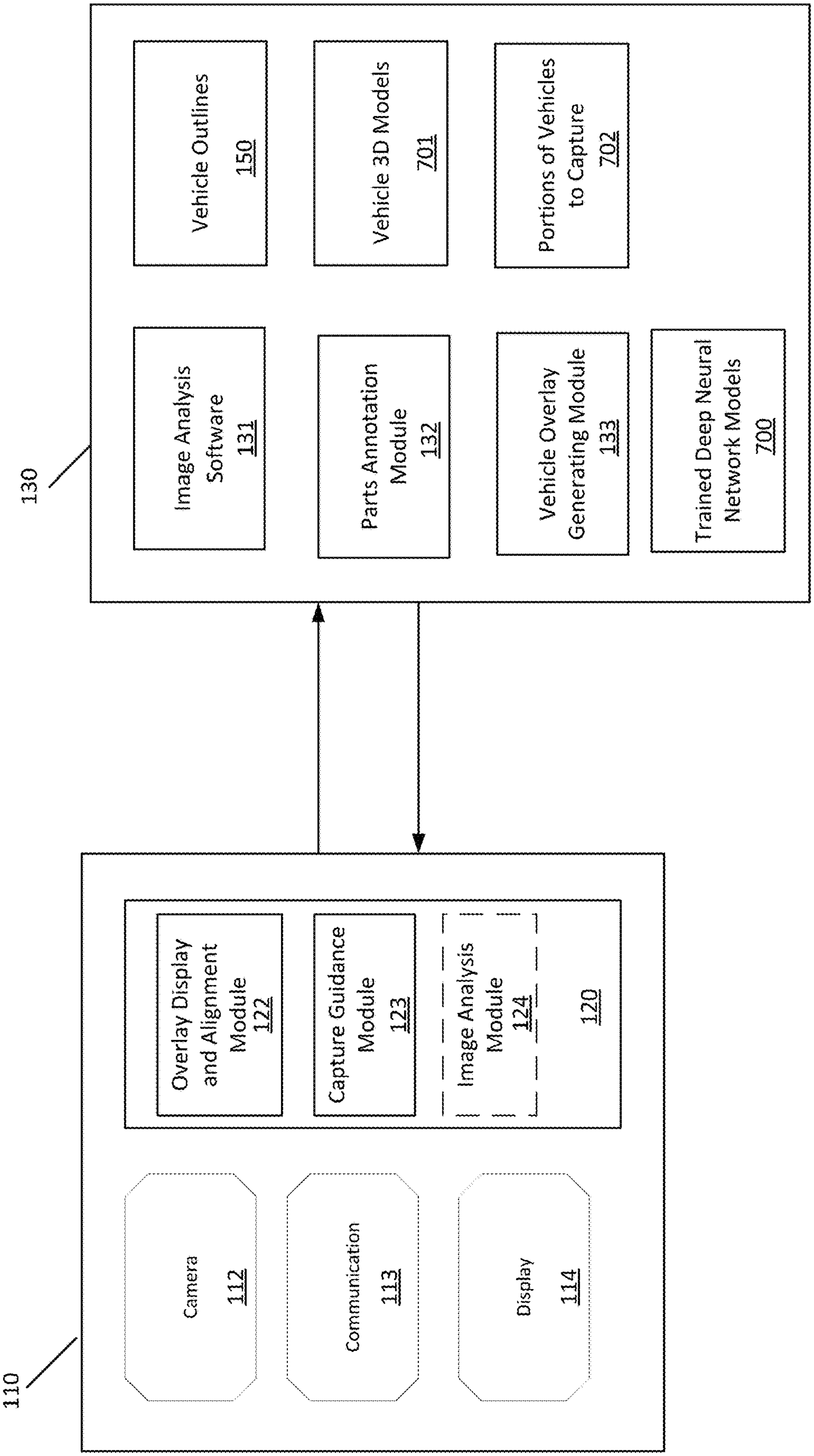
FIG. 7 illustrates example components that may be used in the generation of vehicle overlays and in using vehicle overlays to guide a user to capture images of a vehicle, in accordance with some embodiments of the technology described herein.

FIG. 7 illustrates example components that may be used in the generation of vehicle overlays in use of vehicle overlays in guiding a user to capture images of a vehicle, in accordance with some embodiments of the technology described herein. FIG. 7 includes mobile device 110 and server 130.

As shown in FIG. 7, mobile device 110 includes physical components such as camera 112, communication component 113 and display component 114. Camera 112 may be used in the capture of images and or videos as described herein. The camera 112 may provide the camera view as discussed with reference to FIGS. 1A-1C. Communication component 113 may be configured to communicate with server 130. The communication component 113 may use any suitable communication method including but not limited to wired communication, and wireless communication methods including Bluetooth, Wi-Fi, 5G, 4G, and/or 3G, among other wireless communication modalities. The display component 114 may be configured to display instructions for capturing images and/or videos of a vehicle as discussed herein.

Mobile device 110 additionally includes image capture guidance software 120. Image capture guidance software 120 may include multiple modules as shown including overlay display and alignment module 122, capture guidance module 123 and image analysis module 124. The overlay display and alignment module 122 may be used to display overlays received from server 130 during the guidance of capturing images and/or videos of a vehicle. The overlay display and alignment module 122 may additionally function to determine an alignment of a view of a vehicle with a displayed overlay. The capture guidance module 123 may be configured to provide instructions to a user during the capturing of images and/or videos of a vehicle as discussed herein. The capture guidance module may determine instructions to be provided to the user based on factors including an alignment determined by the overlay display and alignment module 122, a position associated with a currently displayed vehicle overlay, and motion of the user determined by the mobile device.

Image capture and guidance software 120 may additionally include an image analysis module 124. The image analysis module 124 may function to analyze one or more images captured by the camera 112 of the mobile device 110. The image analysis module 124 may determine one or more of a level of blurriness in captured image, a position of the vehicle in the captured image and/or a size of the vehicle in the captured image. The image analysis module 124 may provide information on image quality to the capture guidance module 123 which in turn may provide one or more instructions to the user based upon the image quality.

As shown in FIG. 7, the server 130 may include multiple components. The server 130 may include multiple software modules such as image analysis software 131, parts annotation module 132, and vehicle overlay generating module 133. The server 130 may additionally include one or more stored data and models including trained deep neural network models 700, vehicle outlines 150, vehicle 3D models 701 and portions of vehicles to capture 702.

The image analysis software 131 may function to analyze the images of vehicles received from mobile device 110. The image analysis software may perform image analysis to determine a condition of the vehicle based on the received image. The image analysis software may use a machine learning model to determine the condition of the vehicle, for example trained deep neural network models 700. The image analysis software 131 may output a vehicle condition report, as discussed herein.

The parts annotation module 133 may function to generate a parts-annotated 3D model of a vehicle for use in generating vehicle overlays, as discussed herein and with relation to FIGS. 4B and 5A-C. The parts-annotated 3D model may be generated using trained deep neural network models 700, as discussed herein. The parts-annotated 3D models of vehicles may be used by vehicle overlay generating module 133 in conjunction with portions of vehicles to capture 702 to generate vehicle outlines 150, as discussed herein and with relation to FIGS. 3D, 4A, 4C, and 6.

As discussed herein, the mobile device 110 may be configured to perform one or more steps related to the generation of vehicle overlays. In such examples, components of the server 130 shown in FIG. 7 may reside in the mobile device 110. For example, any one or more of image analysis 131, the parts annotation module 132, the vehicle overlay generating module 133, the trained deep neural network models 700, the vehicle outlines 150, the vehicle 3D models 701, and/or the portions of the vehicle to capture 702 may reside in the mobile device 110.

Now, some embodiments for use in guiding a user to capture video of a vehicle, in accordance with aspects of the technology described herein, will be discussed.

Figure 8:
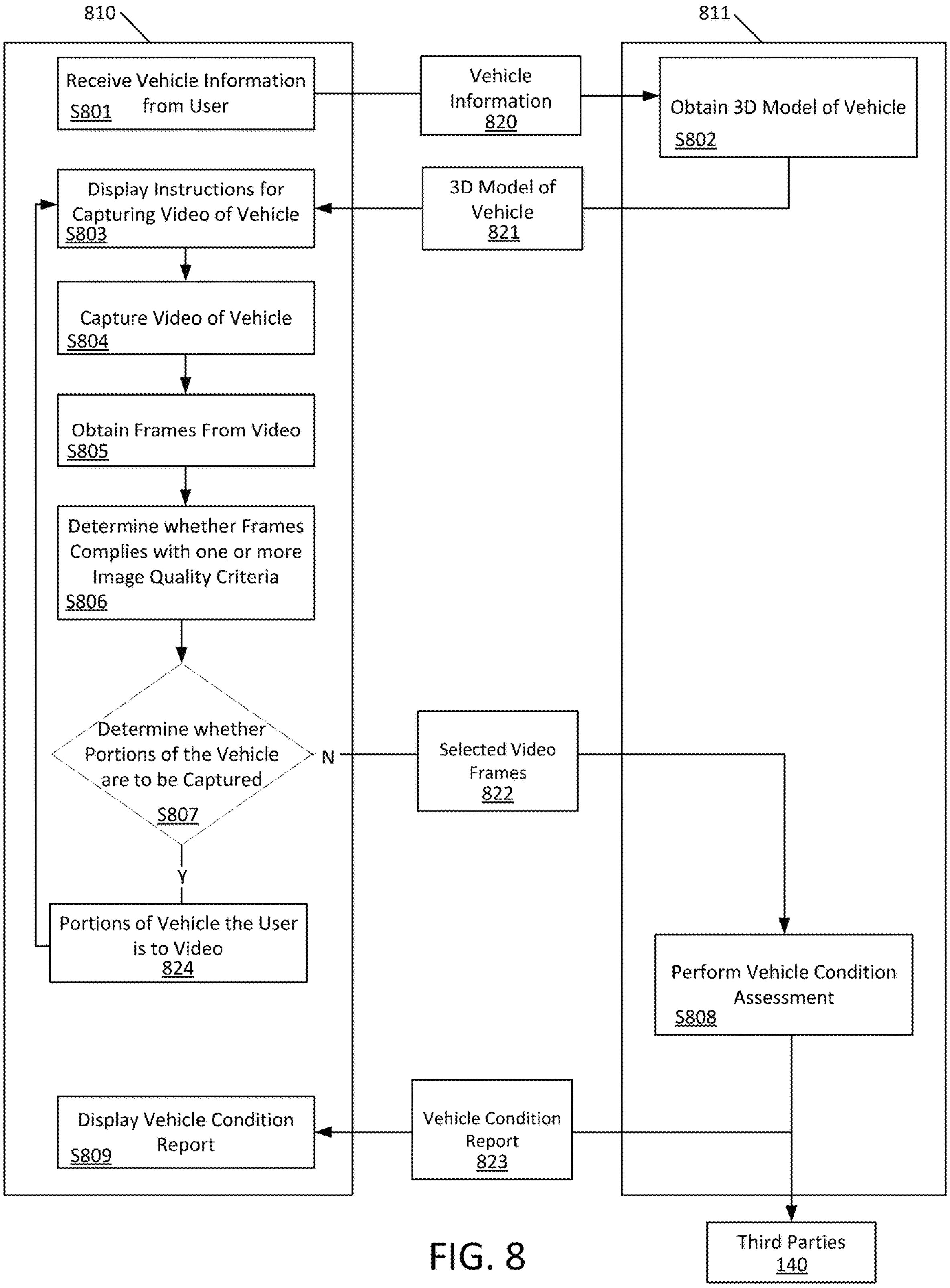
FIG. 8 illustrates an example process for capturing and analyzing a video of a vehicle, in accordance with some embodiments of the technology described herein.

FIG. 8 illustrates an example process for capturing and analyzing a video of a vehicle, in accordance with some embodiments of the technology described herein. Shown in FIG. 8 are mobile device 810 and server(s) 811. In addition, multiple data transmitted between mobile device 810 and server(s) 810 and steps performed within the mobile device 110 and server(s) 811 are shown.

The process begins at step S801 in which vehicle information is received at mobile device 810 from a user. The vehicle information may include a make of the vehicle, a model of the vehicle, a year of the vehicle, and a trim level of the vehicle, among other vehicle information as discussed herein. The vehicle information 820 may be passed from the mobile device 810 to the server 811.

In response to receiving the vehicle information 820 the server 811 may perform step S802 in which a 3D model of the vehicle is obtained. The 3D model of the vehicle may be a 3D model corresponding to the specific vehicle described by vehicle information 820. In some examples, if a 3D model associated with the specific vehicle information 820 received by the server 811 is not available, the server 811 may obtain a generic 3D model corresponding to a vehicle type associated with the received vehicle information 820. Examples of vehicle types for generic 3D models may include a sedan, a coupe, a sports car, a crossover, a full-size car, a sports utility vehicle, a pickup truck, and a compact car.

The 3D model of the vehicle 821 is passed from server 811 to mobile device 810. Mobile device 810 then performs step S803 in which instructions for capturing video of the vehicle are displayed. The instructions may be displayed on a user interface of the mobile device 810. The instructions may include information on how to orient the camera of the mobile device relative to the vehicle in order to capture video of the vehicle. The instructions may include a direction for the user to move in, an angle for the user to position the camera at, and information on how to improve camera movement for capturing video, among other instructions.

The process then proceeds to step S804 in which video of the vehicle is captured by the mobile device 810. In step S805 frames are obtained from the captured video. The frames may be obtained according to any suitable criteria including a set sampling rate, an estimated frame quality, an estimated view of the vehicle within the frame, and one or more conditions of the mobile device.

After obtaining the frames in S805, the obtained frames are analyzed in step S806. In step S806 it is determined whether the frames comply with one or more image quality criteria. The one or more image quality criteria may include, but is not limited to, the level of blurriness within the frame, the position of the vehicle within the frame, and the size of the vehicle within the frame.

After determining whether the frames comply with one or more image quality criteria the process proceeds to step S807 in which it is determined whether additional portions of the vehicle should be captured. Step S807 may include determining the portions of the vehicle which have been captured in the video recorded by the user, based on the obtained frames, the determined quality of the obtained frames and the 3D model of the vehicle. This may be accomplished by mapping the portions of the vehicle captured in the obtained frames which comply with the image quality criteria to respective portions of the 3D model of the vehicle. The portions of the 3D model which have not been mapped to correspond to the portions of the vehicle the user is to video 824.

If it is determined in step S807 that there are portions of the vehicle to be captured, the process may return to step S803, in which instructions are displayed for the user to capture portions of the vehicle 824.

If it is determined in step S807 that no portions of the vehicle need to be captured, then one or more video frames may be selected from the obtained video frames and sent to the server 811. The selected video frames 822 maybe selected based on one or more criteria including but not limited to the quality of the frames, the portion of the vehicle contained within the frames, time since last sent frame, network bandwidth, upload queue size, and available memory on device. In some examples, the selected video frames 822 may be sent to the server for analysis before step S807, as additional video of the vehicle is captured.

The server may then perform step S808, in which the vehicle condition is assessed. Step S808 may involve performing one or more image analysis processes on the received images in order to generate vehicle condition report 823. The one or more image analysis processes may identify one or more defects within the captured images of the vehicle. The one or more defects may include defects with the interior and exterior of the vehicle. Non-limiting examples of defects with the interior of the vehicle may include stained upholstery, scratches to interior, dents to interior, missing parts of interior, and poor cleanliness of interior, among other defects. Non-limiting defects to the exterior of the vehicle may include scratches to any part of the exterior of the vehicle; cracked windows, mirrors, or windshields; chipped paint; dents to the exterior of the vehicle; misaligned body panels; and aftermarket vehicle accessories; among other defects. In some embodiments, the server 811, may utilize one or more trained machine learning models when analyzing the one or more images to determine the condition of the vehicle.

The vehicle condition report 823 may be transmitted to the mobile device 810 and third parties 140, as discussed herein. The mobile device may display the vehicle condition report in step S809 for analysis by the user.

Figure 9C:
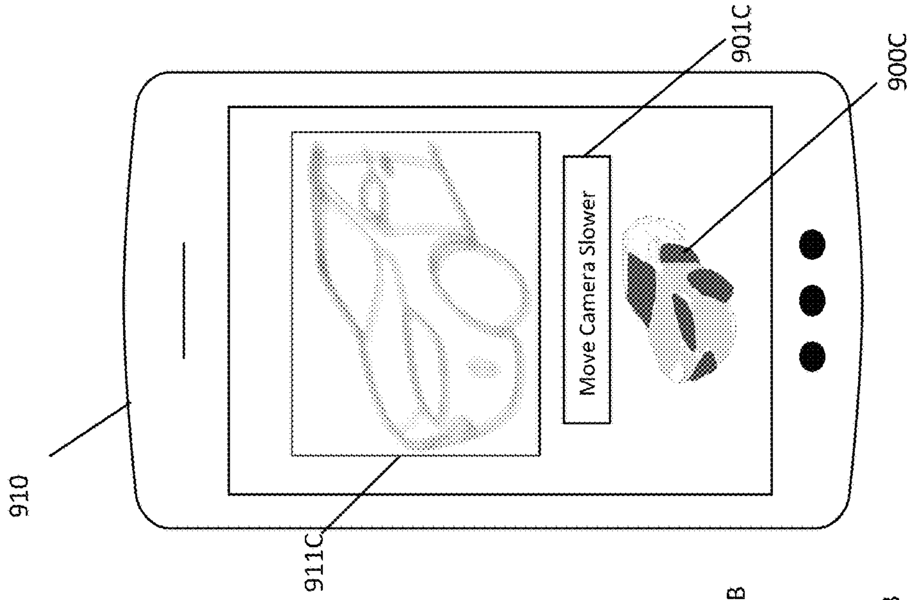
FIG. 9C illustrates an example mobile device display when captured video of a vehicle is blurry in accordance with some embodiments of the technology described herein.
Figure 9B:
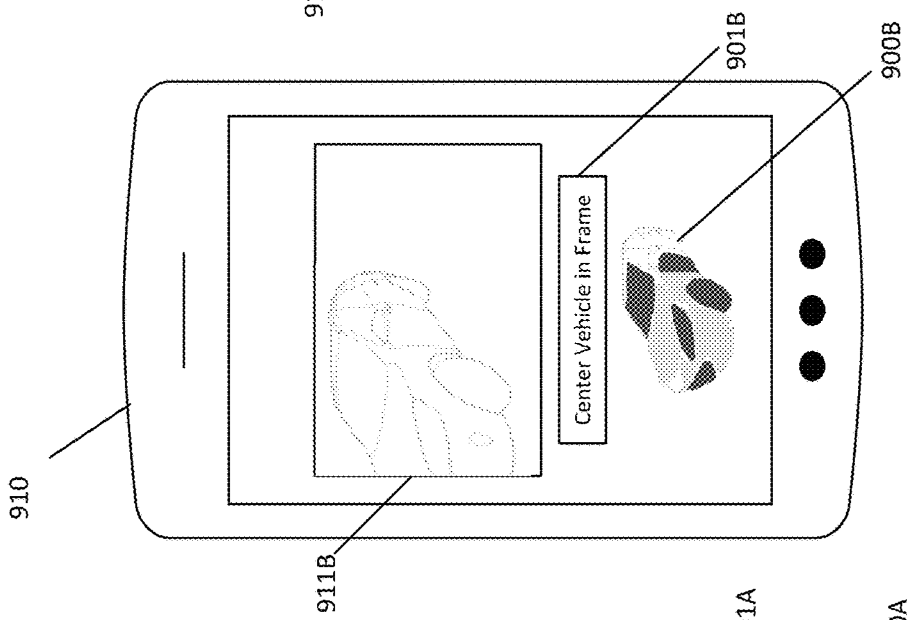
FIG. 9B illustrates an example mobile device display when a vehicle is not centered in a video, in accordance with some embodiments of the technology described herein.
Figure 9A:
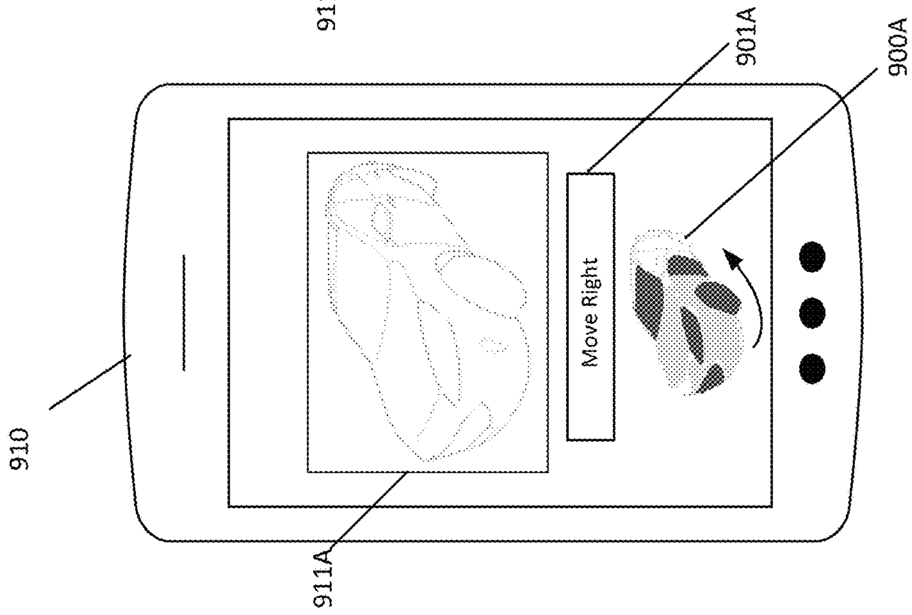
FIG. 9A illustrates an example mobile device display when a vehicle is properly captured in a video in accordance with some embodiments of the technology described herein.

FIGS. 9A-C illustrate a mobile device display and example instructions for capturing video of a vehicle, according to some embodiments of the technology described herein.

FIG. 9A illustrates an example mobile device display when a vehicle is properly captured in a video in accordance with some embodiments of the technology described herein. Show is mobile device 910, camera view 911A, instruction 901A and vehicle coverage icon 900A.

Camera view 911A includes the current view as seen by the camera of mobile device 910. As shown in FIG. 9A the vehicle within the camera view is centered and fills the entirety of the camera view. Additionally, the vehicle within the camera view is not blurry. Therefore, suitable frames associated with the current camera view may be obtained from the video recorded by mobile device 910. Accordingly, the mobile device 910 provides instructions 901A to the user to move right to capture additional video of the vehicle.

Vehicle coverage icon 900A may also be provided in order to guide the user in capturing video of the vehicle. As shown, vehicle coverage icon 900A includes shaded portions on a model of the vehicle corresponding to portions of the vehicle which have been captured in video recorded by the mobile device. The unshaded portions of vehicle coverage icon 900A correspond to the portions of the vehicle which need to be video recorded by the user. Vehicle coverage icon 900A may also include an arrow illustrating the direction the user is to move in order to capture video of the remaining portions of the vehicle. The arrow included in vehicle coverage icon 900A may correlate with instruction 901A.

FIG. 9B illustrates an example mobile device display when a vehicle is not centered in a video, in accordance with some embodiments of the technology described herein. Show is mobile device 910, camera view 911B, instruction 901B and vehicle coverage icon 900B.

Camera view 911B includes the current view as seen by the camera of mobile device 910. As shown in FIG. 9B the vehicle within the camera view is not centered and is instead positioned on the left side of the camera view. Therefore, the frames associated with the current camera view may not be suitable for use, and the mobile device 910 provides instructions 901B to the user to center the vehicle in the frame.

FIG. 9C illustrates an example mobile device display when captured video of a vehicle is blurry in accordance with some embodiments of the technology described herein. Show is mobile device 910, camera view 911C, instruction 901C and vehicle coverage icon 900C.

Camera view 911C includes the current view as seen by the camera of mobile device 910. As shown in FIG. 9C the vehicle within the camera view blurry. Therefore, the frames associated with the current camera view are not suitable for use as features of the vehicle cannot be discerned from the frames, and the mobile device 910 provides instructions 901C to the user to move the camera slower. Slowing the camera movement would prevent blurry images from being taken.

Figure 10A:
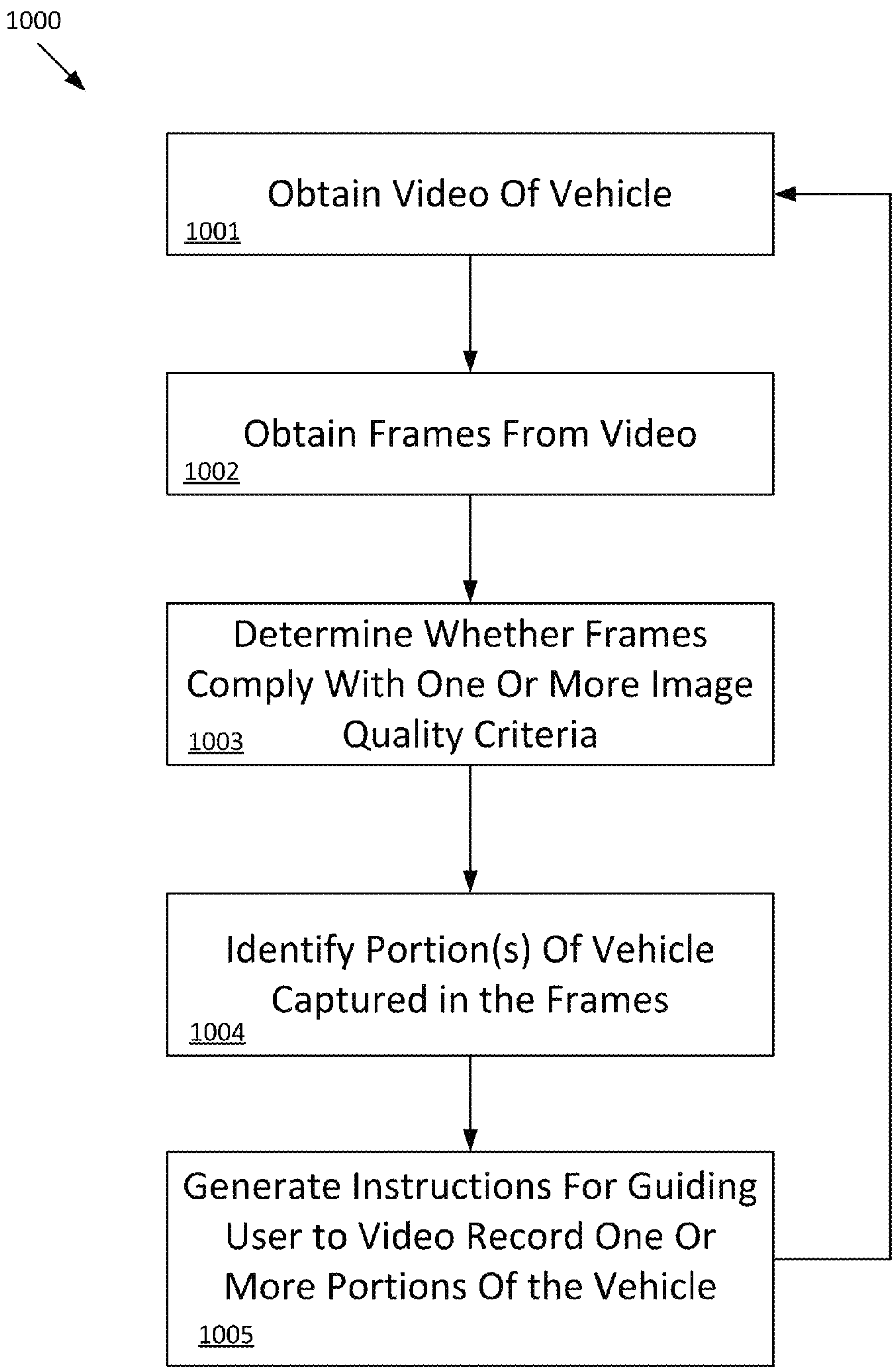
FIG. 10A depicts an example process for use in connection with guiding a user in capturing one or more videos of a vehicle with a mobile device, in accordance with some embodiments of the technology described herein.

FIG. 10A depicts an example process for use in connection with guiding a user in capturing one or more videos of a vehicle with a mobile device, in accordance with some embodiments of the technology described herein.

Process 1000 begins at step 1001 in which video the vehicle is obtained. The video of the vehicle may be obtained from a camera of the mobile device as described herein.

Process 1000 then proceeds to step 1002 in which frames are obtained from the video. The frames may be obtained from the video according to a set of rules as described herein. For example, frames may be obtained according to any suitable criteria including a set sampling rate, an estimated frame quality, an estimated view of the vehicle within the frame, and one or more conditions of the mobile device. Step 1002 may be performed by a frame extraction module as described herein.

Process 1000 then proceeds to step 1003 in which it is determined whether frames comply with one or more image quality criteria. Step 1003 may be performed in an image quality assessment module as described herein. Step 1003 may involve analyzing one or more attributes of the obtained frames to determine the compliance of the obtained frames with the one or more image quality criteria.

Process 1000 then proceeds to step 1005 in which instructions for guiding the user to video record one or more portions of the vehicle are generated. Step 1005 may be performed in video capture and guidance software as described here in.

Figure 10B:
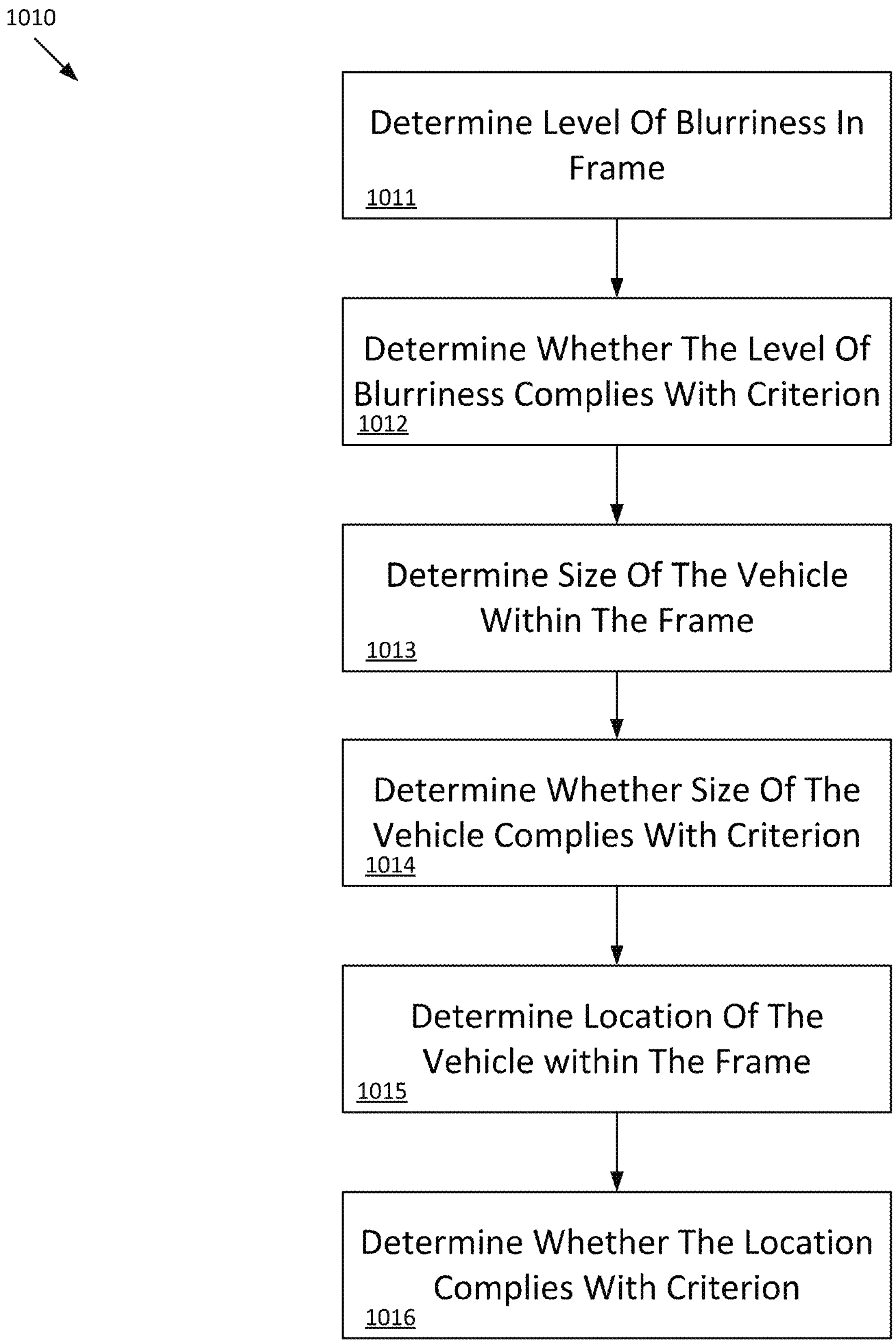
FIG. 10B depicts an example process for determining whether a video frame complies with image quality criteria, in accordance with some embodiments of the technology described herein.

FIG. 10B depicts an example process for determining whether a video frame complies with image quality criteria, in accordance with some embodiments of the technology described herein. The process 1010 may be performed within an image quality assessment module as described herein. The process 1010 may be performed on all obtained video frames. Process 1010 begins at step 1011 in which the level of blurriness in the frame is determined. The level of blurriness may be determined in a blurriness estimation module as described herein.

In step 1012 the determined level of blurriness is compared to a threshold level of blurriness to determine if the level of blurriness complies with a blurriness criterion. If the level of blurriness determined in step 1011 is greater than the threshold level of blurriness the frame may not comply with the blurriness criterion. If the level of blurriness determined in step 1011 is less than the threshold level of blurriness the frame does comply with the blurriness criterion.

The process 1010 then proceeds to step 1013 in which the size of the vehicle within the frame is determined. Step 1013 may be performed by a vehicle position detection module as described herein. In step 1014, it is determined whether the size of the vehicle determined in step 1013 complies with a vehicle size criterion. If the size of the vehicle determined in step 1013 is greater than a threshold size or occupies a greater percentage of the frame than a threshold percentage, the frame complies with the vehicle size criterion.

The process 1010 then proceeds to step 1015, in which the location of the vehicle within the frame is determined. Step 1015 may be performed by a vehicle position detection module as described herein. In step 1016, it is determined whether the location of the vehicle determined in step 1015 complies with a vehicle location criterion. If the location of the vehicle determined in step 1015 is within a threshold region, the frame complies with the vehicle location criterion.

Figure 10C:
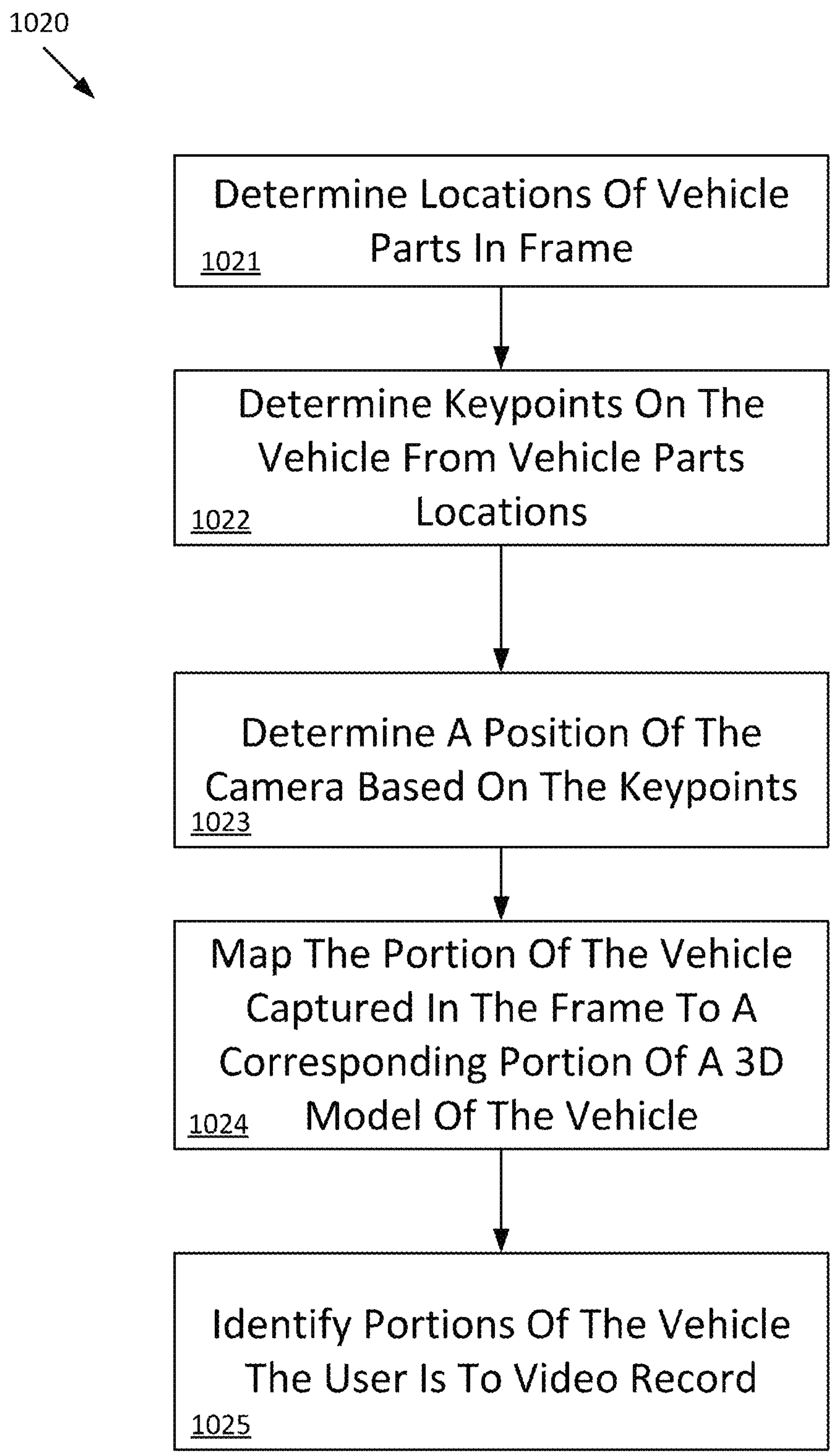
FIG. 10C depicts an example process for identify portions of the vehicle captured in a frame of a video, in accordance with some embodiments of the technology described herein.

FIG. 10C depicts an example process for identify portions of the vehicle captured in a frame of a video, in accordance with some embodiments of the technology described herein.

The process 1020 may be performed within a vehicle coverage estimation module as described herein. The process 1020 may be performed on all obtained video frames. Process 1020 begins at step 1021, in which the locations of vehicle parts within the frame are determined. Step 1021 may be performed by a parts detection module as described herein. The parts detection module may use a trained neural network to determine the locations of the parts of the vehicle within the frame.

The process 1020 then proceeds to step 1022, in which keypoints on the vehicle are determined from the vehicle parts locations. The keypoints may be determined by a keypoints module as discussed herein.

The process 1020 then proceeds to step 1023, in which a position of the camera is determined based on the keypoints. The position of the camera may be a position of the camera in space surrounding the vehicle, as discussed herein. Step 1023 may be performed by a position estimation module as described herein.

The process 1020 the proceeds to step 1024, in which the portion of the vehicle captured in the frame is mapped to a corresponding portion of a 3D model of the vehicle. Step 1024 may be performed by a coverage estimation module as discussed herein.

The process 1020 then proceeds to step 1025, in which the portions of the vehicle the user is to video record are identified. The portions of the vehicle the user is to video record may be identified based on the portions of the vehicle captured in video frames and/or may be based on the compliance of the video frames with the one or more image quality criteria, as discussed herein. Process 1025 may be performed by video capture guidance software as discussed herein.

Figure 11A:
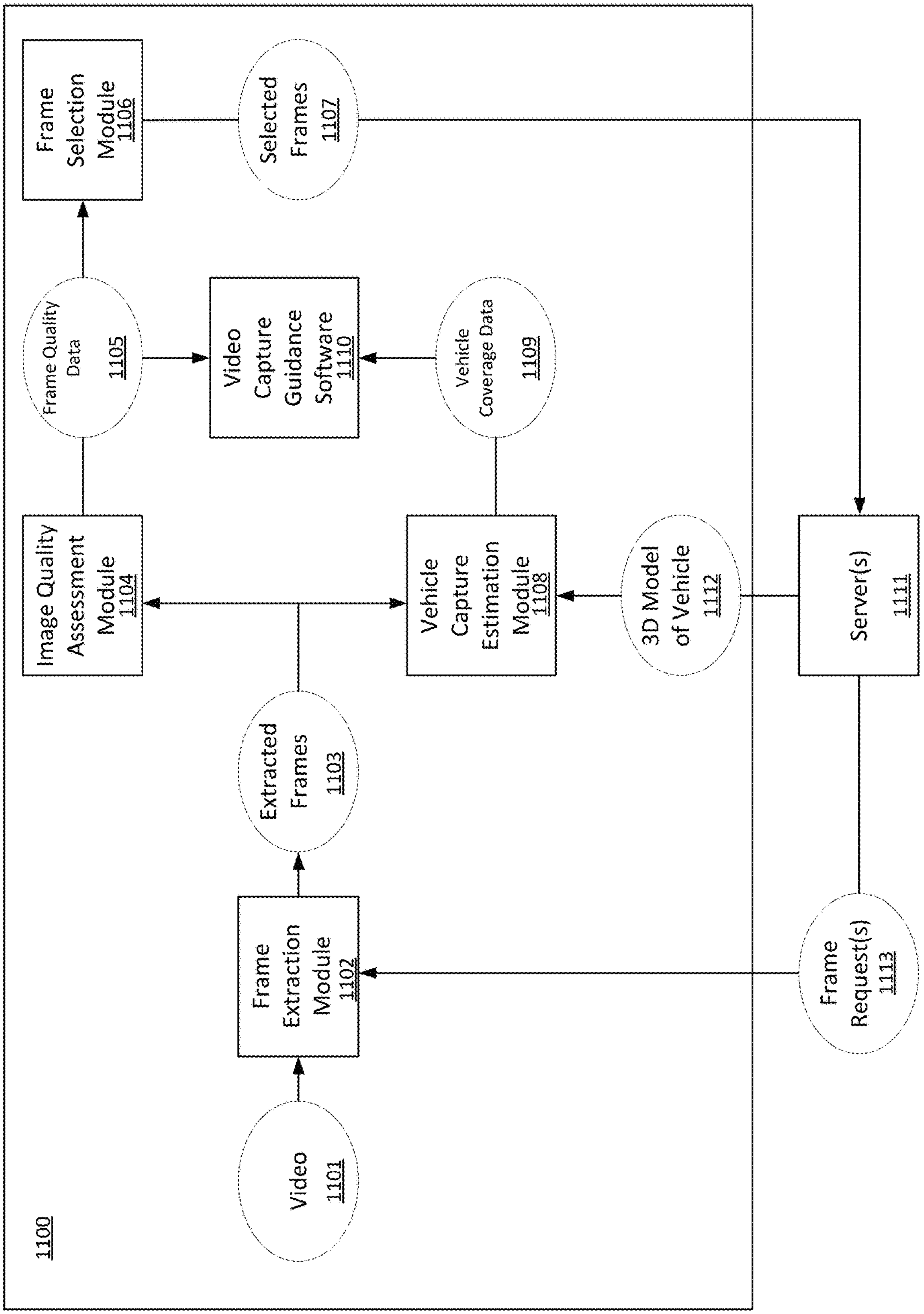
FIG. 11A illustrates an example process flow for instructing a user to capture video of a vehicle, in accordance with some embodiments of the technology described herein.

FIG. 11A illustrates an example process flow for instructing a user to capture video of a vehicle, in accordance with some embodiments of the technology described herein. Shown in FIG. 11A are mobile device 1100, server(s) 1111, and various modules and data which may be used in instructing a user to capture video of a vehicle, as discussed herein.

Mobile device 1100 includes multiple modules used in guiding the user to capture video of the vehicle. The modules include frame extraction module 1102 which receives video 1101 from a camera of the mobile device 1100. The frame extraction module 1102 may extract frames from the video 1101 as discussed herein. The extracted frames 1103 are then sent to two modules: image quality assessment module 1104 and vehicle capture estimation module 1108.

The image quality assessment module 1104 analyzes the extracted frames 1103 to determine the compliance of the extracted frames with one or more image quality criteria. The image quality criteria may include the blurriness of the extracted frames, the position of the vehicle within the extracted frames, and the size of the vehicle within the extracted frames. The image quality assessment module 1104 generates frame quality data 1105 based on the quality of the extracted frames 1103. The frame quality data 1105 may be sent to two modules: frame selection module 1106 and video capture guidance software 1110.

The frame selection module 1106 may select frames from the extracted frames 1103 based on frame quality data 1105. In some examples the frame selection module 1106 may select (e.g., only) those frames which comply with all image quality criteria. In some examples the frame selection module may select frames which do not comply with all image quality criteria but comply with one or more image quality criteria. For example, the frame selection module 1106 may select a frame which is not blurry, but has the vehicle is not centered in the frame.

In some examples the frame selection module may additionally consider the portion of the vehicle captured in the frames when selecting frames. For example, frame selection module 1106 may select a frame containing a view of the rear portion of the vehicle in a situation where no frames of the rear portion of the vehicle have been selected. In some examples frame selection module 1106 may select a frame based on the portion of the vehicle contained within the frame without considering compliance of the frame with the one or more image quality criteria. The selected frames 1107 may be set to servers 1111 for further analysis.

Servers 1111 may analyze the frames in a variety of ways using image analysis software. For example, servers 1111 may analyze the frames to determine a condition of the vehicle within the frames and generate a vehicle condition report based on this analysis. In some examples, the servers 1111 may determine a portion of the vehicle has not been properly captured in the selected frames 1107 or that additional frames of a portion of the vehicle may be required. For example, the server may identify damage to a portion of the vehicle and determine that additional frames are to be obtained in order to perform an assessment of the damage to the vehicle. Therefore, servers 1111 may send frame requests to frame extraction module 1102.

In response to receiving frame requests 1113, frame extraction module 110 may analyze video 1101 to determine if frames, not previously extracted from video, match the frame requests 1113. If there are frames within video 1101 which match the frame requests 1113, these frames may be sent directly to servers 1111. In some examples, the frames which match the frame requests may be sent to image quality assessment module 1104 and processes as discussed herein.

If there are no frames within the video 1101 which match frame requests 1113, video capture guidance software 1110 may provide instructions to the user to capture video of the portions of the vehicle associated with frame requests 1113.

Servers 1111 may also send a 3D model of the vehicle 1112 to vehicle capture estimation module 1108. Vehicle capture estimation module may determine the portions of the vehicle which have been captured in the extracted frames 1103. Vehicle capture estimation module may map portions of the vehicle captured in the extracted frames 1103 onto corresponding portions of the 3D model of the vehicle 1112, as discussed herein. Based on the mapping of the portions of the vehicle captured in the extracted frames 1103 onto the 3D model 1112, the vehicle capture estimation module may determine the portions of the vehicle which have and have not been captured in frames of the video. The vehicle capture estimation module may send these portions as vehicle coverage data 1109 to the video capture guidance software 1110.

Video capture guidance software 1110 receives vehicle coverage data 1109 and frame quality data 1105. Based on the portions of the vehicle which have been captured in video and the frame quality of the captured video, the video capture guidance software 1110 may determine one or more portions of the vehicle the user is to video record. The video capture guidance software may provide one or more instructions to the user to capture these portions of the vehicle as discussed herein. The one or more instructions may include instructions on how to position the camera, how to control motion of the camera, what portion of the vehicle to move to, or to center the vehicle within the camera view, among other instructions. The instructions may be displayed using a user interface of mobile device 1100.

In some examples, the extracted frames 1103 may be passed to image quality assessment module 1104, and if the frames are determined to comply with one or more image quality criteria, the frames 1103 may be passed to vehicle coverage estimation module 1108. In some examples, such as that shown in FIG. 11A, the extracted frames 1103 may be passed to image quality assessment module 1104 and vehicle coverage estimation module 1112 simultaneously for parallel processing and analysis. Processing the extracted frames in parallel may increase the speed at which instructions may be provided to users and frames may be output to servers 1111.

While certain components and processes are discussed as being within or performed by the mobile device 1100 or server 1111, any one of the components or processes may be included in or performed by either of the mobile device 1100 or server 1111. For example, the mobile device 1100 may capture video of the vehicle and transmit the video directly to the server 1111. The server may include frame extraction module 1102, image quality assessment module 1104, frame selection module 1106, vehicle capture estimation module 1108, video capture guidance module 1110, and image analysis software. The server 1111 may send instructions to capture portions of the vehicle to the mobile device 1100. In some examples, the mobile device may include image analysis software to generate the vehicle condition report without the server 1111.

Figure 11B:
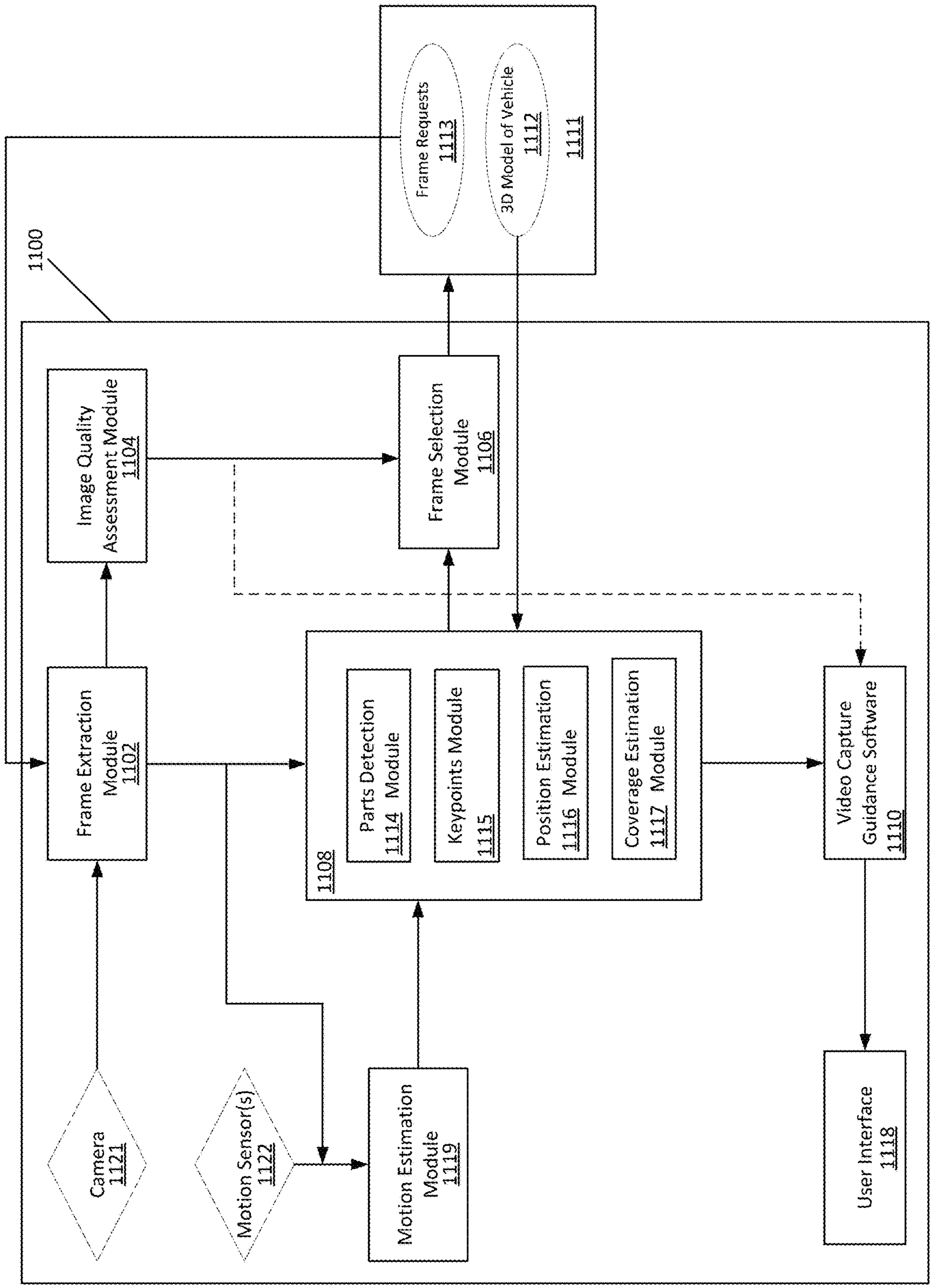
FIG. 11B illustrates example components of a mobile device and server used to guide the capture of video of a vehicle, in accordance with some embodiments of the technology described herein.

FIG. 11B illustrates example components of a mobile device and server used to guide the capture of video of a vehicle, in accordance with some embodiments of the technology described herein. Mobile device 1100 includes physical components and software modules.

Physical components of mobile device 1100 may include camera 1121, and one or more motion sensors 1122. Camera 1121 may be used to capture video of the vehicle, as discussed herein. The output of camera 1121 may be sent to frame extraction module 1102 which extracts frames from the video, as discussed herein. Motion sensors 1122, may include, but are not limited to, sensors such as IMUs, accelerometers, gyroscopes and GPS sensors. The outputs of motion sensors 1122 may be sent to motion estimation module 1120.

Motion estimation module 1120 may determine an estimated motion of the mobile device based on the output of motion sensors 1122. Motion estimation module 1120 may also receive extracted frames from frame extraction module 1102. The motion estimation module 1120 may analyze adjacent extracted frames to determine an estimate of the motion of the camera between the frames. The estimated motion determined using extracted frames and/or motion sensors 1122 may include information including a 2D direction of movement, a 3D direction of movement, a change in angle, and a change in position of one or more features of the frames, among other information. The estimated motion of the mobile device may be used by vehicle capture estimation module 1108 in order to update one or more parameters used in determining the portions of the vehicle captured in the video.

Vehicle capture estimation module 1108 may include multiple modules, which are used to determine the portions of the vehicle captured in video recorded by the user. The vehicle capture estimation module 1108 may include a parts detection module 1114, at key points module 1115, a position estimation module 1116 and a coverage estimation module 1117.

The parts detection module 1114 may receive frames extracted from frame extraction module 1102 and output the identity and location of parts of the vehicle within the frame. In some examples, the identity and location of parts of the vehicle by generating a polygon corresponding to each part of the vehicle visible within a particular frame and outputting the size, shape, identity, and location of the polygon. The parts detection module may use a machine learning algorithm to identify the parts of the vehicle visible within each frame, as discussed herein.

In some examples, estimated motion from motion estimation module 1119 may be used in calculating the identity and location of parts of the vehicle within frames. For example, the estimated motion may be used to update the location of parts of the vehicle between adjacent frames. The parts detection module 114 may calculate the location and identity of the parts of the vehicle from a first frame and receive estimated motion from the motion estimation module before receiving a second frame. The parts detection module may update the locations of the parts of the vehicle based on the estimated motion. In some examples, the parts detection module may output an indication whether the parts locations were determined based on estimated motion. In some examples, the locations of the parts of the vehicle updated based on the estimated motion may be output from the parts detection module 1114. In some examples, the locations of the parts of the vehicle updated based on the estimated motion may be further updated when a second frame is received by the parts detection module 1114. In such examples, the process for determining the identity and location of the parts of the vehicle may be performed faster and with less computing power, than determining the identity and location of parts from a frame alone. The updated locations of the parts of the vehicle based on the estimated motion are likely to be close to the locations of the parts of the vehicle within the second frame, and therefore calculating the position of the parts of the vehicle within the second frame is simplified.

The output of parts detection module 1114 may be passed to a keypoints module 1115, which determines one or more keypoints on the vehicle within an extracted frame. The one or more keypoints may include points on the vehicle which are easily identified from multiple angles, which may include, but is not limited to the center of a part of the vehicle, the corner of a part, the intersection of two or more parts, the midpoint of a part's side, and any other easily distinguished point on the vehicle. The keypoints may be output from keypoints module 1115 as coordinates corresponding to the location of the keypoints within a frame. In some examples, estimated motion output from motion estimation module 1119 may be used in updating the locations of the keypoints. In some examples, the locations of the keypoints may be updated using the estimated motion and output by the keypoints module 1115. In some examples, the location of the keypoints may be updated using the estimated motion and further updated when a new output from parts detection module 1114 is received. Updating the keypoints using the motion estimation may be performed faster and with less computing power than estimating the location of the keypoints based on an output from parts detection module 1114.

The keypoints output from keypoints module 1115 may be passed to position estimation module 1116 which estimates a position of the camera mobile device relative to the vehicle. In some examples, the position estimation module 1116 may additionally receive a 3D model of the vehicle as an input. The position estimation module 1116 may map the keypoints of a particular frame to corresponding points on the 3D model of the vehicle. The position estimation module 116 may calculate an estimated position of the camera which captured the particular frame. The estimated position may include a 3D position of the camera, a pan angle of the camera and a tilt angle of the camera used to capture the particular frame. In some examples, the estimated motion output from the motion estimation module 1119 may be used to update the estimated camera position between frames. As discussed herein, using the estimated motion in updating the outputs of a module may result in a faster calculation which utilizes less computing power.

The position output from the position estimation module 1116 may be sent to coverage estimation module 1117, in which the portions of the vehicle captured in video recorded by the user is determined. The coverage estimation module 1117 may receive as input the estimated position, the 3D model of the vehicle, and the extracted frame associated with the estimated position. The coverage estimation module 1117 may map the portions of the vehicle captured in the extracted frame to corresponding portions of the 3D model of the vehicle. In some examples, a texture may be applied to the 3D model of the vehicle corresponding to the portions of the vehicle captured in the extracted frames. In some examples, the 3D model of the vehicle may have a texture applied which is removed as corresponding portions of the vehicle are captured in extracted frames. The coverage estimation module 1117 may output a coverage estimation which may include the portions of the vehicle which have been captured and the portions of the vehicle which have not been captured.

The outputs from the coverage estimation module may be sent to video capture guidance software 1110 which generates instructions for the user to capture video of the vehicle, as discussed herein. The video capture guidance software may also receive outputs from the image quality assessment module 1104 which are also used in generating instructions, as discussed herein. The outputs of the video capture guidance software 1110 may be sent to user interface 1118 for displaying to the user. In some examples, the video capture guidance software 1110 may output instructions as text which may be displayed to the user. In some examples, the video capture guidance software 1110 may generate and output a representation of the portions of the vehicle which have been captured, such as the vehicle coverage icon 900 discussed with relation to FIGS. 9A-C.

Figure 12A:
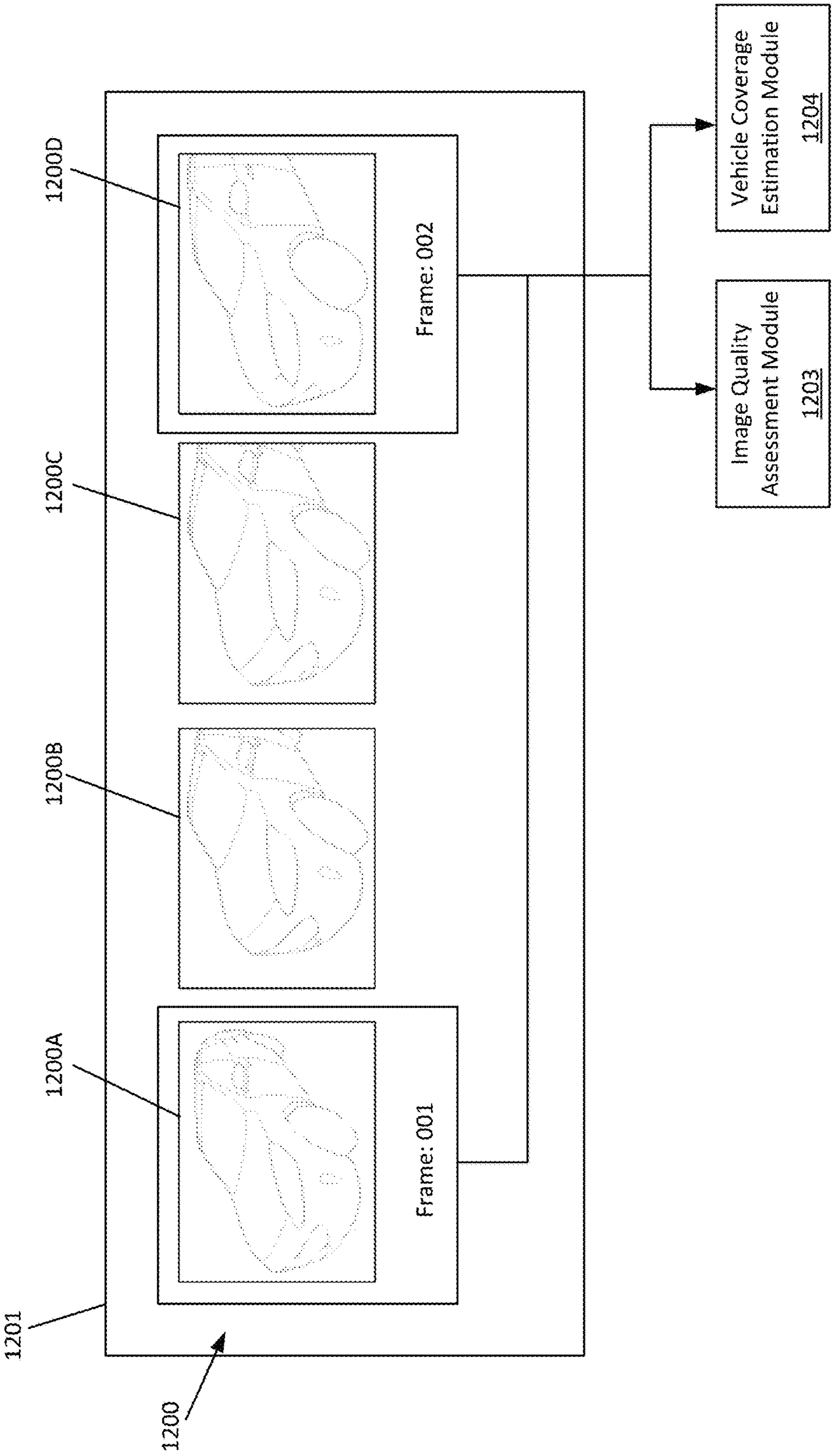
FIG. 12A illustrates a representation of a frame extraction module, in accordance with some embodiments of the technology described herein.

FIG. 12A illustrates a representation of a frame extraction module, in accordance with some embodiments of the technology described herein. The frame extraction module 1201 may be within a mobile device as described herein. The frame extraction module 1201 may receive video 1200 from the camera of the mobile device. The video 1200 may include a series of frames including frames 1200A, 1200B, 1200C and 1200D. The frames may be captured sequentially from left to right, as shown. While only four frames are shown, the process performed by frame extraction module 1201 may be performed on all frames of the video.

The frame extraction module 1201 may determine one or more frames to extract from the video 1200. The one or more frames may be extracted according to a rule or set of rules. For example, frames may be extracted according to a set sampling rate, an estimated frame quality, an estimated view of the vehicle within the frame, and one or more conditions of the mobile device. As shown, the frames are extracted at a set sampling rate, in which every third frame is extracted from the video. Therefore, frames 1200A and 1200D are extracted from the video.

Extracted frames 1200A and 1200D are each given a unique identifier, Frame: 001 and Frame: 002, respectively. Frame: 001 and Frame: 002 are sent to image quality assessment module 1203 and vehicle coverage estimation module 1204 for analysis, as discussed herein.

Figure 12B:
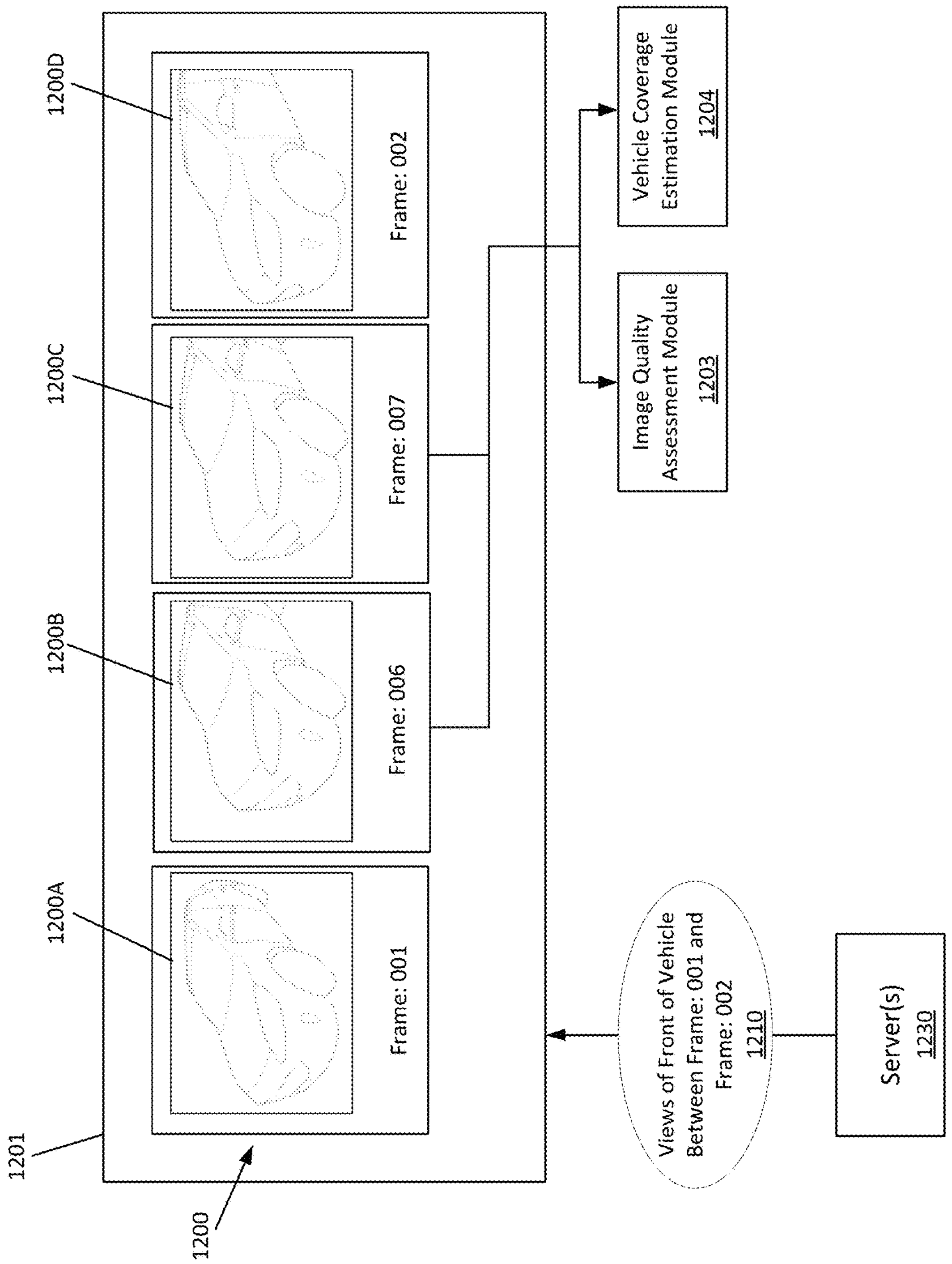
FIG. 12B illustrates a representation of a frame extraction module receiving a frame request from a server, in accordance with some embodiments of the technology described herein.

FIG. 12B illustrates a representation of a frame extraction module receiving a frame request from a server, in accordance with some embodiments of the technology described herein. Frame extraction module 1201 includes video 1200 with frames 1200A-1200D. As discussed with relation to FIG. 12A, frames 1200A and 1200D have been extracted. These extracted frames may have been processed and sent to server 1230 for further analysis.

Server 1230 may determine additional information about the portions of the vehicle contained in Frame: 001 and Frame: 002 is required. Additional information may be required about a portion of the vehicle for multiple reasons, including identified defects in the portion of the vehicle, obstructions to the view of the portion of the vehicle, and an incomplete view of the portion of the vehicle, as determined by the server 1230.

The server may request one or more particular frames from the mobile device by sending a frame request 1210. In response to the frame request, the frame extraction module will determine one or more frames to send to the server. As discussed herein, the frame extractor does not extract all frames from video 1200 for analysis, leaving some frames unextracted. These unextracted frames may be extracted in response to a frame request 1210.

In some examples, the frame request may specify a portion of the vehicle about which additional information is needed, for example the front of the vehicle, as shown. In such examples, the frame extractor may query a coverage estimation module within the mobile device to determine which extracted frames contained a view of the front of the vehicle. The frame extractor may then extract the unextracted frames between, and/or around the frames which contained a view of the front of the vehicle.

In some examples, the frame request 1210 may specify specific unextracted frames to extract, for example between Frame: 001 and Frame: 002, as shown. The server 1230 may identify these unextracted frames based on the criteria used for extracting frames and the frames received from the mobile device.

In some examples, the frame request 1210 may specify portions of the vehicle which have not been captured. In such examples, the frame extraction module 1201 may provide information on the portions of the vehicle specified in the frame request 1210 to video capture guidance software, which may provide instructions to the user to capture video of these portions of the vehicle.

The frame extraction module 1201 may proceed to extract the unextracted frames corresponding to the frame request 1210. As shown, these are frames 1200B and 1200C, which are given unique identifiers Frame: 006 and Frame: 007, respectively. Frame: 006 and Frame: 007 may be sent to image quality assessment module 1203 and vehicle coverage estimation module 1204 for processing, as discussed herein. In some examples, Frame: 006 and Frame: 007 may be sent directly to server 1230.

In some examples, the frame extraction module 1201 may adjust the frame sampling rate based on the current battery and/or bandwidth of the mobile device. For example, if the device has low battery, the frame sampling rate may be reduced to save battery of the device, maximizing the portions of the vehicle which are captured before the device runs out of battery. Additionally, if the device has low bandwidth, the frame sampling rate may be reduced to optimize performance of the device.

Figure 13A:
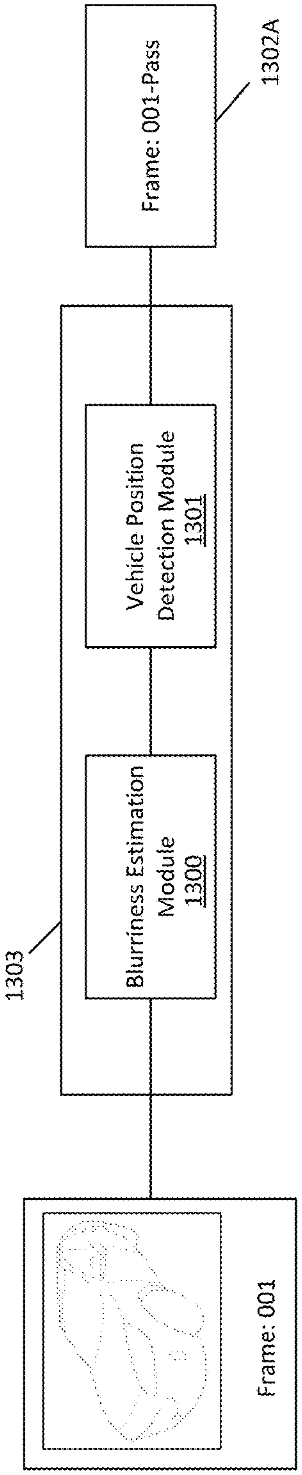
FIG. 13A illustrates an example image quality assessment module assessing a frame which complies with image quality criteria, in accordance with some embodiments of the technology described herein.
Figure 13B:
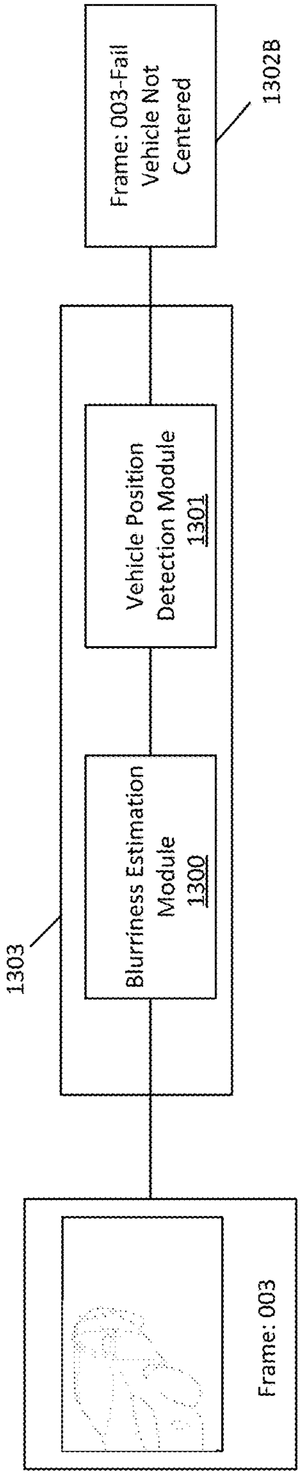
FIG. 13B illustrates an example of the image quality assessment module assessing a frame which does not comply with vehicle position criteria, in accordance with some embodiments of the technology described herein.
Figure 13C:
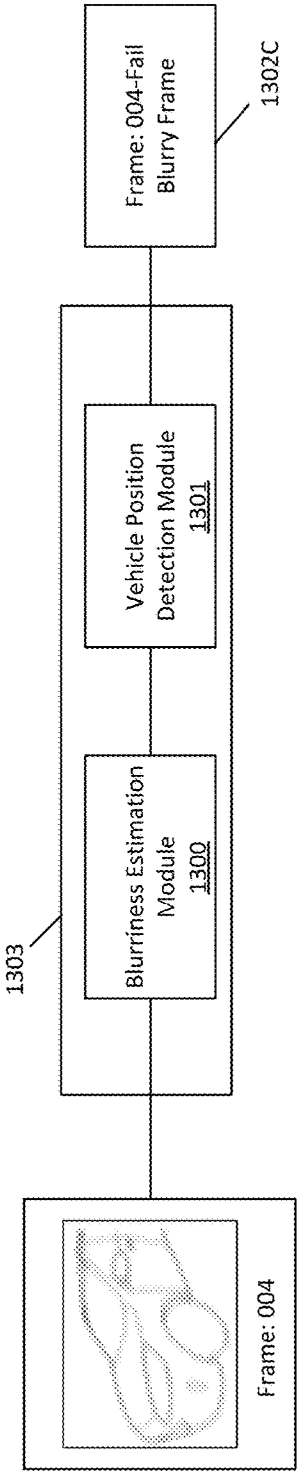
FIG. 13C illustrates an example of the image quality assessment module assessing a frame which does not comply with image blurriness criteria, in accordance with some embodiments of the technology described herein.

FIGS. 13A-13C illustrate an image quality assessment module, according to some aspects of the technology discussed herein. The image quality assessment module may be within a mobile device, and may assess all extracted frames, as discussed herein.

FIG. 13A illustrates an example image quality assessment module assessing a frame which complies with image quality criteria, in accordance with some embodiments of the technology described herein. The input to image quality assessment module 1303 is Frame: 001. Frame: 001 may be passed to a blurriness estimation module 1300 and a vehicle position detection module 1301.

The blurriness estimation module 1300 may determine a level of blurriness within the input frame. The blurriness estimation module 1300 may then compare the determined level of blurriness to a threshold level of blurriness. If the determined level of blurriness is above the threshold level, the input frame does not comply with the blurriness quality criterion and the frame may fail the image quality inspection.

The vehicle position detection 1301 module may determine the size and location of the vehicle within the input frame. The vehicle position detection module may determine if the size of the vehicle within the input frame complies with a vehicle size criterion. This may be performed by determining the area of the input frame occupied by the vehicle and comparing this to a threshold area or a threshold percentage. If the area of the input frame occupied by the vehicle is above the threshold, the input frame complies with the vehicle size criteria. The vehicle position detection module may also determine if the position of the vehicle within the input frame complies with vehicle position criterion. This may be performed by determining a centroid of the vehicle within the input frame and comparing the position of the centroid to a threshold centroid region. The threshold centroid region may be a region within a frame in which a vehicle is centered within the frame. If the centroid of the vehicle is within the threshold centroid region, the frame complies with the vehicle position criterion.

In some examples, the blurriness estimation module 1300 may determine the frame does not comply with the blurriness criteria and the frame is not passed to the vehicle position detection module 1301. In some examples, the vehicle position detection module 1301 may receive the input frame before the blurriness estimation module 1300. In some examples the vehicle position detection module 1301 may not pass the frame to the blurriness estimation module 1300 if the frame does not comply with vehicle position criteria. In some examples, the blurriness estimation module 1300 and vehicle position detection module may analyze a frame in parallel.

The output 1302 of the image quality assessment module is an indication of whether the input frame complies with image quality criteria. In FIG. 13A, input Frame: 001 complies with image quality criteria and output 1302A indicates the frame has passed.

FIG. 13A illustrates an example image quality assessment module assessing a frame which complies with image quality criteria, in accordance with some embodiments of the technology described herein. Frame: 003 is the input to the image quality assessment module 1303. Frame: 003 is not blurry and therefore may be determined to comply with image blurriness criterion by blurriness estimation module 1300. As shown, the view of the vehicle within Frame: 003 is not centered in the frame. Therefore, vehicle position detection module 1301 may determine the position of the vehicle within the frame does not comply with vehicle position criterion and fails the image quality assessment, indicated by output 1302B. Output 1302B may include information on why the associated input frame failed inspection, “vehicle not centered”, as shown.

FIG. 13C illustrates an example of the image quality assessment module assessing a frame which does not comply with image blurriness criteria, in accordance with some embodiments of the technology described herein. The input Frame: 004 is blurry and the details of the vehicle within the image may not be discernable for proper analysis. Therefore, when analyzed by blurriness estimation module 1300, the Frame: 004 is found not to comply with the image blurriness criterion and fails the image quality assessment. As shown, output 1302C indicates Frame: 004 has failed the image quality assessment and is a blurry frame.

The outputs 1302 from image quality assessment module 1303 may be passed to video capture guidance software and a frame selection module within the mobile device, as described herein.

Figure 14:
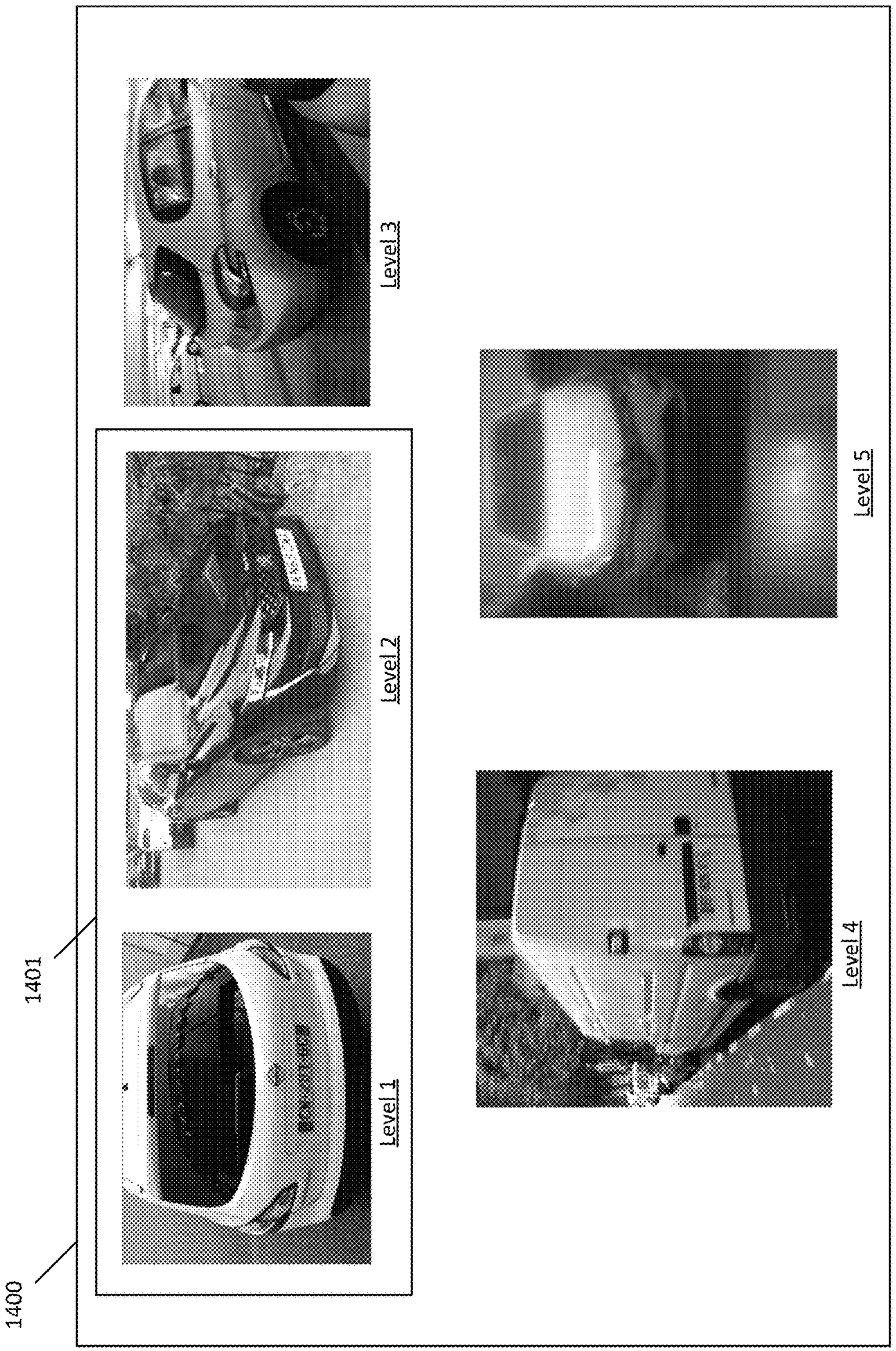
FIG. 14 illustrates example levels of blurriness which may be determined by a blurriness estimation module, in accordance with some embodiments of the technology described herein.

FIG. 14 illustrates example levels of blurriness which may be determined by a blurriness estimation module, in accordance with some embodiments of the technology described herein. The blurriness estimation module may be within a mobile device as described herein. The blurriness estimation module 1400 may determine five levels of blurriness, as shown. In some examples, greater or fewer levels of blurriness may be determined. The blurriness estimation module 1400 may have a threshold level of blurriness, above which a frame does not comply with the blurriness criteria. As shown the threshold level of blurriness is level 2. Compliant levels 1401 include Level 1 and Level 2, which are below the threshold.

Representative images of vehicles are shown for each level of blurriness. Level 1 is an image of a vehicle with no blur. Level 2 is an image of a vehicle, in which the vehicle does not appear sharp, however details of the vehicle may be discerned. Level 3 has a level of blur which reduces the visibility of details of the vehicle. At Level 4, the blur deforms the shape of the vehicle within the frame. At level 5, the vehicle is completely deformed by the blur in the image.

In some examples, the blurriness estimation module 1400 may use a trained neural network to estimate the level of blurriness within the frames. The trained neural network may be trained on training images, annotated with a level of blurriness corresponding to the levels 1-5, as discussed herein. The training images may receive multiple levels of blurriness from multiple annotators and an average level is assigned to each training image. In some examples, the trained neural network may be a convolutional neural network. In some examples, the trained neural network may be based on the MobileNet V3 network (or its other versions) described by Howard, A. G. et al. "Mobilenets: Efficient convolutional neural networks for mobile vision applications." arXiv preprint arXiv: 1704.04861 (2017), which is incorporated by reference herein in its entirety. In some embodiments, the one or more trained neural networks include between 100,000 and 500,000 parameters, 100,000 and 1 million parameters, 100,000 and 2 million parameters, 100,000 and 3 million parameters, 1 million and 3 million parameters, or 2 million and 3 million parameters. For example, the one or more trained machine learning models may include approximately 2.5 million parameters.

Figure 15A:
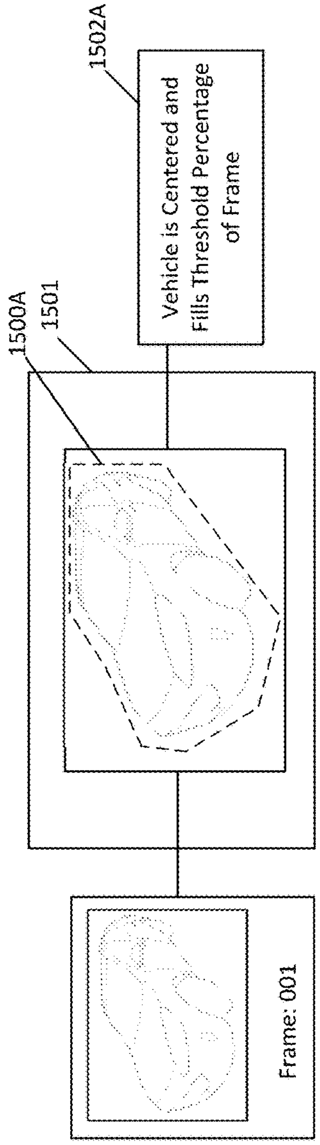
FIG. 15A illustrates an example of a vehicle position detection module, in which the input complies with vehicle position and size criteria, in accordance with some embodiments of the technology described herein.
Figure 15B:
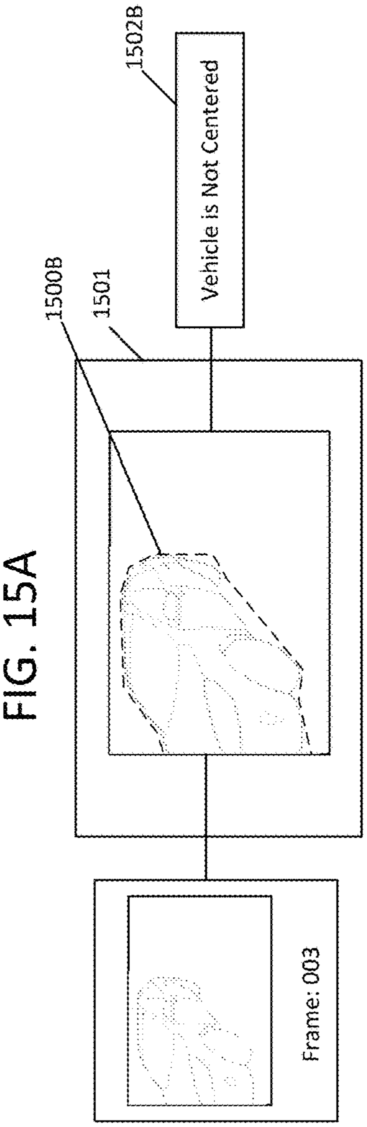
FIG. 15B illustrates an example of a vehicle position detection module, in which the input does not comply with vehicle position criteria, in accordance with some embodiments of the technology described herein.
Figure 15C:
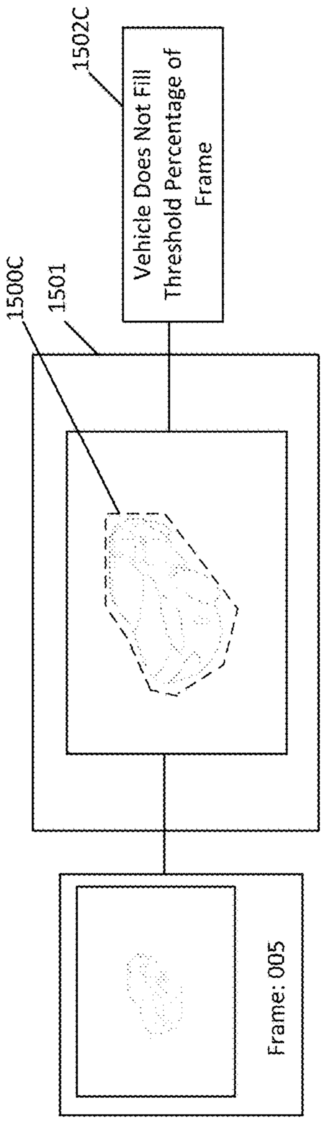
FIG. 15C illustrates an example of a vehicle position detection module, in which the input does not comply with the vehicle size criteria, in accordance with some embodiments of the technology described herein.

FIGS. 15A-C illustrate examples of a vehicle position detection module, according to some aspects of the technology described herein. The vehicle position detection module 1501 may be within a mobile device as described herein. The vehicle position detection module 1501 may assess all extracted frames.

FIG. 15A illustrates an example of a vehicle position detection module, in which the input complies with vehicle position and size criteria, in accordance with some embodiments of the technology described herein. The vehicle position detection module may determine whether the input frame complies with a vehicle position criterion and a vehicle size criterion by generating a polygon surrounding the vehicle within the frame.

In FIG. 15A, the input frame is Frame: 001. Vehicle position detection module 1501 determines polygon 1500A surrounding the vehicle within the input frame. The vehicle position detection module 1501 may determine the compliance of the frame with vehicle size criteria by calculating the area of the polygon 1500A and comparing the area to a threshold area. If the area is above the threshold area, the frame complies with the vehicle size criteria. In some examples, the threshold area may be a percentage of the frame, and the percentage of the frame covered by the polygon is compared to the threshold area percentage.

The vehicle position detection module 1501 may determine the compliance of the frame with vehicle position criteria by determining a centroid of the polygon 1500A and comparing the location of the centroid to a threshold centroid region. The threshold centroid region may be a region within a frame corresponding to locations at which the view of the vehicle is centered within the frame. If the location of the centroid of the polygon is not within the threshold centroid region, the frame does not comply with the vehicle position criteria.

As shown, Frame: 001 complies with image position and size quality criteria, and the vehicle position detection module output 1502A indicates the vehicle is centered in the frame and fills the threshold percentage of the frame.

FIG. 15B illustrates an example of a vehicle position detection module, in which the input does not comply with vehicle position criteria, in accordance with some embodiments of the technology described herein. As shown, the input to the vehicle position detection module 1501 is Frame: 003, in which the view of the vehicle is on the left side of the frame. The vehicle position detection module 1501 may determine polygon 1500B surrounding the vehicle within Frame: 003. The centroid of the polygon may not be located within the threshold centroid region, and therefore the frame does not comply with the vehicle position criteria. Output 1502B indicates that the vehicle is not centered within the frame.

FIG. 15C illustrates an example of a vehicle position detection module, in which the input does not comply with the vehicle size criteria, in accordance with some embodiments of the technology described herein. As shown, the input to the vehicle position detection module 1501 is Frame: 005, in which the view of the vehicle does not fill the frame. The vehicle position detection module 1501 may determine a polygon 1500C surrounding the vehicle within Frame: 005. The percentage of the frame covered by polygon 1500C is below the threshold area and therefore the frame does not comply with the vehicle size criteria. Output 1502C indicates that the vehicle does not fill the threshold percentage of the frame.

Figure 16:
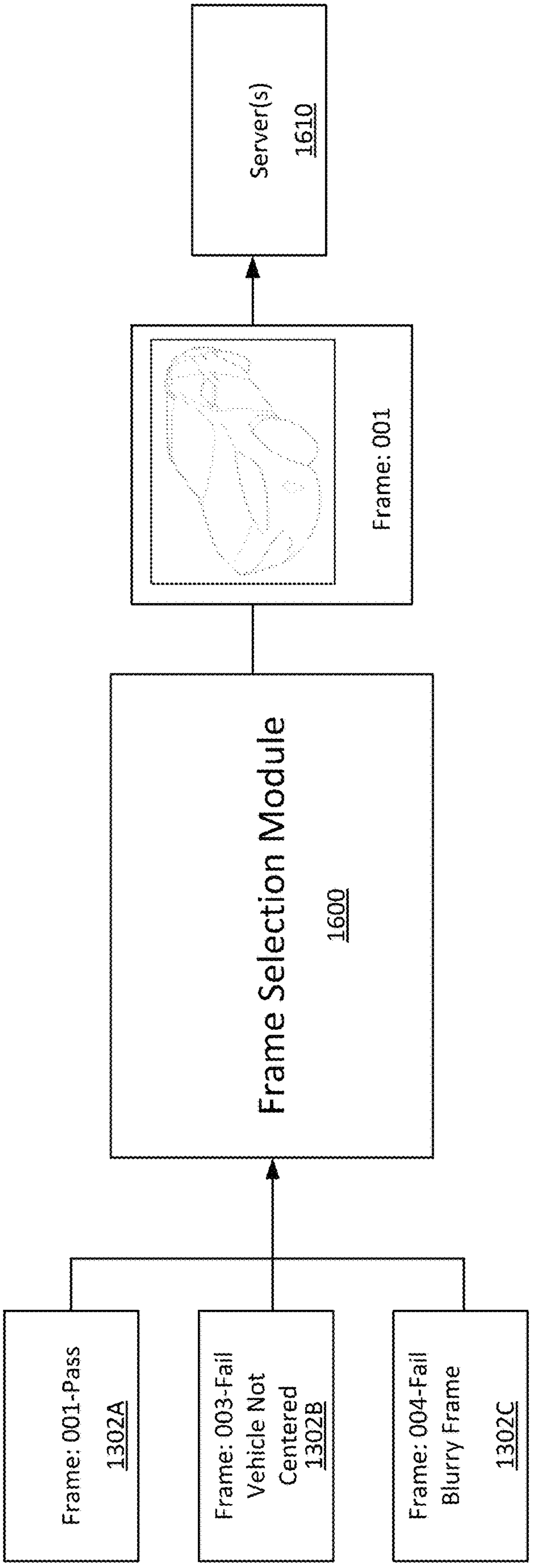
FIG. 16 illustrates an example frame selection module in accordance with some embodiments of the technology described herein.

FIG. 16 illustrates an example frame selection module in accordance with some embodiments of the technology described herein. The frame selection module may be within a mobile device as described herein. The inputs to the frame selection module 1600 may include outputs from the image quality assessment module of the mobile device and associated frames, as described herein.

The frame selection module 1600 may analyze the inputs to determine, which, if any, of the associated frames comply with the image quality criteria as discussed herein. The inputs to frame selection module 1600, as shown, are the outputs from vehicle quality assessment module 1303, as discussed herein. Input 1302A indicates Frame: 001 complies with vehicle quality criteria. Input 1302B indicates Frame: 003 does not comply with vehicle quality criteria. Input 1302C indicates Frame: 004 does not comply with vehicle quality criteria. Based on these inputs, only Frame: 001 complies with vehicle quality criteria, therefore Frame: 001 is selected and sent to servers 1610 for analysis. Frame: 003 and Frame: 004 are not selected, and therefore are not sent to server 1610 for analysis. In some examples, frames not complying with one or more image quality criteria may be sent to servers 1610 analysis. For example, a frame complying with the blurriness criterion, but no the vehicle position criterion may be sent to servers 1610 for analysis.

Figure 17:
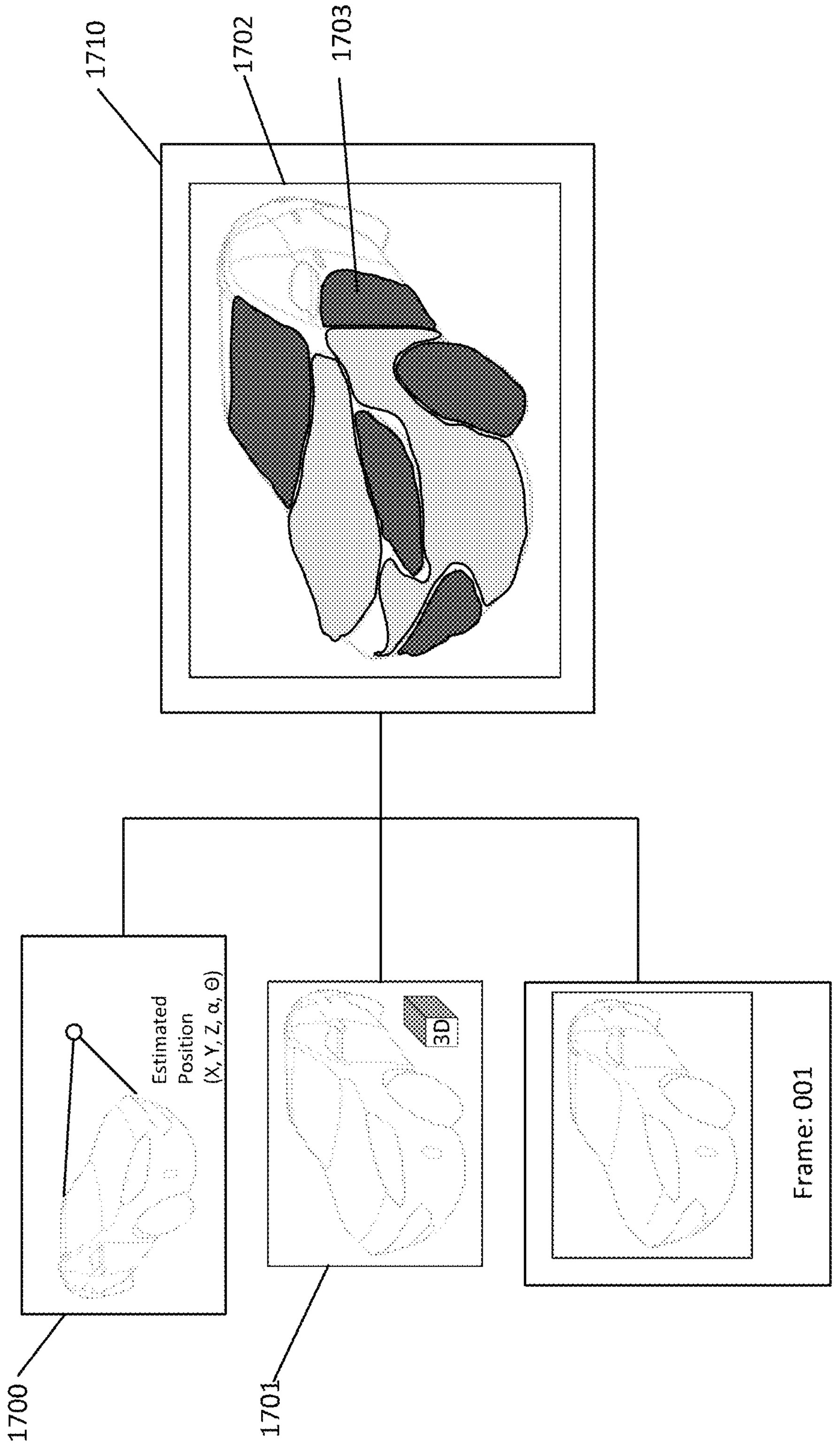
FIG. 17 illustrates an example vehicle coverage estimation module, in accordance with some embodiments of the technology described herein.

FIG. 17 illustrates an example vehicle coverage estimation module, in accordance with some embodiments of the technology described herein. The vehicle coverage estimation module may be within a mobile device as described herein. The vehicle coverage estimation module may analyze all captured frames. Shown are inputs to the vehicle coverage estimation module, vehicle coverage estimation module 1710, and vehicle coverage representation 1702.

The inputs to the vehicle coverage estimation module 1710 may include an estimated position 1700 of the camera of the mobile device with respect to the vehicle, a 3D model of the vehicle 1701, and an extracted frame, Frame: 001. The vehicle coverage estimation module 1710 may map the portions of the vehicle captured in the extracted frames to the 3D model of the vehicle 1701.

As shown, captured portions of the vehicle may be shaded on a vehicle coverage representation 1702. The vehicle coverage representation 1702 may include the 3D model of the vehicle 1701, with a texture 1703 applied. The texture 1703 may be mapped to and applied to portions of the vehicle captured in the extracted frames. As shown, the texture 1703 is applied to the portions of the model of the vehicle 1701 captured in extracted frame, Frame: 001. In some examples, the pixel values of texture 1703 may be generated based on the image of the vehicle within the extracted frame. In some examples, the texture 1703 may have a single pixel value. In some examples, the texture 1703 is applied to the entirety of the model of the vehicle before video of the vehicle is obtained, and the texture is removed from portions of the model of the vehicle corresponding to the portions of the vehicle captured in extracted frames.

In some examples, the texture 1703 may be analyzed to determine the portions of the vehicle which are to be recorded by the user. For example, the portions of the 3D vehicle model 1701 which are not covered by the texture 1703 may be used to generate instructions for the user to capture corresponding portions of the vehicle. In some examples, the vehicle coverage estimation module may compare the area of the 3D vehicle model 1701 covered by texture 1703 to a threshold area. If the area of the 3D vehicle model 1701 covered by texture 1703 is greater than the threshold area, the vehicle may be considered sufficiently captured and the user is not instructed to capture additional video of the vehicle. Selected frames from the captured video may then be sent to a server for vehicle condition assessment, such as discussed with regard to FIG. 8. If the area of the 3D vehicle model 1701 covered by texture 1703 is not greater than the threshold area, additional instructions for capturing the portions of the vehicle not covered by texture 1703 may be provided to the user. In some examples, the 3D vehicle model 1701 may have one or more non-covered regions, which are not covered by texture 1703. The areas of the one or more non-covered regions may be compared to a threshold area, and if the areas of the non-covered regions are greater than the threshold area, instructions may be provided to the user to capture video of the portions of the vehicle corresponding to the non-covered regions with areas above the threshold.

Figure 18:
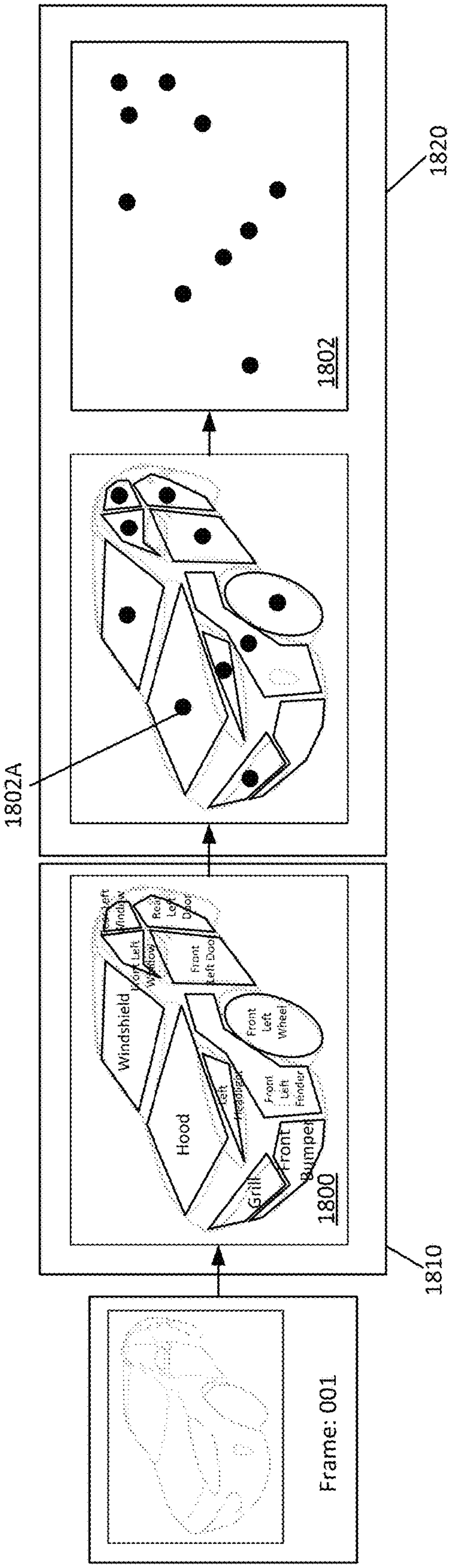
FIG. 18 illustrates an example parts detection module and keypoints module, in accordance with some embodiments of the technology described herein.

FIG. 18 illustrates an example parts detection module and keypoints module, in accordance with some embodiments of the technology described herein. The parts detection module may be within a mobile device as described herein. The parts detection module 1810 may receive an extracted frame, Frame: 001, as an input, and output the locations of the parts of the vehicle 1800. The parts detection module may analyze all extracted frames.

The parts detection module 1810 may employ a machine learning model to determine the parts 1800 contained within each extracted frame. The machine learning model may be a trained deep neural network model. The trained deep neural network may comprise multiple parameters (e.g., at least 10 million, at least 25 million, at least 50 million, or at least 100 million parameters) and their values may be used to identify vehicle parts in renderings of the vehicle.

In some embodiments, the trained deep neural network model may be any suitable semantic segmentation deep neural network. A semantic segmentation deep neural network may be any neural network that identifies labels for individual pixels (e.g., some or all pixels in an image). For example, the trained deep neural network model may have (or be based on) the DeepLabv3+ architecture (or its other versions) described by Chen, L. et al. "DeepLab: Semantic Image Segmentation with Convolutional Nets, Atrous Convolution, and Fully Connected CRFs." IEEE Transactions on Pattern Analysis and Machine Intelligence, vol. 40, no. 4, pp. 834-848 (2017) and Chen, L., et. al. ("Encoder-decoder with atrous separable convolution for semantic image segmentation." In Proceedings of the European conference on computer vision (ECCV). 2018. pp. 801-818.).

As another example, the trained deep neural network model may be a convolutional neural network having one or more fully connected layers, a U-Net convolutional neural network having (or being based on) the architecture described by Olaf Ronneberger, Philipp Fischer, Thomas Brox in "U-Net: Convolutional Networks for Biomedical Image Segmentation", Medical Image Computing and Computer-Assisted Intervention (MICCAI), Springer, LNCS, Vol. 9351:234-241, 2015, ResNet, MobileNet, Xception or any other suitable deep learning architecture. Aspects of ResNet are described in He, K. et al. "Deep Residual Learning for Image Recognition." CVPR (2016).

In some embodiments, the trained neural network model may be trained to identify parts of a vehicle using a training dataset of labeled vehicle images. The training data set may include any suitable number of images including at least 500 images, at least 10,000 images, at least 100K images, at least 1M images, at least 10M images, between 500 and 10,000 images, between 1000 and 10M images or any other suitable range between these ranges. The images used to train the deep neural network model may include images of physical vehicles with the parts of the vehicles labeled. The parts of the vehicle may be labeled by hand in order to ensure the accuracy of the labeling. The parts may be outlined on the images of the vehicle. In some examples, images may be provided for training a pair of images including an unlabeled image and an image corresponding to the unlabeled image with vehicle parts labeled. The parts detection module 1810 may generate a polygon corresponding to each part of the vehicle visible within a given frame. The polygons may outline the parts visible within frame input to the parts detection module 1810. As shown, the grill, front bumper, left headlight, hood, front left fender, front left wheel, windshield, front left window, front left door, rear left window, and rear left door have been outlined with polygons and labeled as parts of the vehicle 1800. The polygons generated by the parts detection module 1810 may not follow the exact outlines of the vehicle parts to reduce the amount of computation utilized thereby increasing the speed of the parts detection process.

The parts of the vehicle 1800 may include information specifying the identity, size, shape, and location of each part of the vehicle identified by parts detection module 1820.

The parts of the vehicle 1800 may be sent to keypoints module 1820, which may determine one or more keypoints 1802 based on the parts of the vehicle 1800. The one or more keypoints 1802 may include static points on the vehicle which are easily identified from multiple angles, which may include, but is not limited to the center of a part of the vehicle, the corner of a part, the intersection of two or more parts, the midpoint of a part's side, and any other easily distinguished point on the vehicle.

As shown, keypoints 1802 may be generated using the vehicle parts 1800 output from parts detection module 1810. For example, keypoint 1802A corresponds to the center of the hood of the vehicle. In some examples, each part of vehicle parts 1800 may have an associated keypoint. In some examples, one or more parts identified in vehicle parts 1800 may not have an associated keypoint. For example, as shown, the front bumper does not have an associated keypoint. Parts may not have an associated keypoint if they are not fully captured in a frame or if the view of the part is ambiguous within the frame such that a keypoint cannot be identified. In some examples, some parts may have multiple associated keypoints. Keypoints 1802 may be output from the keypoints module 1820 as coordinates corresponding to the locations of each keypoint within the respective frame.

Figure 19:
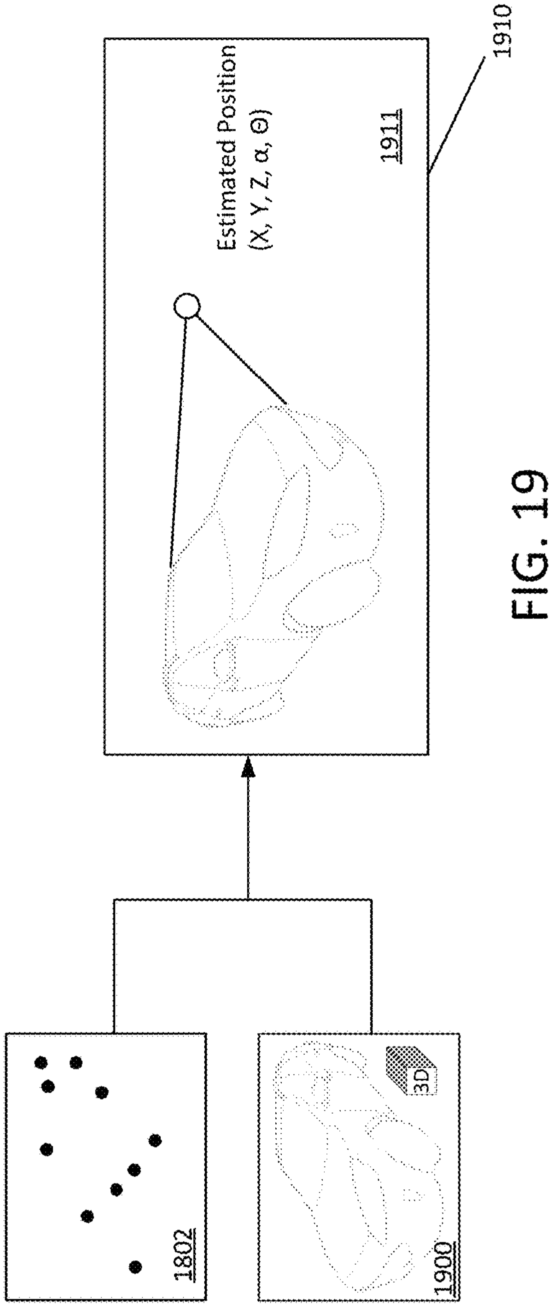
FIG. 19 illustrates an example position estimation module, in accordance with some embodiments of the technology described herein.

FIG. 19 illustrates an example position estimation module, in accordance with some embodiments of the technology described herein. The position estimation module may be within a mobile device as described herein. The position estimation module 1910 may receive keypoints 1802 from keypoints module 1820, and a 3D model of the vehicle 1900. The position estimation module 1910 may analyze keypoints associated with all extracted frames. The position estimation module 1910 may map the keypoints 1802 to respective locations on the 3D model of the vehicle 1900. From the mapped keypoints, the position estimation module 1910 may determine a position 1911 of the camera with respect to the vehicle which generated the received keypoints 1802.

The position 1911 may be a location in 3D coordinate system surrounding the vehicle, (X, Y, Z, a, Q). The origin of the coordinate system may have a height, Z, on plane corresponding to the ground. The 2D centroid of the vehicle when viewed from above may be used to generate the X and Y coordinates of the origin of the coordinate system. The X value of the origin may be the location of the centroid of the vehicle along a length of the vehicle and the Y value of the origin may be the location of the centroid of the vehicle along a width of the vehicle. The position 1911 may additionally include pan angle $\alpha$ and tilt angle $\Theta$. The pan angle $\alpha$ may be an angle of the camera in a plane parallel to the plane corresponding to the ground. The tilt angle may be an angle of the camera in a plane perpendicular to the plane corresponding to the ground. The estimated position 1911 may be output from position estimation module 1910 to a coverage estimation module, such as 1710, as discussed with reference to FIG. 17, as discussed herein.

Figure 20:
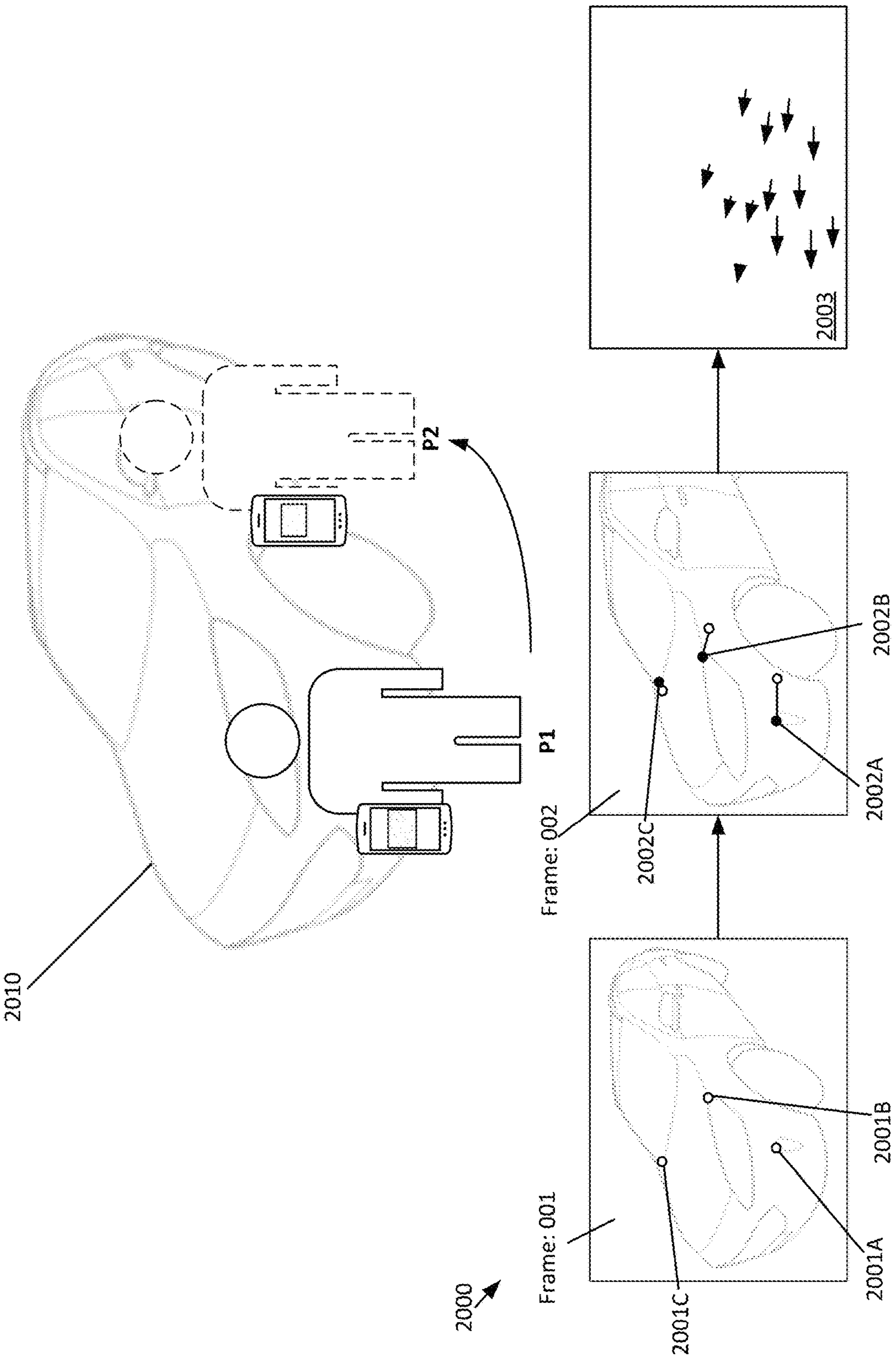
FIG. 20 illustrates an example of a process for estimating the motion of the mobile device, in accordance with some embodiments of the technology described herein.

FIG. 20 illustrates an example of a process for estimating the motion of the mobile device, in accordance with some embodiments of the technology described herein. The process of FIG. 20 may be performed within a motion estimation module as discussed herein. The process of FIG. 20 may be performed between all adjacent extracted frames.

Shown in FIG. 20 is a vehicle 2010, example user movement about the vehicle, and a process 2000 for estimating the movement of the user about the vehicle. As shown, the user may move from position P1, where Frame: 001 was captured to position P2, where Frame: 002 was captured.

Process 2000 may be performed within a motion estimation module as discussed herein. The process may begin by determining one or more points within a first frame, Frame: 001. The one or more points may be any suitable points which may be identified within the frame. Any suitable number of points may be used to determine the estimated movement, for example, fewer than 5 points, fewer than 10 points, fewer than 50 points, fewer than 100 points, fewer than 500 points, or greater than 500 points. The points may correspond to keypoints, as discussed herein, areas of high contrast within the frame, or other points within the frame recognized by the motion estimation module. Point 2001A corresponds to the edge of a feature of the vehicle located on the front left fender of the vehicle. Point 2001B corresponds to the back end of the left headlight of the vehicle. Point 2001C corresponds to a point on the edge of the windshield of the vehicle.

The process may then proceed to recognize these same points in a second frame, Frame: 002. In some examples, the second frame is an extracted frame adjacent to the first frame, such that the first frame is the frame extracted immediately before the second frame. The change in position of the points between the first frame and the second frame may be determined, shown as lines 2002A, 2002B and 2002C. As shown, line 2002A connects point 2001A from Frame: 001 to the related point in Frame: 002. The line moves from right to left, with little change in height. Line 2002B moves from right to left, and up within the frame. Line 2002C is short in length and does not show a substantial change in position, and therefore there is no estimated motion in the related portion of the frame.

The estimated motion 2003 may be output as one or more vectors representing the estimated movement between the adjacent frames. The estimated motion 2003 may be output as a vector field indicating estimated pixel movement at different locations within a frame. As shown, the lower pixels within the frame are estimated to move to the left, pixels in the middle height of the frame are estimated to move up and to the left, and upper pixels in the frame are estimated to have little to no movement. The estimated motion 2003 between Frame: 001 and Frame: 002 may be used to shorten calculation times and decrease computing power requirements for some processes, as discussed herein.

Figure 21:
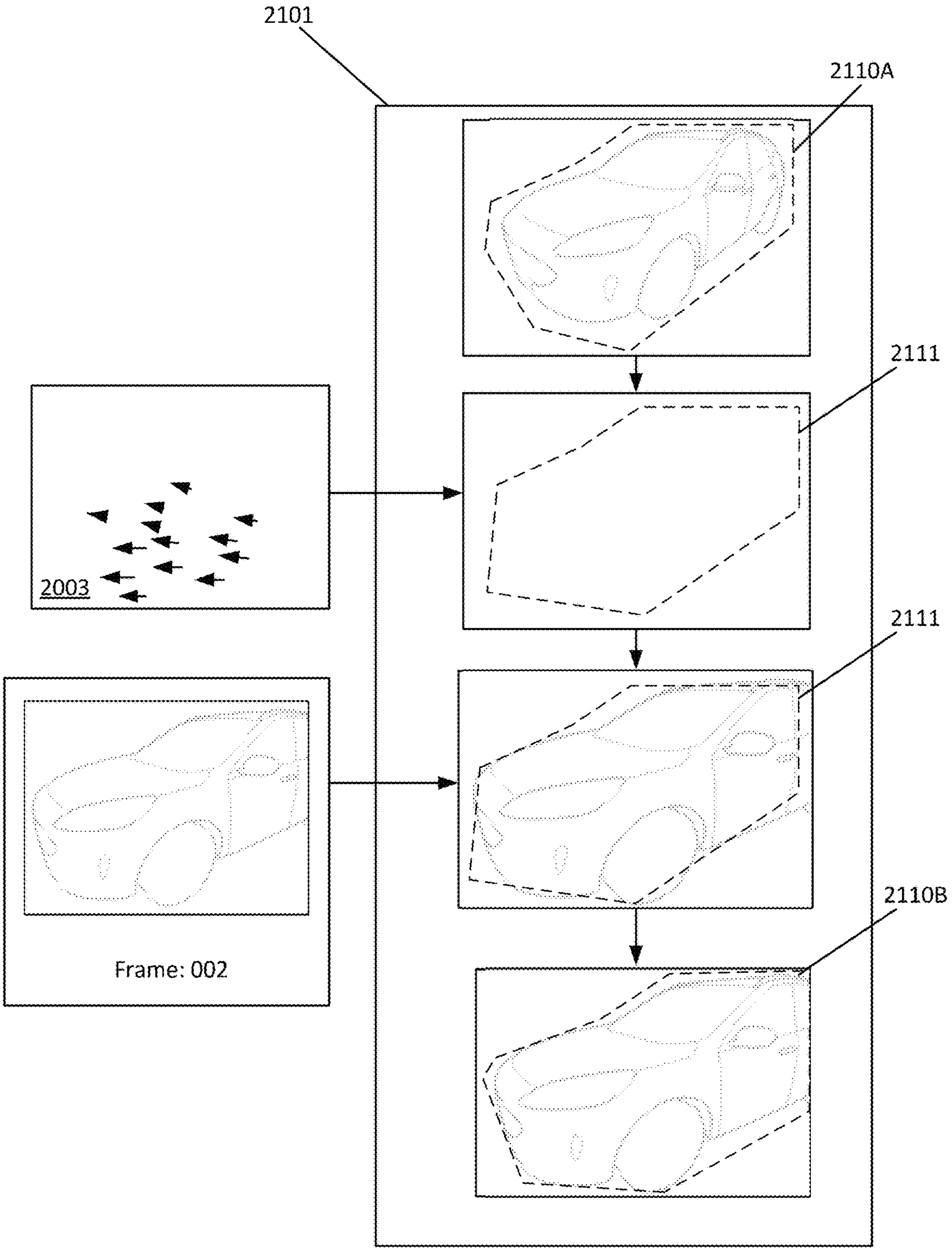
FIG. 21 illustrates an example of a vehicle position detection module updating a vehicle position based on estimated movement between frames, in accordance with some embodiments of the technology described herein.

FIG. 21 illustrates an example of a vehicle position detection module updating a vehicle position based on estimated movement between frames, in accordance with some embodiments of the technology described herein. The vehicle position detection module 2101 may use the estimated movement to update the vehicle position for all adjacent extracted frames.

Vehicle position estimation module 2101 may generate a polygon 2110A surrounding the vehicle within a frame of the video as discussed herein. The vehicle position estimation module 2101 may then receive estimated motion 2003 between adjacent frames from a motion estimation module, as discussed herein. The estimated motion 2003 may be used to generate an updated polygon 2111, which corresponds to an estimated position of the vehicle within the adjacent frame of the video. The estimated motion 2003 may be received by the vehicle position estimation module before the adjacent frame of the video is received. In some examples the updated polygon 2111 may be used to determine the compliance of the frame with image size and position quality criteria as discussed herein. In some examples, the adjacent frame may be received after the updated polygon 2111 is generated. The vehicle position estimation module may then determine a polygon 2110B surrounding the vehicle in the adjacent frame, Frame: 002. As discussed herein, determining the polygon 2110B based on the updated polygon 2111 and the adjacent frame may be performed in a shorter amount of time and with less computing power than determining a polygon from a frame alone. In addition, determining an updated polygon from estimated motion 2003 may be performed in a shorter time and with less computing power than determining a polygon from a frame.

Figure 22:
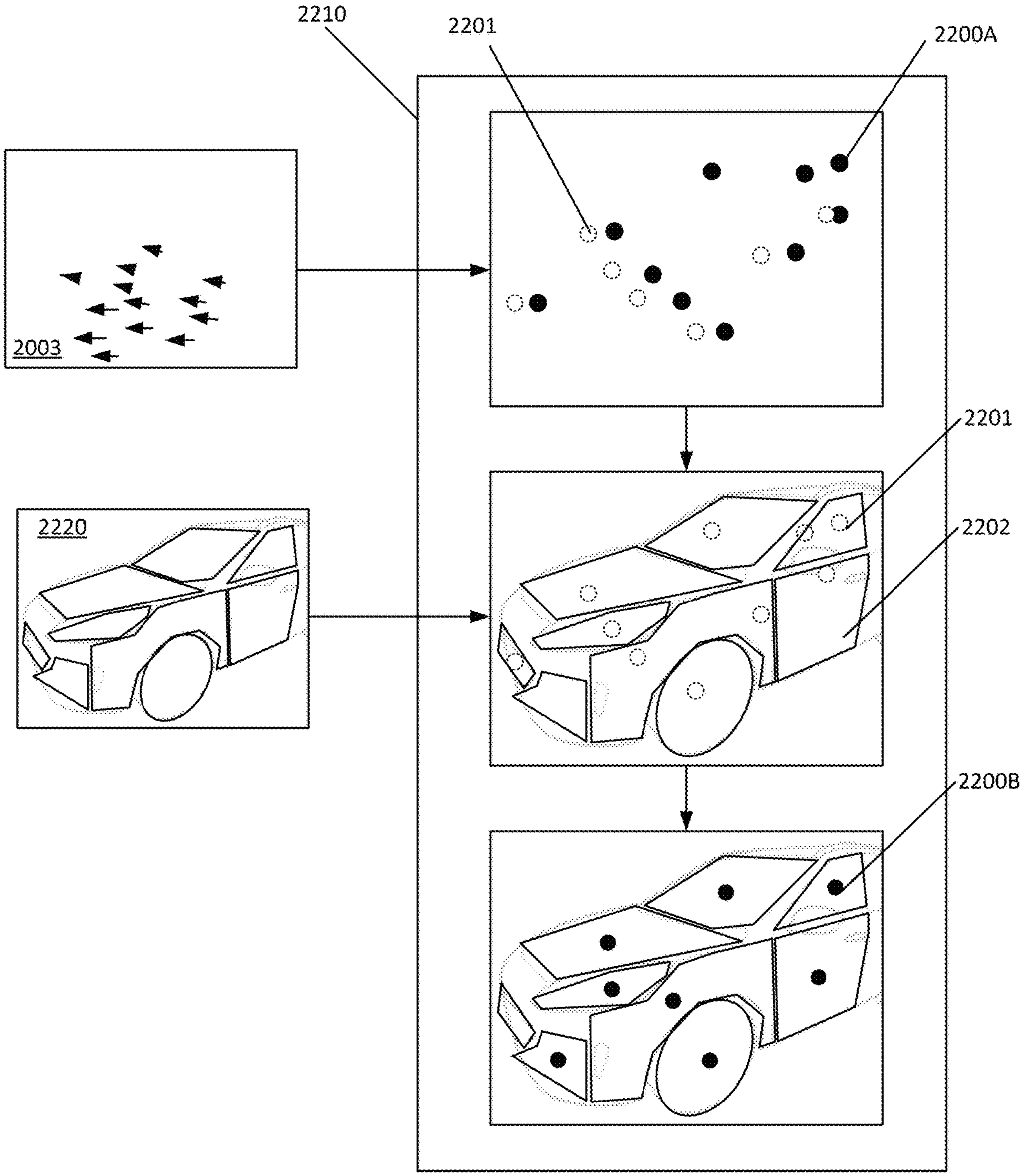
FIG. 22 illustrates an example of a keypoints module updating the position of keypoints based on estimated movement between frames, in accordance with some embodiments of the technology described herein.

FIG. 22 illustrates an example of a keypoints module updating the position of keypoints based on estimated movement between frames, in accordance with some embodiments of the technology described herein. The keypoints module 2210 may use the estimated movement to update the keypoints for all adjacent extracted frames.

Keypoints module 2210 may calculate an initial set of keypoints 2200A from vehicle parts locations, as discussed herein. Keypoints module 2210 may receive estimated motion to three and in response determine updated keypoints 2201 based on the initial keypoints 2200A and the estimated motion 2003. In some examples updated keypoints 2201 may be sent to a position estimation module and used to generate an estimated position, as discussed herein. In some examples, vehicle parts 2220 associated with a frame adjacent to the frame associated with keypoints 2200A may be received by the keypoints module. The keypoints module 2210 may determine the location of keypoints 2200B using the updated keypoints 2201 and vehicle parts 2220. As discussed herein, determining the keypoints 2200B based on the updated keypoints 2201 and the vehicle parts 2220 from the adjacent frame, may be performed in a shorter amount of time and with less computing power than determining keypoints from vehicle parts alone. In addition, determining updated keypoints from estimated motion 2003 may be performed in a shorter time and with less computing power than determining keypoints from a frame.

Figure 23:
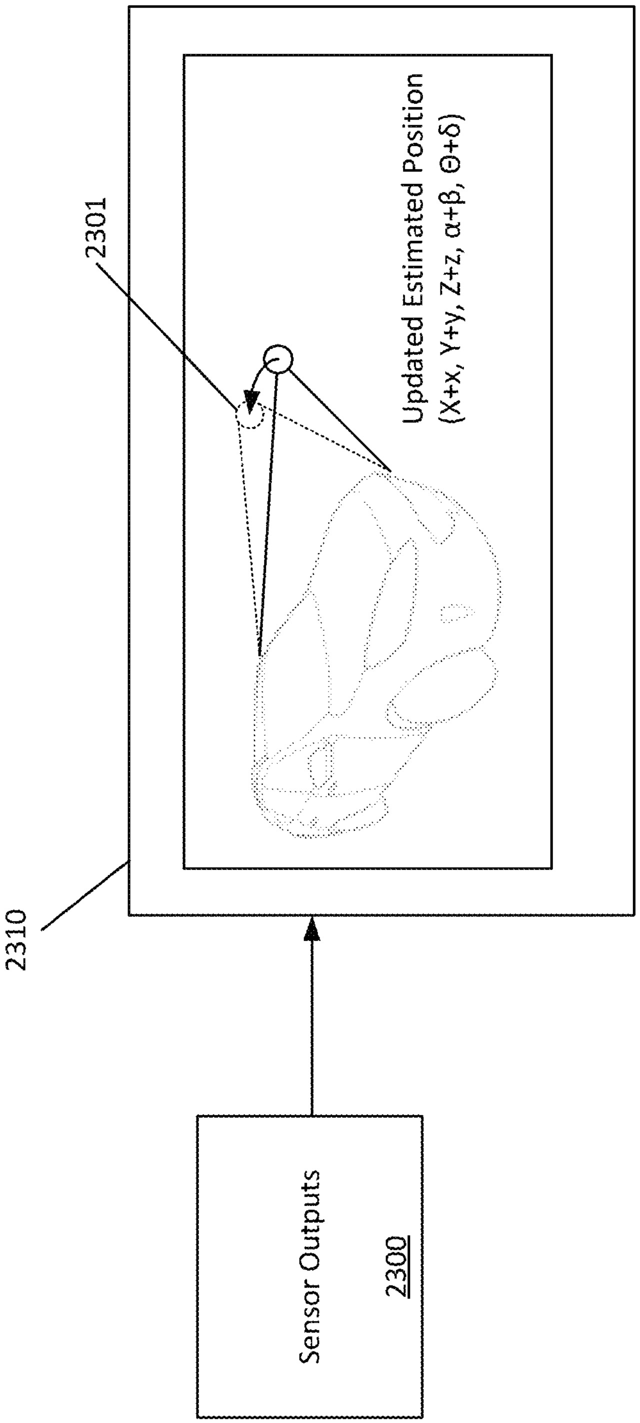
FIG. 23 illustrates an example position estimation module which updates a position based on mobile device sensor outputs, in accordance with some embodiments of the technology described herein.

FIG. 23 illustrates an example position estimation module which updates a position based on mobile device sensor outputs, in accordance with some embodiments of the technology described herein. The position estimation module may use the sensor outputs 2300 to update the estimated position for all extracted frames.

Sensor outputs 2300 may include outputs from one or more motion sensors of a mobile device, including but not limited to IMUs, accelerometers, gyroscopes, and GPS sensors. The position estimation module 2310 may receive and analyze the sensor outputs to determine an estimate of the movement of the mobile device. The position estimation module may estimate movement of the mobile device in a coordinate system relative to the vehicle, as described herein. The position estimation module may use the sensor outputs 2300 to estimate movement of the mobile device relative to the length of the vehicle, x, relative to the width of the vehicle, y, relative to the height of the vehicle, z, in a pan angle, β, and in a tilt angle, δ. The updated position of the vehicle may therefore be (X+x, Y+y, Z+z, α+β, Θ+δ), where (X, Y, Z, α, Θ), is the initial position of the vehicle determined based on a previous extracted frame. In some examples the updated position 2301 may be sent to a vehicle coverage estimation module as discussed herein. In some examples, an estimated position may be calculated using the updated position, keypoints associated with a subsequent frame, and a 3D model of the vehicle. As discussed herein, determining an estimated position from an updated position, keypoints and a 3D model of the vehicle, may be performed in a shorter amount of time and with less computing power than determining an estimated position from a keypoints and a 3D model of the vehicle. In addition, determining an updated position from estimated sensor outputs 2300 may be performed in a shorter time and with less computing power than determining an estimated position from keypoints and a 3D model of the vehicle.

Figure 24:
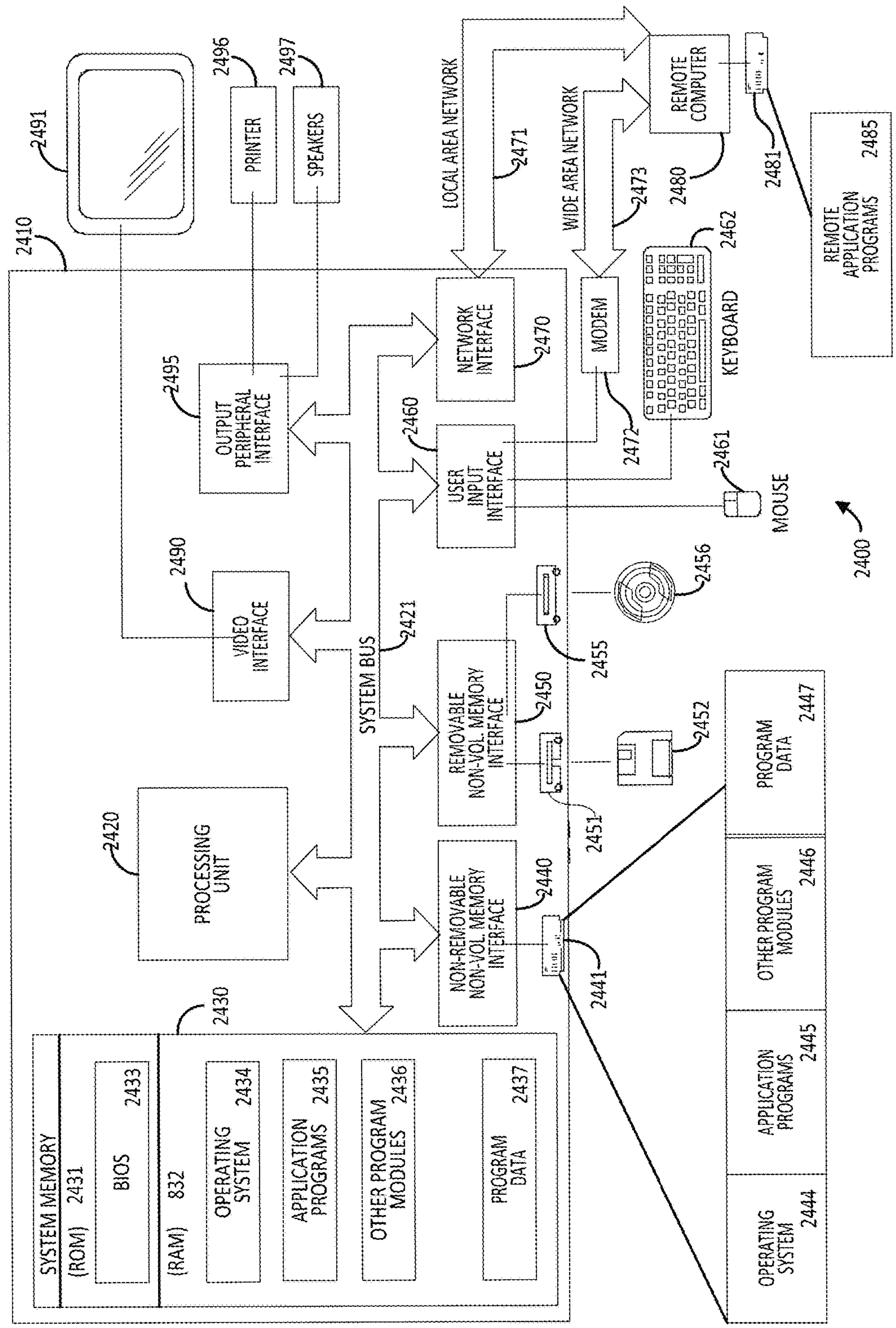
FIG. 24 shows a block diagram of an example computing device, in accordance with some embodiments of the technology described herein.

FIG. 24 shows a block diagram of an example computing device, in accordance with some embodiments of the technology described herein. The computing system environment 2400 is only one example of a suitable computing environment and is not intended to suggest any limitation as to the scope of use or functionality of the technology described herein.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 24, an example system for implementing the technology described herein includes a general-purpose computing device in the form of a computer 2410. Components of computer 2410 may include, but are not limited to, a processing unit 2420, a system memory 2430, and a system bus 2421 that couples various system components including the system memory to the processing unit 2420. The system bus 2421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 2410 typically includes a variety of computer readable media. Computer readable media can be any available media that can be accessed by computer 2410 and includes both volatile and nonvolatile media, removable and non-removable media. By way of example, and not limitation, computer readable media may comprise computer storage media and communication media. Computer storage media includes volatile and nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 2410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 2430 includes computer storage media in the form of volatile and/or nonvolatile memory such as read only memory (ROM) 2431 and random access memory (RAM) 2432. A basic input/output system 2433 (BIOS), containing the basic routines that help to transfer information between elements within computer 2410, such as during start-up, is typically stored in ROM 2431. RAM 2432 typically contains data and/or program modules that are immediately accessible to and/or presently being operated on by processing unit 2420. By way of example, and not limitation, FIG. 24 illustrates operating system 2434, application programs 2435, other program modules 2436, and program data 2437.

The computer 2410 may also include other removable/non-removable, volatile or nonvolatile computer storage media. By way of example only, FIG. 24 illustrates a hard disk drive 2441 that reads from or writes to non-removable, nonvolatile magnetic media, a flash drive 2451 that reads from or writes to a removable, nonvolatile memory 2452 such as flash memory, and an optical disk drive 2455 that reads from or writes to a removable, nonvolatile optical disk 2456 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 2441 is typically connected to the system bus 2421 through a non-removable memory interface such as interface 2440, and magnetic disk drive 2451 and optical disk drive 2455 are typically connected to the system bus 2421 by a removable memory interface, such as interface 2450.

The drives and their associated computer storage media described above and illustrated in FIG. 24, provide storage of computer readable instructions, data structures, program modules and other data for the computer 2410. In FIG. 24, for example, hard disk drive 2441 is illustrated as storing operating system 2444, application programs 2445, other program modules 2446, and program data 2447. Note that these components can either be the same as or different from operating system 2434, application programs 2435, other program modules 2436, and program data 2437. Operating system 2444, application programs 2445, other program modules 2446, and program data 2447 are given different numbers here to illustrate that, at a minimum, they are different copies. An actor may enter commands and information into the computer 2410 through input devices such as a keyboard 2462 and pointing device 2461, commonly referred to as a mouse, trackball, or touch pad. Other input devices (not shown) may include a microphone, joystick, game pad, satellite dish, scanner, or the like. These and other input devices are often connected to the processing unit 2420 through a user input interface 2460 that is coupled to the system bus, but may be connected by other interface and bus structures, such as a parallel port, game port or a universal serial bus (USB). A monitor 2491 or other type of display device is also connected to the system bus 2421 via an interface, such as a video interface 2490. In addition to the monitor, computers may also include other peripheral output devices such as speakers 2497 and printer 2496, which may be connected through an output peripheral interface 2495.

The computer 2410 may operate in a networked environment using logical connections to one or more remote computers, such as a remote computer 2480. The remote computer 2480 may be a personal computer, a server, a router, a network PC, a peer device, or other common network node, and typically includes many or all of the elements described above relative to the computer 2410, although only a memory storage device 2481 has been illustrated in FIG. 24. The logical connections depicted in FIG. 24 include a local area network (LAN) 2471 and a wide area network (WAN) 2473, but may also include other networks. Such networking environments are commonplace in offices, enterprise-wide computer networks, intranets, and the Internet.

When used in a LAN networking environment, the computer 2410 is connected to the LAN 2471 through a network interface or adapter 2470. When used in a WAN networking environment, the computer 2410 typically includes a modem 2472 or other means for establishing communications over the WAN 2473, such as the Internet. The modem 2472, which may be internal or external, may be connected to the system bus 2421 via the actor input interface 2460, or other appropriate mechanism. In a networked environment, program modules depicted relative to the computer 2410, or portions thereof, may be stored in the remote memory storage device. By way of example, and not limitation, FIG. 24 illustrates remote application programs 2485 as residing on memory device 2481. It will be appreciated that the network connections shown are examples and other means of establishing a communications link between the computers may be used.

Having thus described several aspects of at least one embodiment of the technology described herein, it is to be appreciated that various alterations, modifications, and improvements will readily occur to those skilled in the art. Such alterations, modifications, and improvements are intended to be part of this disclosure, and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, a tablet computer, a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. A computer-readable storage medium includes any computer memory configured to store software, for example, the memory of any computing device such as a smart phone, a laptop, a desktop, a rack-mounted computer, or a server (e.g., a server storing software distributed by downloading over a network, such as an app store)). As used herein, the term "computer-readable storage medium" encompasses only a non-transitory computer-readable medium that can be considered to be a manufacture (i.e., article of manufacture) or a machine. Alternatively, or additionally, aspects of the technology described herein may be embodied as a computer readable medium other than a computer-readable storage medium, such as a propagating signal.

The terms "program" or "software" are used herein in a generic sense to refer to any type of computer code or set of processor-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion among a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIGS. 4A, 4B, 4C, 10A, 10B and 10C. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively. The terms "approximately" and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value. Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for use in connection with guiding a user in capturing one or more images of a vehicle, the method comprising:

using at least one computer hardware processor to perform:

obtaining a digital three-dimensional (3D) model of the vehicle, the digital 3D model comprising digital representations of exterior surfaces of the vehicle in a 3D coordinate system;

generating, from the 3D model of the vehicle, a part-annotated 3D model of the vehicle;

obtaining a list of portions of the vehicle to be imaged by the user;

obtaining multiple parameters defining a respective view of each portion of the list of portions;

generating, using the part-annotated 3D model, the list of portions, and the multiple parameters, overlays corresponding to portions of the list of portions of the vehicle to be imaged by the user; and outputting the generated overlays for use in guiding the user in capturing images of the portions of the vehicle.

2. The method of claim 1, wherein generating the part-annotated 3D model of the vehicle comprises using a trained deep neural network model to generate the part-annotated 3D model.

3. The method of claim 2, wherein generating the part-annotated 3D model of the vehicle comprises:

generating multiple viewpoints;

generating, using the 3D model of the vehicle, multiple renderings of the vehicle corresponding to the multiple viewpoints;

identifying vehicle parts in the multiple renderings by using the trained deep neural network model; and generating the part-annotated 3D model using the vehicle parts identified in the multiple renderings.

4. The method of claim 3, wherein the multiple renderings comprise a first rendering of the vehicle corresponding to a first viewpoint of the multiple viewpoints, wherein the trained deep neural network model comprises a plurality of parameters, and wherein identifying the vehicle parts comprises identifying vehicle parts in the first rendering of the vehicle by processing the first rendering with the trained deep neural network model, the processing comprising determining output of the trained deep neural network using the first rendering of the vehicle and values of the plurality of parameters.

5. The method of claim 4, wherein the trained deep neural network model comprises at least 10 million, at least 25 million, at least 50 million, or at least 100 million parameters.

6. The method of claim 2, wherein the trained deep neural network model comprises:

an encoder neural network portion; and a decoder neural network portion, wherein the decoder neural network portion comprises an atrous spatial pyramid pooling (ASPP) neural network portion.

7. The method of claim 1, wherein the multiple parameters for a particular portion of the vehicle to be imaged by the user specify:

one or more parts of the vehicle that should be fully visible in an image of the particular portion of the vehicle to be captured by the user, a part of the vehicle to in a center of the image, one or more parts of the vehicle to be highlighted in an overlay to be generated for guiding the user to capture the image, and/or one or more camera parameters to be used in capturing the image, the one or more camera parameters including a camera height, a camera pan angle, a focal length and/or field of view, and/or an aspect ratio.

8. The method of claim 1, wherein generating the overlays corresponding to the portions of the vehicle to be imaged by the user comprises:

for each particular portion of the list of portions, generating vehicle-specific camera parameters using the particular portion and the multiple parameters;

determining boundaries of one or more parts of the particular portion of the vehicle using the vehicle-specific camera parameters; and generating an overlay based on the determined boundaries.

9. The method of claim 8, wherein generating the overlay further comprises generating an initial overlay and smoothing the initial overlay to obtain the generated overlay.

10. The method of claim 9, wherein the smoothing comprises removing isolated curves and redundant curves from the initial overlay.

11. The method of claim 1, wherein the outputting comprises transmitting at least some of the generated overlays to a mobile device of the user.

12. The method of claim 11, further comprising:

guiding the user, using the at least some of the generated overlays and via a software application executing on the mobile device, to capture at least some of the portions of the vehicle.

13. A system for use in connection with guiding a user in capturing one or more images of a vehicle, the system comprising:

at least one computer hardware processor; and at least one non-transitory computer-readable storage medium storing processor-executable instructions that, when executed by the at least one computer hardware processor, cause the at least one computer hardware processor to perform:

obtaining a digital three-dimensional (3D) model of the vehicle, the digital 3D model comprising digital representations of exterior surfaces of the vehicle in a 3D coordinate system;

generating, from the 3D model of the vehicle, a part-annotated 3D model of the vehicle;

obtaining a list of portions of the vehicle to be imaged by the user;

obtaining multiple parameters defining a respective view of each portion of the list of portions;

generating, using the part-annotated 3D model, the list of portions, and the multiple parameters, overlays corresponding to portions of the list of portions of the vehicle to be imaged by the user; and outputting the generated overlays for use in guiding the user in capturing images of the portions of the vehicle.

14. The system of claim 13, wherein generating the part-annotated 3D model of the vehicle comprises:

generating multiple viewpoints;

generating, using the 3D model of the vehicle, multiple renderings of the vehicle corresponding to the multiple viewpoints;

identifying vehicle parts in the multiple renderings by using a trained deep neural network model; and generating the part-annotated 3D model using the vehicle parts identified in the multiple renderings.

15. The system of claim 14, wherein the trained deep neural network model comprises:

an encoder neural network portion; and a decoder neural network portion, wherein the decoder neural network portion comprises an atrous spatial pyramid pooling (ASPP) neural network portion.

16. The system of claim 14, wherein the multiple renderings comprise a first rendering of the vehicle corresponding to a first viewpoint of the multiple viewpoints, wherein the trained deep neural network model comprises a plurality of parameters, wherein identifying the vehicle parts comprises identifying vehicle parts in the first rendering of the vehicle by processing the first rendering with the trained deep neural network model, the processing comprising determining output of the trained deep neural network using the first rendering of the vehicle and values of the plurality of parameters.

17. At least one non-transitory computer-readable storage medium storing processor-executable instructions that, when executed by at least one computer hardware processor, cause the at least one computer hardware processor to perform:

obtaining a digital three-dimensional (3D) model of a vehicle, the digital 3D model comprising digital representations of exterior surfaces of the vehicle in a 3D coordinate system;

generating, from the 3D model of the vehicle, a part-annotated 3D model of the vehicle;

obtaining a list of portions of the vehicle to be imaged by a user;

obtaining multiple parameters defining a respective view of each portion of the list of portions;

generating, using the part-annotated 3D model, the list of portions, and the multiple parameters, overlays corresponding to portions of the list of portions of the vehicle to be imaged by the user; and outputting the generated overlays for use in guiding the user in capturing images of the portions of the vehicle.

18. The at least one non-transitory computer-readable storage medium of claim 17, wherein generating the part-annotated 3D model of the vehicle comprises:

generating multiple viewpoints;

generating, using the 3D model of the vehicle, multiple renderings of the vehicle corresponding to the multiple viewpoints;

identifying vehicle parts in the multiple renderings by using a trained deep neural network model; and generating the part-annotated 3D model using the vehicle parts identified in the multiple renderings.

19. The at least one non-transitory computer-readable storage medium of claim 18, wherein the multiple renderings comprise a first rendering of the vehicle corresponding to a first viewpoint of the multiple viewpoints, wherein the trained deep neural network model comprises a plurality of parameters, wherein identifying the vehicle parts comprises identifying vehicle parts in the first rendering of the vehicle by processing the first rendering with the trained deep neural network model, the processing comprising determining output of the trained deep neural network using the first rendering of the vehicle and values of the plurality of parameters.

* * * * *